(12) United States Patent
Chou

(10) Patent No.: US 11,506,873 B2
(45) Date of Patent: *Nov. 22, 2022

(54) OPTICAL LENS ASSEMBLY WITH DUAL MOLDED LENS ELEMENT AND ELECTRONIC DEVICE INCLUDING SAME ASSEMBLY

(71) Applicant: LARGAN PRECISION CO., LTD., Taichung (TW)

(72) Inventor: Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 189 days.

This patent is subject to a terminal disclaimer.

(21) Appl. No.: 16/924,444

(22) Filed: Jul. 9, 2020

(65) Prior Publication Data

US 2020/0341241 A1 Oct. 29, 2020

Related U.S. Application Data

(63) Continuation of application No. 16/152,583, filed on Oct. 5, 2018, now Pat. No. 10,746,972, which is a
(Continued)

(30) Foreign Application Priority Data

Dec. 14, 2016 (TW) .................... 105141458

(51) Int. Cl.
*G02B 13/18* (2006.01)
*G02B 7/02* (2021.01)
(Continued)

(52) U.S. Cl.
CPC ........... *G02B 13/006* (2013.01); *G02B 1/041* (2013.01); *G02B 5/003* (2013.01); *G02B 7/022* (2013.01); *G02B 13/0045* (2013.01)

(58) Field of Classification Search
CPC .......... G02B 7/14; G02B 7/022; G02B 7/026; G02B 7/021; G02B 7/04; G02B 7/10;
(Continued)

(56) References Cited

U.S. PATENT DOCUMENTS 6,819,508 B2 11/2004 Chiang
7,391,457 B2 6/2008 Fujimoto et al.
(Continued)

FOREIGN PATENT DOCUMENTS

| CN | 106199893 A | 12/2016 |
|----|-------------|---------|
| TW | M527093 U | 8/2016 |
| TW | M529856 U | 10/2016 |

*Primary Examiner* — William Choi
(74) *Attorney, Agent, or Firm* — McClure, Qualey & Rodack, LLP

(57) ABSTRACT

An optical lens assembly includes at least one lens element, which is a dual molded lens element. The dual molded lens element includes a light transmitting portion and a light absorbing portion. The light absorbing portion is annular and surrounds a central axis, wherein a plastic material and a color of the light absorbing portion are different from a plastic material and a color of the light transmitting portion, the dual molded lens element is made by an injection molding method and formed integrally, the light absorbing portion includes a plurality of second inner strip-shaped structures, the second inner strip-shaped structures are regularly arranged along a circumferential direction of the central axis, and the second inner strip-shaped structures are disposed correspondingly to and connected to a plurality of first inner strip-shaped structures.

17 Claims, 47 Drawing Sheets

Related U.S. Application Data continuation of application No. 15/488,768, filed on Apr. 17, 2017, now Pat. No. 10,126,529.

(51) Int. Cl.
  *G02B 13/00*  (2006.01)
  *G02B 1/04*  (2006.01)
  *G02B 5/00*  (2006.01)

(58) Field of Classification Search
  CPC . G02B 7/023; G02B 3/00; G02B 3/08; G03B 17/14
  USPC .......................... 359/741, 742, 819, 821–830
  See application file for complete search history.

(56) References Cited

U.S. PATENT DOCUMENTS

| | | |
|---|---|---|
| 7,545,583 B2 | 6/2009 | Hayashi et al. |
| 8,031,412 B2 | 10/2011 | Shintani |
| 8,102,609 B2 | 1/2012 | Tsuchiya et al. |
| 8,455,810 B2 | 6/2013 | Tomioka et al. |
| 8,599,501 B2 | 12/2013 | Chang |
| 8,736,989 B2 | 5/2014 | Wu |
| 8,817,396 B2 | 8/2014 | Mori et al. |
| 8,947,795 B2 | 2/2015 | Kobayashi et al. |
| 8,964,313 B2 | 2/2015 | Kobayashi et al. |
| 8,964,314 B2 | 2/2015 | Koike et al. |
| 9,354,444 B2 | 5/2016 | Lin |
| 10,126,529 B2 | 11/2018 | Chou |
| 10,746,972 B2 * | 8/2020 | Chou ..................... G02B 1/041 |
| 2014/0334019 A1 | 11/2014 | Ishiguri et al. |
| 2014/0347752 A1 | 11/2014 | Koike et al. |

* cited by examiner

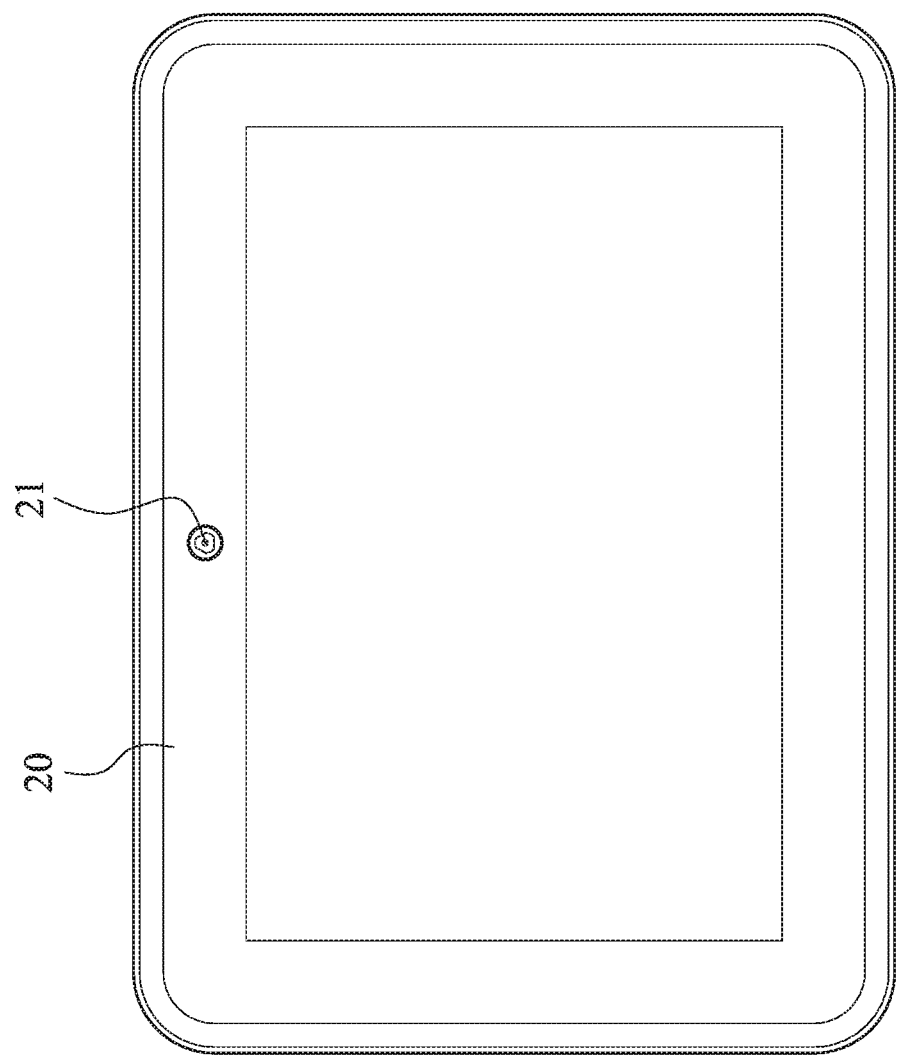

OPTICAL LENS ASSEMBLY WITH DUAL MOLDED LENS ELEMENT AND ELECTRONIC DEVICE INCLUDING SAME ASSEMBLY

RELATED APPLICATIONS

The present application is a continuation of the application Ser. No. 16/152,583, filed on Oct. 5, 2018, U.S. Pat. No. 10,746,972 issued on Aug. 18, 2020, which is a continuation of the application Ser. No. 15/488,768, filed on Apr. 17, 2017, U.S. Pat. No. 10,126,529 issued on Nov. 13, 2018, and claims priority to Taiwan application serial number 105141458, filed on Dec. 14, 2016, the entire contents of which are hereby incorporated herein by reference.

BACKGROUND

Technical Field

The present disclosure relates to an optical lens assembly. More particularly, the present disclosure relates to an optical lens assembly which is applicable to portable electronic devices.

Description of Related Art

Plastic lens elements are generally used to effectively reduce the manufacturing cost of optical lens assemblies. Conventional plastic lens elements are typically formed by the injection molding method and have smooth and bright surfaces, which are featured with high reflectivity. Accordingly, when the stray light travels to the surfaces of the plastic lens element, the stray light reflected from the surfaces of the plastic lens element cannot be effectively attenuated.

FIG. 13 is a schematic view of a conventional optical lens assembly 90. In FIG. 13, a light L is totally reflected from a surface of a lens element 91 with an incident angle greater than the critical angle thereof after entering into the conventional optical lens assembly 90, and then incident on the interface between the lens element 91 and a spacer 96. The light L continues to be multiple-reflected among the surfaces of the lens element 91, spacers 96 and 97, and a barrel 99 respectively, and becomes the stray light into an image surface. Hence, the stray light insufficiently attenuated in the conventional optical lens assembly 90 would cause problems such as ghost image on the image surface and affect the image quality.

Furthermore, conventional compact optical lens assemblies typically include a plurality of plastic lens elements so as to enhance the image quality by the plastic lens elements featured with compact sizes, aspheric surfaces and sharp changing of curvatures. However, lens elements with compact sizes and aspheric surfaces usually result in insufficient accuracy and alignment problems among lens elements.

Given the above, how to simultaneously meet the requirements of suppressing the stray light and accurate alignment with the optical axis of the compact optical lens assembly has become one of the important subjects, so that the image quality of the compact optical lens assemblies can be enhanced, and the requirements of high-end optical systems with camera functionalities can be satisfied.

SUMMARY

According to one aspect of the present disclosure, an optical lens assembly includes at least one lens element, which is a dual molded lens element. The dual molded lens element includes a light transmitting portion and a light absorbing portion. The light transmitting portion includes an effective optical section and a peripheral section. The peripheral section surrounds the effective optical section and includes a plurality of first inner strip-shaped structures, wherein the first inner strip-shaped structures are regularly arranged along a circumferential direction of a central axis of the dual molded lens element. The light absorbing portion is located on at least one of an object-side surface and an image-side surface of the dual molded lens element, wherein the light absorbing portion is annular and surrounds the central axis, a plastic material and a color of the light absorbing portion are different from a plastic material and a color of the light transmitting portion, the dual molded lens element is made by an injection molding method and formed integrally, the light absorbing portion includes a plurality of second inner strip-shaped structures, the second inner strip-shaped structures are regularly arranged along the circumferential direction of the central axis, and the second inner strip-shaped structures are disposed correspondingly to and connected to the first inner strip-shaped structures. When a center-to-center spacing angle in the circumferential direction of the central axis between any two of the second inner strip-shaped structures which are adjacent to each other is $\theta 2$, the following condition is satisfied: 0 degrees<$\theta 2$<18 degrees.

According to another aspect of the present disclosure, an electronic device includes a camera module, which includes the optical lens assembly according to the foregoing aspect and an image sensor, wherein the image sensor is disposed on an image surface of the optical lens assembly.

According to another aspect of the present disclosure, an optical lens assembly includes at least one lens element, which is a dual molded lens element. The dual molded lens element includes a light transmitting portion and a light absorbing portion. The light transmitting portion includes an effective optical section and a peripheral section. The peripheral section surrounds the effective optical section and includes a plurality of first inner ring-shaped structures, wherein the first inner ring-shaped structures are coaxially arranged with respect to a central axis of the dual molded lens element. The light absorbing portion is located on at least one of an object-side surface and an image-side surface of the dual molded lens element, wherein the light absorbing portion is annular and surrounds the central axis, a plastic material and a color of the light absorbing portion are different from a plastic material and a color of the light transmitting portion, the dual molded lens element is made by an injection molding method and formed integrally, the light absorbing portion includes a plurality of second inner ring-shaped structures, the second inner ring-shaped structures are coaxially arranged with respect to the central axis, and the second inner ring-shaped structures are disposed correspondingly to and connected to the first inner ring-shaped structures. When an outer diameter of one of the first inner ring-shaped structures having a greatest outer diameter is $\varphi t$, a greatest inner diameter of the light absorbing portion is $\varphi ab$, the following condition is satisfied: $1.0<\varphi t/\varphi ab<2.5$.

According to another aspect of the present disclosure, an electronic device includes a camera module, which includes the optical lens assembly according to the foregoing aspect and an image sensor, wherein the image sensor is disposed on an image surface of the optical lens assembly.

BRIEF DESCRIPTION OF THE DRAWINGS

FIG. 11 shows an electronic device according to the 11th embodiment of the present disclosure;

DETAILED DESCRIPTION

1st Embodiment

Figure 1A:
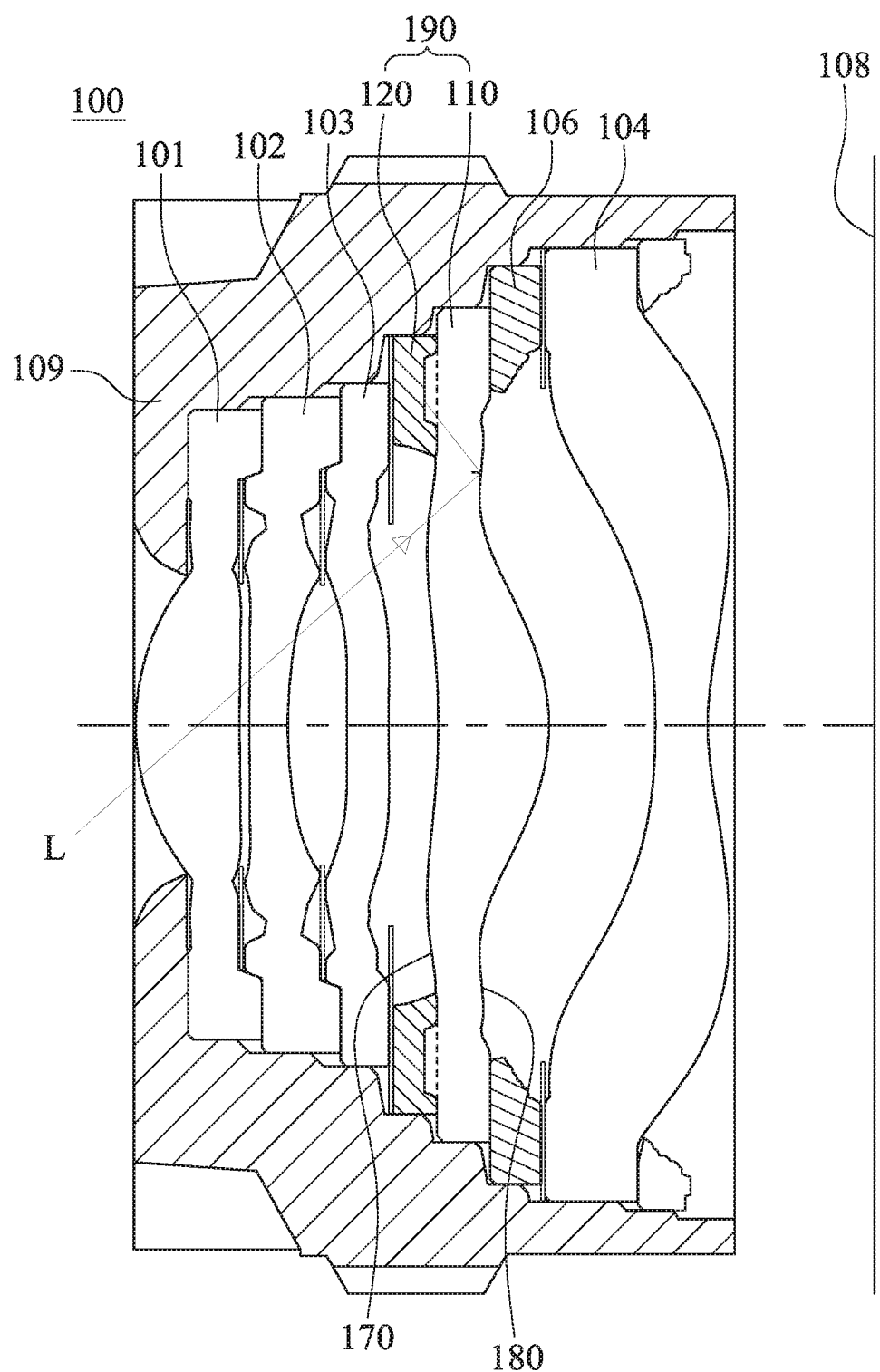
FIG. 1A is a schematic view of an optical lens assembly according to the 1st embodiment of the present disclosure.

FIG. 1A is a schematic view of an optical lens assembly 100 according to the 1st embodiment of the present disclosure. In FIG. 1A, the optical lens assembly 100 includes a dual molded lens element 190, wherein the dual molded lens element 190 includes a light transmitting portion 110 and a light absorbing portion 120.

Figure 1B:
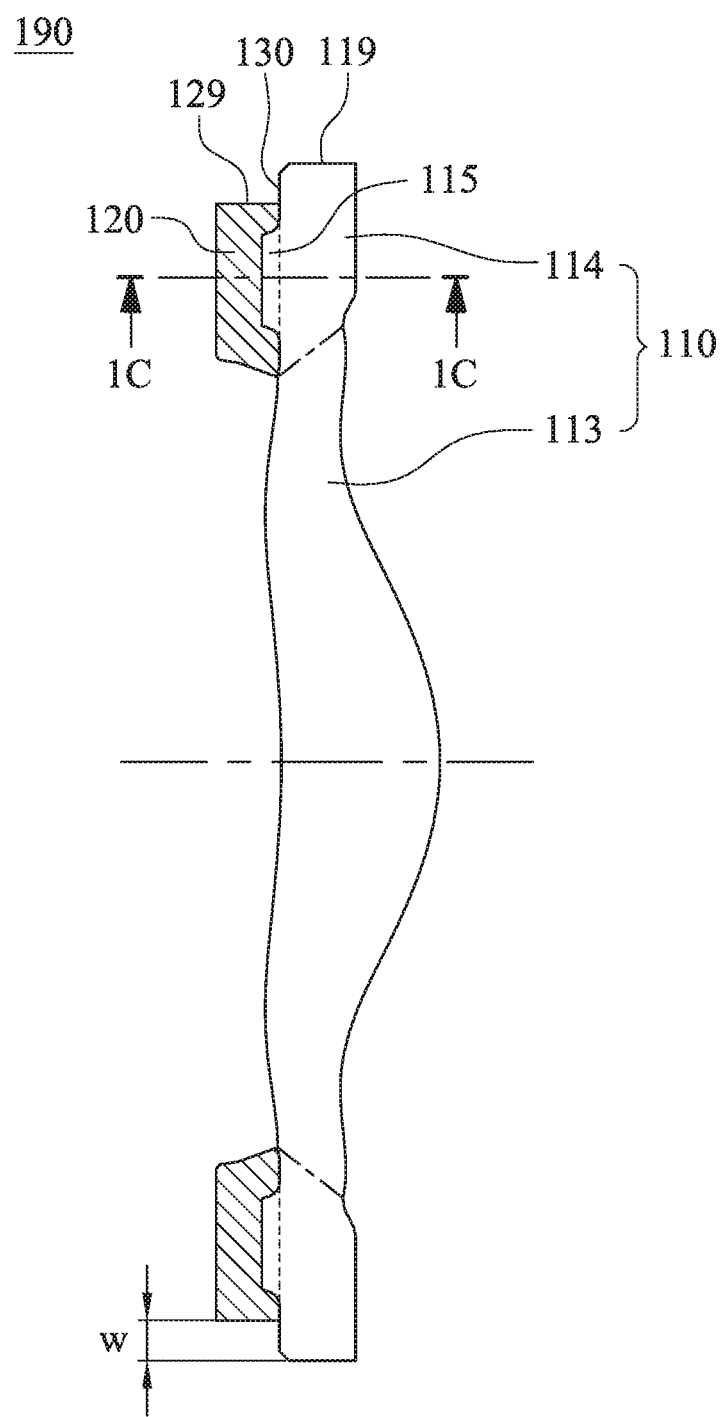
FIG. 1B is a schematic view of a dual molded lens element according to the 1st embodiment.
Figure 1C:
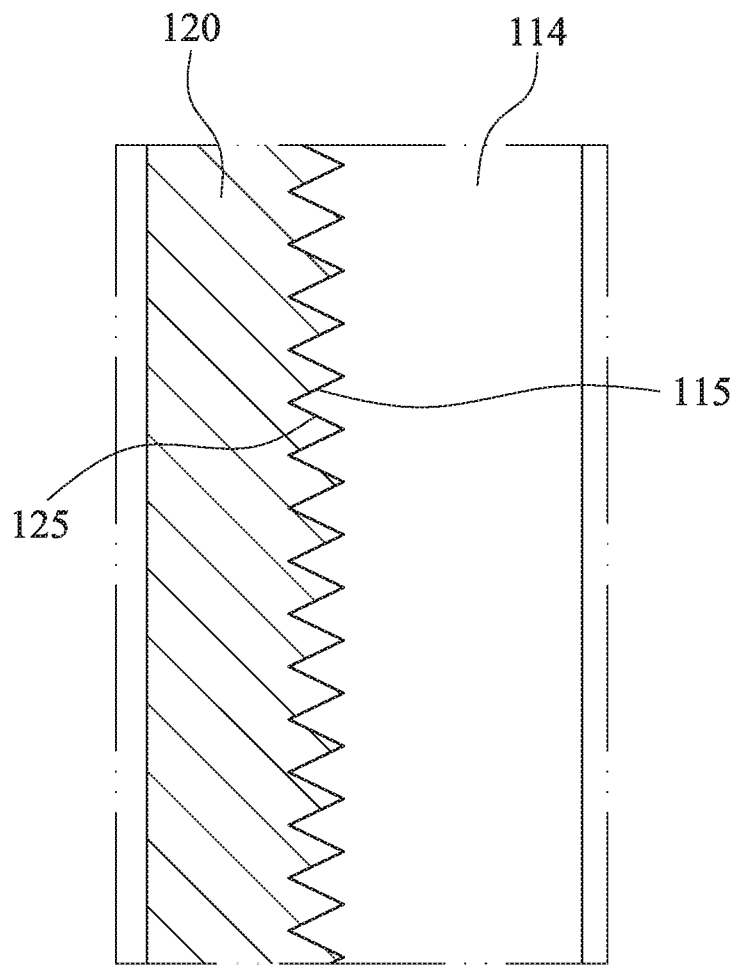
FIG. 1C is a cross-sectional view along line 1C-1C of FIG. 1B.

FIG. 1B is a schematic view of the dual molded lens element 190 according to the 1st embodiment, and FIG. 1C is a cross-sectional view along line 1C-1C of FIG. 1B. In FIG. 1A to FIG. 1C, the light transmitting portion 110 includes an effective optical section 113 and a peripheral section 114. The peripheral section 114 surrounds the effective optical section 113, wherein an incident light passes through the effective optical section 113 and forms an image on an image surface 108. The effective optical section 113 can include a planar surface or an aspheric surface with any curvature, wherein it would affect imaging properties by blocking the effective optical section 113.

The light absorbing portion 120 is located on at least one of an object-side surface 170 and an image-side surface 180 of the dual molded lens element 190 (the light absorbing portion 120 is located on the object-side surface 170 in the 1st embodiment), wherein the object-side surface 170 is a surface of the dual molded lens element 190 facing an imaged object (not shown herein), and the image-side surface 180 is a surface of the dual molded lens element 190 facing the image surface 108. The light absorbing portion 120 is annular and surrounds a central axis of the dual molded lens element 190. A plastic material and a color of the light absorbing portion 120 are different from a plastic material and a color of the light transmitting portion 110. The dual molded lens element 190 is made by an injection molding method and formed integrally, wherein the dual molded lens element 190 including the light transmitting portion 110 and light absorbing portion 120 can be made by a dual-shot injection molding method or a dual-shot molding method. Regarding the dual molded lens element 190 in the 1st embodiment, the plastic material of the light absorbing portion 120 has the feature of absorbing visible light, and the color of the light absorbing portion 120 is black. The plastic material of the light transmitting portion 110 has the feature of being transmitted by visible light, and the color of the light transmitting portion 110 is transparent and colorless. Hence, the plastic material and the color of the light absorbing portion 120 are different from the plastic material and the color of the light transmitting portion 110. In other embodiments (not shown herein), a light absorbing portion can be located on an image-side surface of a dual molded lens element, or both of an object-side surface and the image-side surface of the dual molded lens element.

Figure 1D:
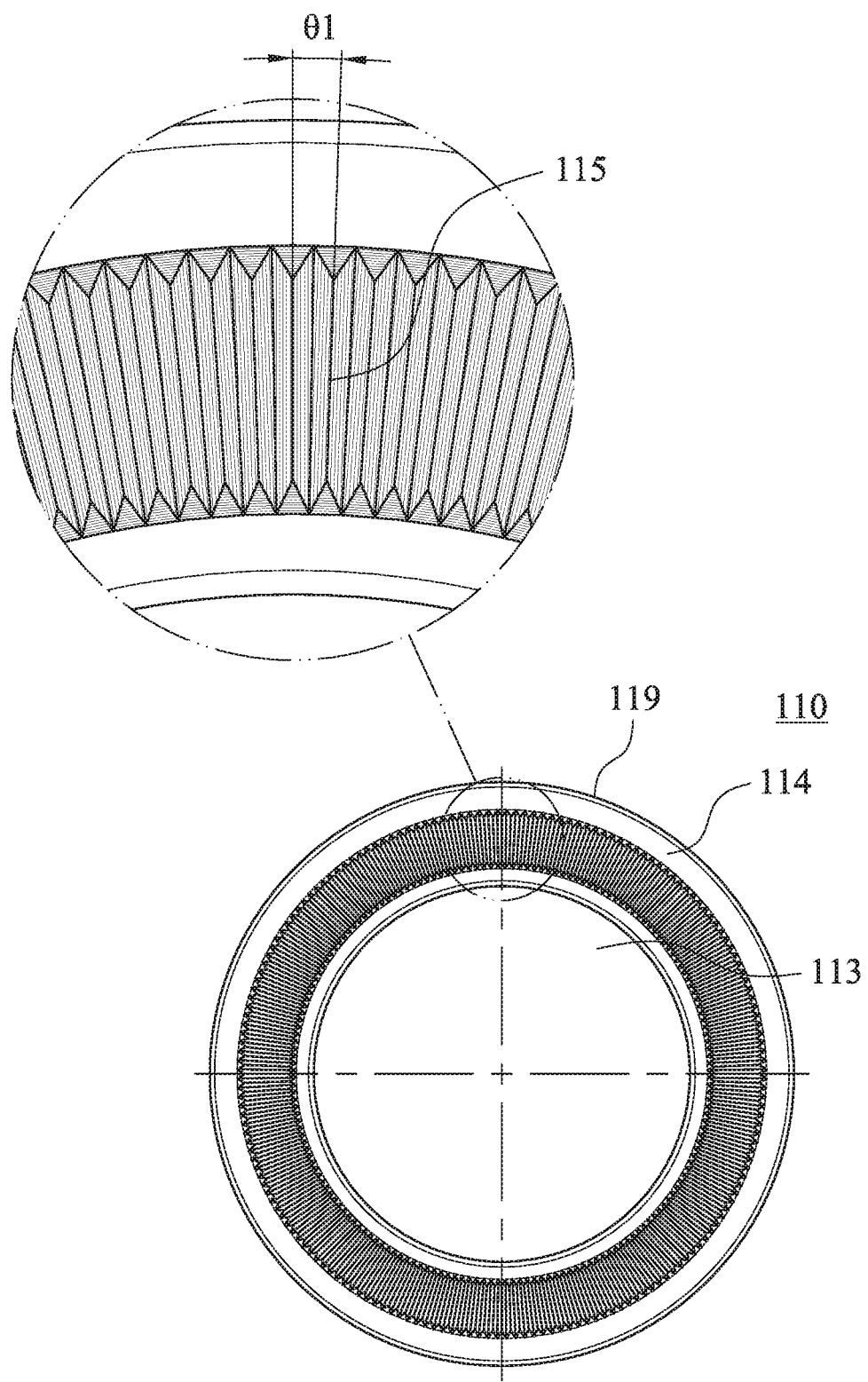
FIG. 1D is a plane view of a light transmitting portion according to the 1st embodiment.
Figure 1E:
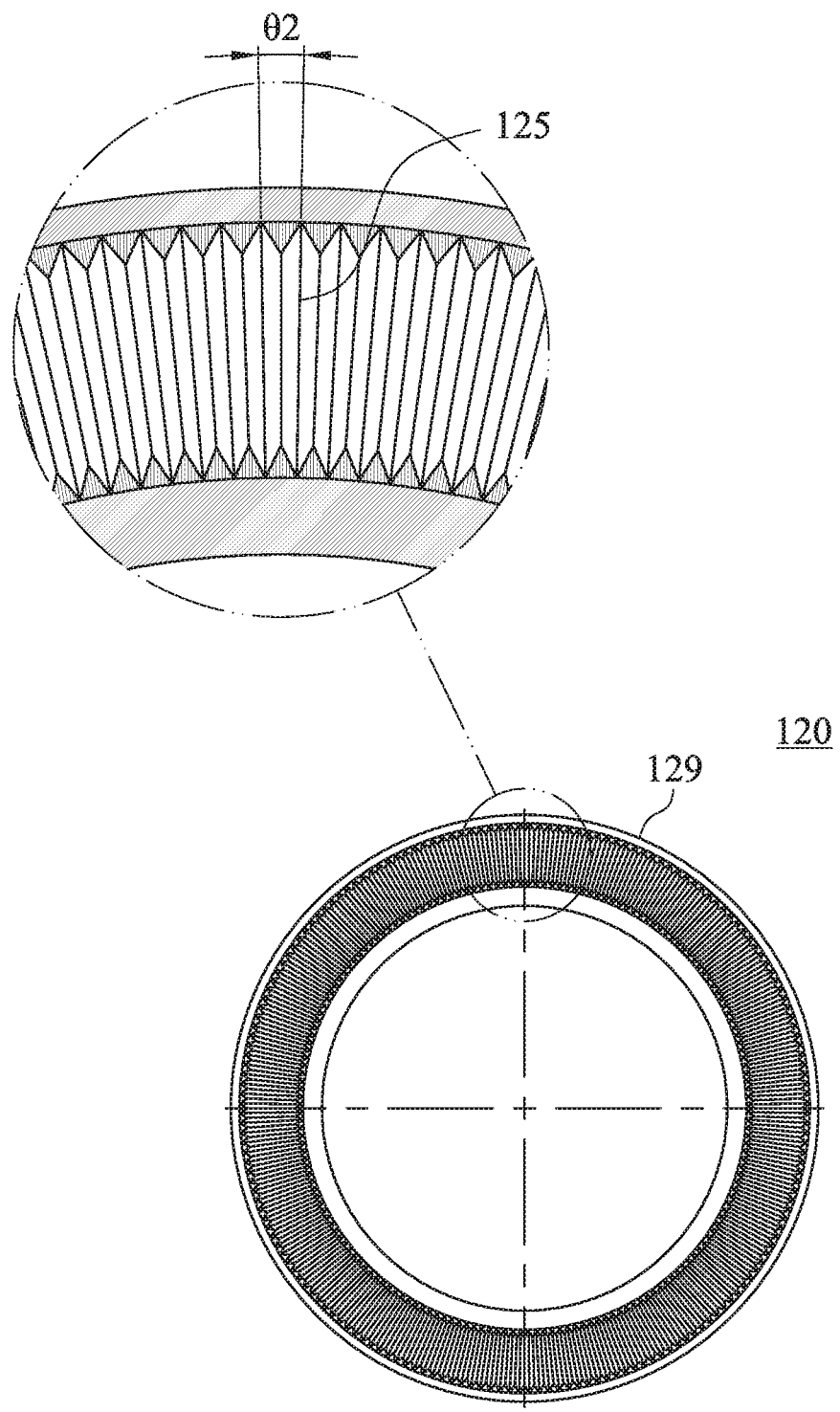
FIG. 1E is a plane view of a light absorbing portion according to the 1st embodiment.

FIG. 1D is a plane view of the light transmitting portion 110 according to the 1st embodiment, and FIG. 1E is a plane view of the light absorbing portion 120 according to the 1st embodiment. In FIG. 1B to FIG. 1E, the peripheral section 114 includes a plurality of first inner strip-shaped structures 115, wherein the first inner strip-shaped structures 115 are regularly arranged along a circumferential direction of the central axis of the dual molded lens element 190. The light absorbing portion 120 includes a plurality of second inner strip-shaped structures 125, wherein the second inner strip-shaped structures 125 are regularly arranged along the circumferential direction of the central axis, and the second inner strip-shaped structures 125 are disposed correspondingly to and connected to the first inner strip-shaped structures 115. Furthermore, one structure of the first inner strip-shaped structures 115 and the second inner strip-shaped structures 125 can be a strip-shaped structure of a continuous protrusion, which is a pre-arranged strip, such as a protrusion strip, a wedge strip and so on, or can be a strip-shaped structure including a plurality of protrusion structures and a plurality of spacing structures, which are arranged as a strip shape.

In FIG. 1E, when a center-to-center spacing angle in the circumferential direction of the central axis between any two of the second inner strip-shaped structures 125 which are adjacent to each other is θ2, the following condition is satisfied: 0 degrees<θ2<18 degrees. Therefore, it is favorable for reducing the stray light reflection in the optical lens assembly 100 and ensuring the dimensional accuracy of the optical elements (such as the dual molded lens element 190). Preferably, the following condition can be satisfied: 0 degrees<θ2<10 degrees.

Furthermore, in FIG. 1A, the optical lens assembly 100 includes lens elements 101, 102, 103, the dual molded lens element 190, a lens element 104 and the image surface 108 in order from an object side to an image side. The optical lens assembly 100 has a total of five lens elements (101, 102, 103, 190, 104), wherein the lens elements 101, 102, 103, the dual molded lens element 190 and the lens element 104 are disposed along an optical axis (i.e. the central axis of the dual molded lens element 190) in a plastic barrel 109. In other embodiments (not shown herein), the optical lens assembly can have a total of four, six, seven or more lens elements.

In FIG. 1A to FIG. 1C, a light L is totally reflected from the image-side surface 180 of the lens element 190 with an incident angle greater than the critical angle thereof after entering into the optical lens assembly 100, and then incident on the interface between the first inner strip-shaped structures 115 and the second inner strip-shaped structures 125. While the light L continues to be reflected between the first inner strip-shaped structures 115 and the second inner strip-shaped structures 125 being both fine structures, the light L is absorbed by the second inner strip-shaped structures 125, and the strength of the light L is attenuated. Therefore, it is favorable for effectively reducing the stray light incident into the image surface 108 and maintaining the image quality of the optical lens assembly 100.

Figure 1F:
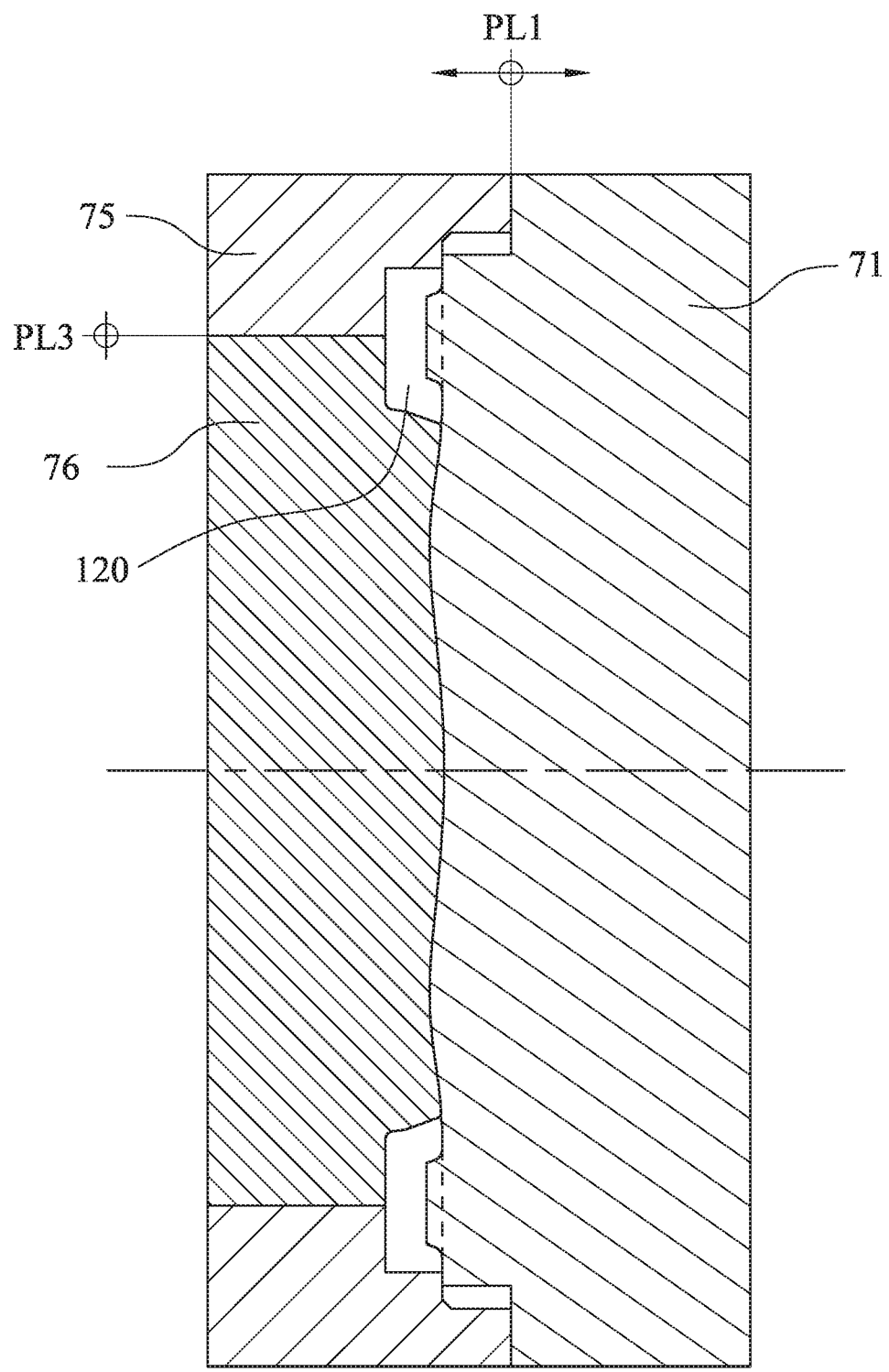
FIG. 1F is a schematic view of a first step of a manufacturing method of the dual molded lens element according to the 1st embodiment.
Figure 1G:
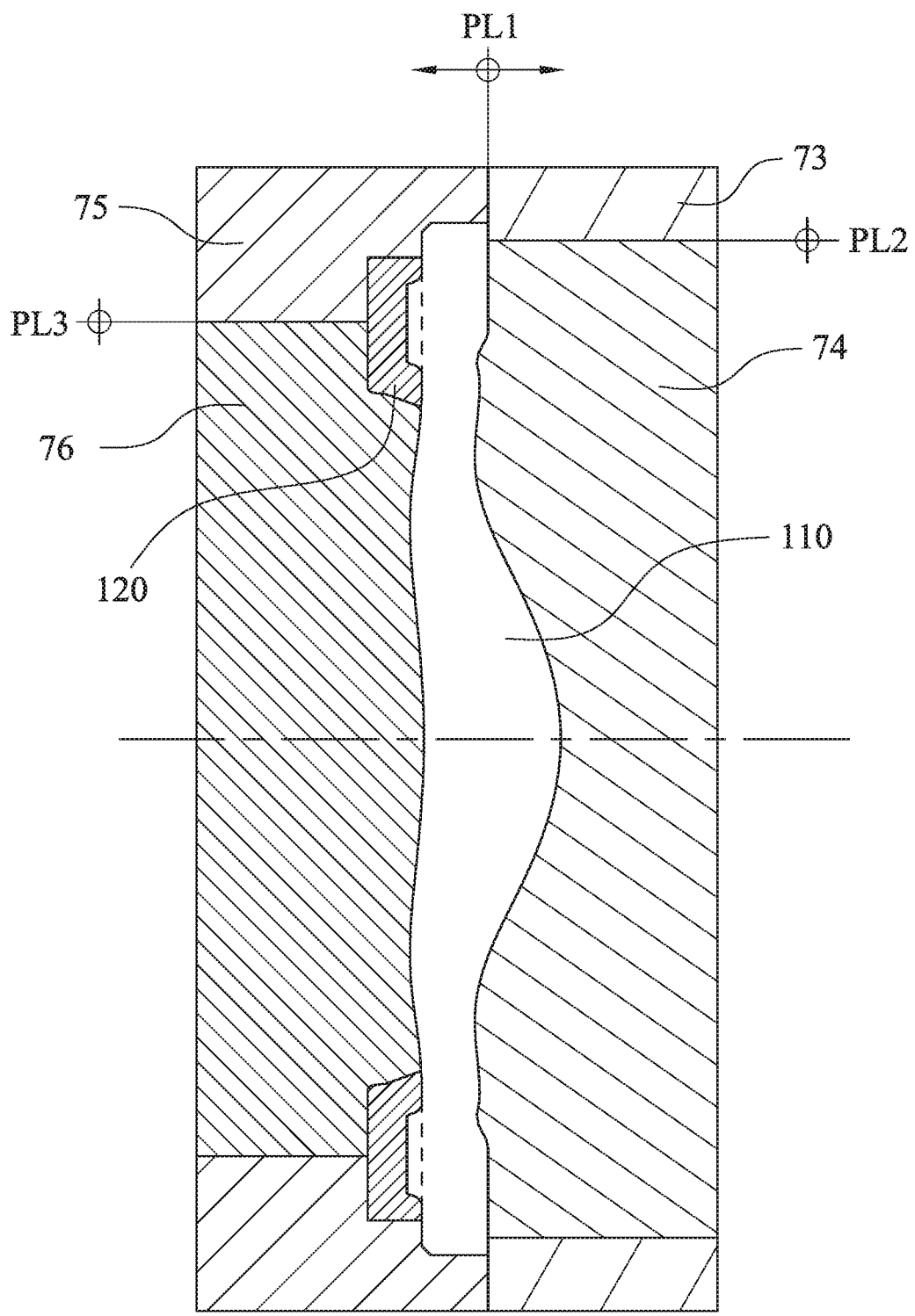
FIG. 1G is a schematic view of a second step of the manufacturing method of the dual molded lens element according to the 1st embodiment.

In detail, FIG. 1F is a schematic view of a first step of a manufacturing method of the dual molded lens element 190 according to the 1st embodiment, and FIG. 1G is a schematic view of a second step of the manufacturing method of the dual molded lens element 190 according to the 1st embodiment. In FIG. 1F and FIG. 1G, the dual molded lens element 190 can be made by a dual-shot injection molding method. Therefore, it is favorable for ensuring the dimensional accuracy of the optical element, such as the dual molded lens element 190, and reducing the assembling tolerance of the optical lens assembly 100.

In the first step of the manufacturing method of the dual molded lens element 190, the light absorbing portion 120 is formed in a mold cavity among movable molds 75, 76 and a first fixed mold 71 in an injection molding process. Next in the second step of the manufacturing method of the dual molded lens element 190, the movable molds 75 and 76 are moved towards second fixed molds 73 and 74 to form another mold cavity while the light absorbing portion 120 being formed is moved together into the another mold cavity, and the light transmitting portion 110 is formed in another injection molding process. Accordingly, the dual molded lens element 190 having the light transmitting portion 110 and the light absorbing portion 120 with different plastic materials and colors is made and formed integrally by the dual-shot injection molding method. Furthermore, regarding the mold of the dual molded lens element 190 in the 1st embodiment, there is a horizontal parting surface PL1 between the movable mold 75 and the second fixed mold 73, wherein the horizontal parting surface PL1 is orthogonal to the optical axis and acts as a main parting surface of the mold of the dual molded lens element 190. In addition, there are a vertical parting surface PL2 between the second fixed molds 73 and 74, and a vertical parting surface PL3 between the movable molds 75 and 76, wherein the vertical parting surfaces PL2 and PL3 are both orthogonal to the horizontal parting surface PL1. The arrangements of the horizontal parting surface PL1, the vertical parting surfaces PL2 and PL3 are beneficial to increase the dimensional accuracy of the dual molded lens element 190. In other embodiments (not shown herein), a light transmitting portion can be made first, and a light absorbing portion can be made next.

In FIG. 1D and FIG. 1E, the peripheral section 114 of the light transmitting portion 110 further includes an outer annular surface 119. Each of the first inner strip-shaped structures 115 can be disposed in a direction from the central axis towards the outer annular surface 119 of the peripheral section 114. It can also be said that each of the first inner strip-shaped structures 115 can be disposed in a direction from the outer annular surface 119 towards the central axis, and the first inner strip-shaped structures 115 can be arranged outwards from the central axis towards the outer annular surface 119 as a radial pattern. The light absorbing portion 120 further includes an outer annular surface 129. Each of the second inner strip-shaped structures 125 can be disposed in a direction from the central axis towards the outer annular surface 129 of the light absorbing portion 120. It can also be said that each of the second inner strip-shaped structures 125 can be disposed in a direction from the outer annular surface 129 towards the central axis, and the second inner strip-shaped structures 125 can be arranged outwards from the central axis towards the outer annular surface 129 as a radial pattern. Therefore, it is favorable for maintaining the denseness and the machining quality of the first inner strip-shaped structures 115 and the second inner strip-shaped structures 125.

Each of the second inner strip-shaped structures 125 can be a wedge strip, which is a strip structure with a wider bottom and a narrower top, being tapered from the bottom to the top. More specifically, a cross-sectional plane along the circumferential direction of the central axis of each of the second inner strip-shaped structures 125 is isosceles triangular in the 1st embodiment. Therefore, it is favorable for further eliminating the stray light by the second inner strip-shaped structures 125 being wedge strips, and improving the mold releasing so as to increase the manufacturing yield rate of the dual molded lens element 190.

In FIG. 1C to FIG. 1E of the 1st embodiment, the dual molded lens element 190 is made by the dual-shot injection molding method as the aforementioned, wherein the second inner strip-shaped structures 125 as a whole are corresponding to the first inner strip-shaped structures 115 as a whole. Each of the second inner strip-shaped structures 125 is a wedge strip, and each of the first inner strip-shaped structures 115 is correspondingly a wedge strip. The second inner strip-shaped structures 125 have the same geometric structures and are regularly arranged along the circumferential direction of the central axis of the dual molded lens element 190, and the first inner strip-shaped structures 115 correspondingly have the same geometric structures and are regularly arranged along the circumferential direction of the central axis, wherein the geometric structure of each of the first inner strip-shaped structures 115 can be different from the geometric structure of each of the second inner strip-shaped structures 125. The center-to-center spacing angle in the circumferential direction of the central axis between any two of the second inner strip-shaped structures 125 which are adjacent to each other is θ2, and a center-to-center spacing angle in the circumferential direction of the central axis between any two of the first inner strip-shaped structures 115 which are adjacent to each other is correspondingly θ1, wherein θ1=θ2. In other embodiments (not shown herein), the aspects regarding the first inner strip-shaped structures being regularly arranged are not limited to the same structures, the same spacing, or the same values of the parameter 81. The aspects regarding the second inner strip-shaped structures being regularly arranged are not limited to the same structures, the same spacing, or the same values of the parameter θ2. In addition, the first inner strip-shaped structures and the second inner strip-shaped structures may be periodically arranged respectively.

In FIG. 1B, a flat surface 130 can be located between the outer annular surface 119 of the peripheral section 114 and the outer annular surface 129 of the light absorbing portion 120, wherein the flat surface 130 surrounds and is orthogonal to the central axis, and the flat surface 130 can be located on the peripheral section 114 or the light absorbing portion 120. For manufacturing more easily, the dual molded lens element 190 may have a feature of the flat surface 130 resulted from the mold design in the injection molding process. In the 1st embodiment, the flat surface 130 is located on the peripheral section 114.

When a width of the flat surface 130 is w, the following condition can be satisfied: 0.03 mm<w<0.52 mm. The parameter w can also be said as a length in a radial direction of the central axis of the flat surface 130. Therefore, it is favorable for ensuring the dimensional stability of the dual molded lens element 190 in mass production by maintaining the value of the parameter w in a specific range. Preferably, the following condition can be satisfied: 0.05 mm<w<0.35 mm.

The effective optical section 113 of the light transmitting portion 110 can include at least one aspheric surface. That is, at least one of two regions of the effective optical section 113 respectively located on the object-side surface 170 and the image-side surface 180 of the dual molded lens element 190 can be an aspheric surface. Therefore, it is favorable for eliminating optical aberrations, so that the dual molded lens element 190 can be applicable to the high-end optical lens assembly 100. In the 1st embodiment, the effective optical section 113 includes two aspheric surfaces, which are respectively the region of the effective optical section 113 located on the object-side surface 170 and the region of the effective optical section 113 located on the image-side surface 180 of the dual molded lens element 190.

The data of the aforementioned parameters of the optical lens assembly 100 according to the 1st embodiment of the present disclosure are listed in the following Table 1, wherein the parameters are also shown as FIG. 1B, FIG. 1D and FIG. 1E.

TABLE 1

| 1st Embodiment | | | |
| --- | --- | --- | --- |
| θ1 (degrees) | 2 | w (mm) | 0.16 |
| θ2 (degrees) | 2 | | |

2nd Embodiment

Figure 2A:
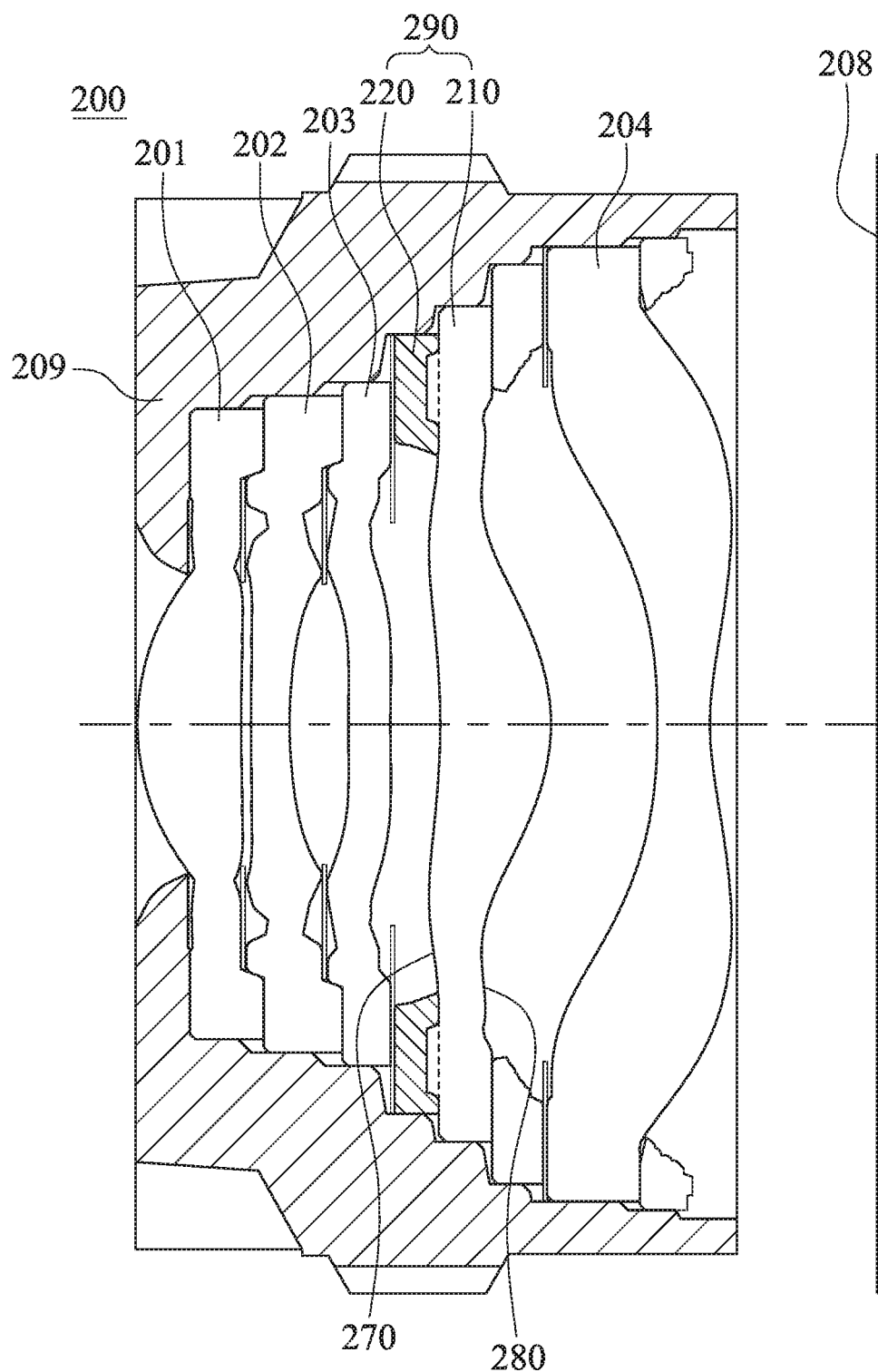
FIG. 2A is a schematic view of an optical lens assembly according to the 2nd embodiment of the present disclosure.

FIG. 2A is a schematic view of an optical lens assembly 200 according to the 2nd embodiment of the present disclosure. In FIG. 2A, the optical lens assembly 200 includes a dual molded lens element 290, wherein the dual molded lens element 290 includes a light transmitting portion 210 and a light absorbing portion 220.

Figure 2B:
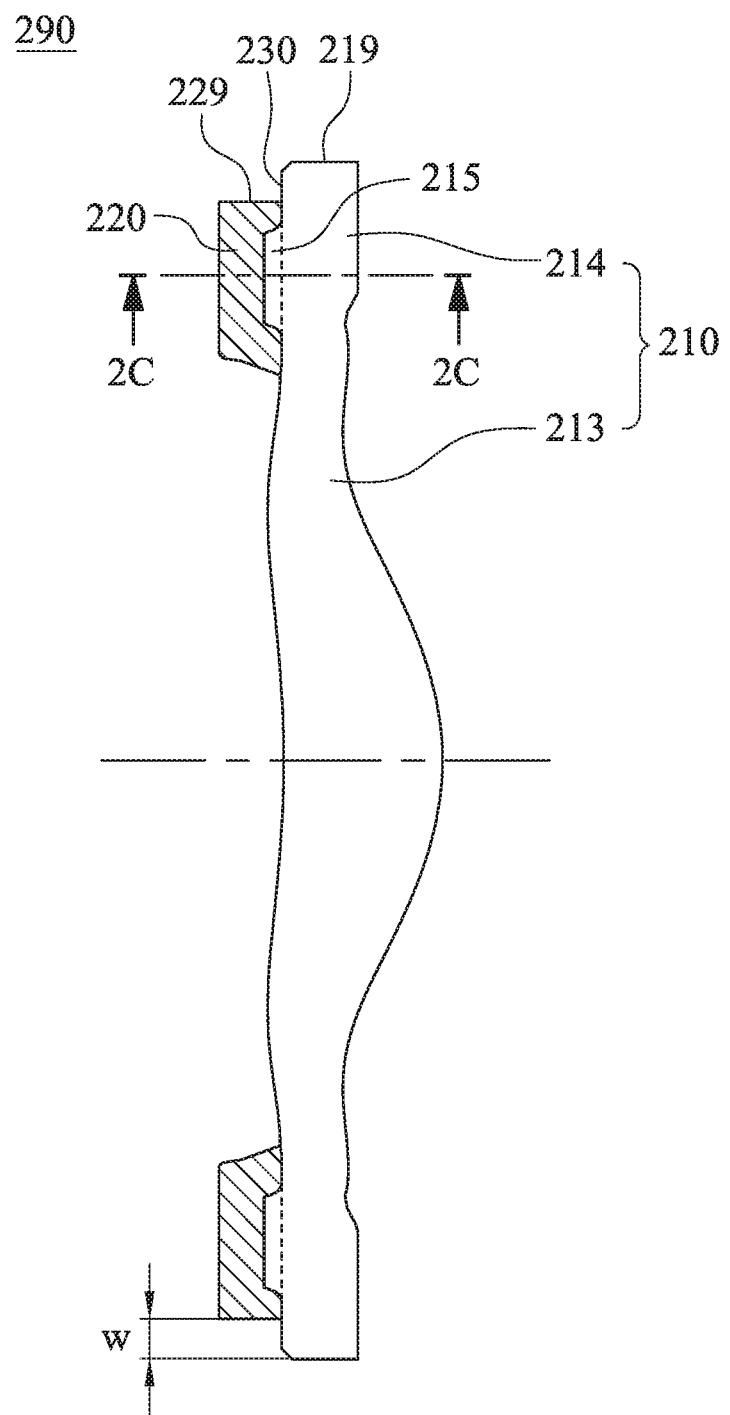
FIG. 2B is a schematic view of a dual molded lens element according to the 2nd embodiment.
Figure 2C:
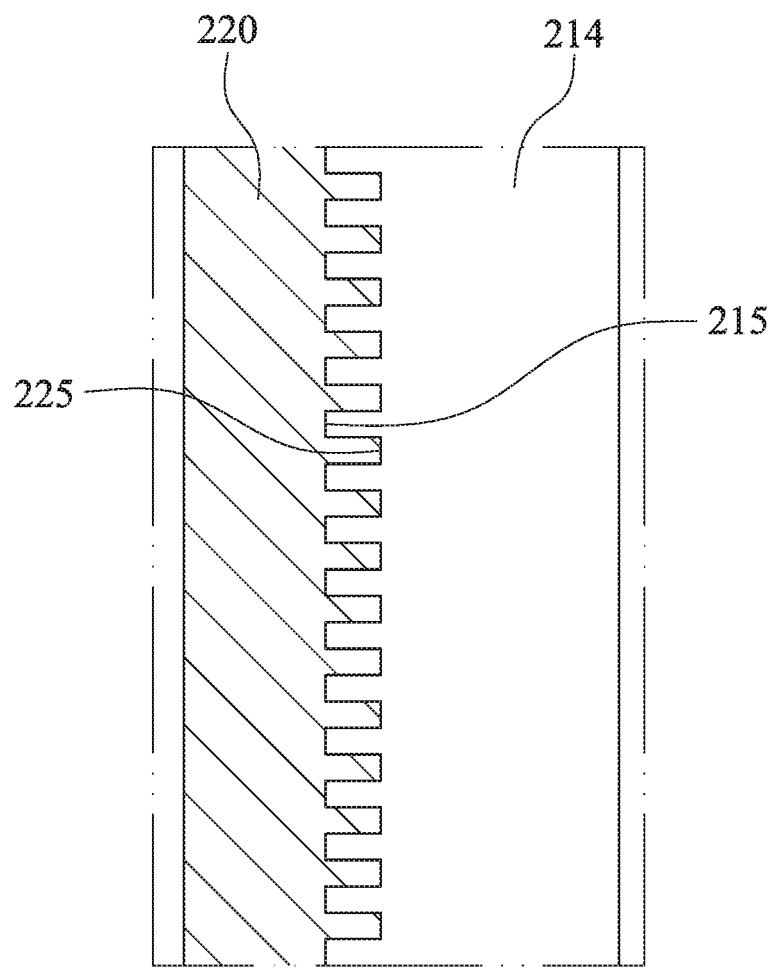
FIG. 2C is a cross-sectional view along line 2C-2C of FIG. 2B.

FIG. 2B is a schematic view of the dual molded lens element 290 according to the 2nd embodiment, and FIG. 2C is a cross-sectional view along line 2C-2C of FIG. 2B. In FIG. 2A to FIG. 2C, the light transmitting portion 210 includes an effective optical section 213 and a peripheral section 214. The peripheral section 214 surrounds the effective optical section 213, wherein an incident light passes through the effective optical section 213 and forms an image on an image surface 208. The effective optical section 213 can include a planar surface or an aspheric surface with any curvature, wherein it would affect imaging properties by blocking the effective optical section 213.

The light absorbing portion 220 is located on an object-side surface 270 of the dual molded lens element 290, wherein the object-side surface 270 is a surface of the dual molded lens element 290 facing an imaged object (not shown herein), and an image-side surface 280 is a surface of the dual molded lens element 290 facing the image surface 208. The light absorbing portion 220 is annular and surrounds a central axis of the dual molded lens element 290. A plastic material of the light absorbing portion 220 has the feature of absorbing visible light, and a color of the light absorbing portion 220 is black. A plastic material of the light transmitting portion 210 has the feature of being transmitted by visible light, and a color of the light transmitting portion 210 is transparent and colorless. Hence, the plastic material and the color of the light absorbing portion 220 are different from the plastic material and the color of the light transmitting portion 210. The dual molded lens element 290 is made by an injection molding method and formed integrally.

Figure 2D:
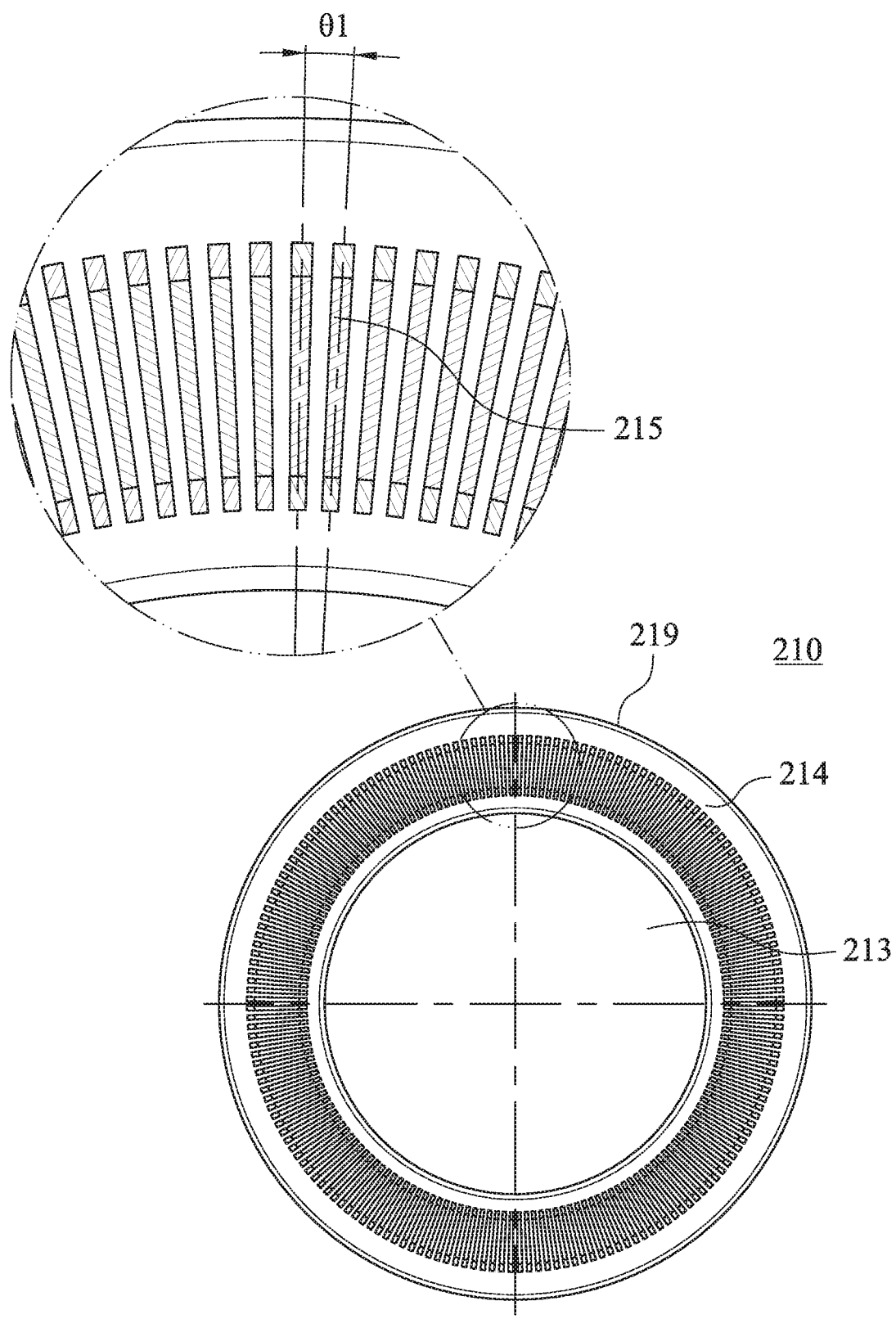
FIG. 2D is a plane view of a light transmitting portion according to the 2nd embodiment.
Figure 2E:
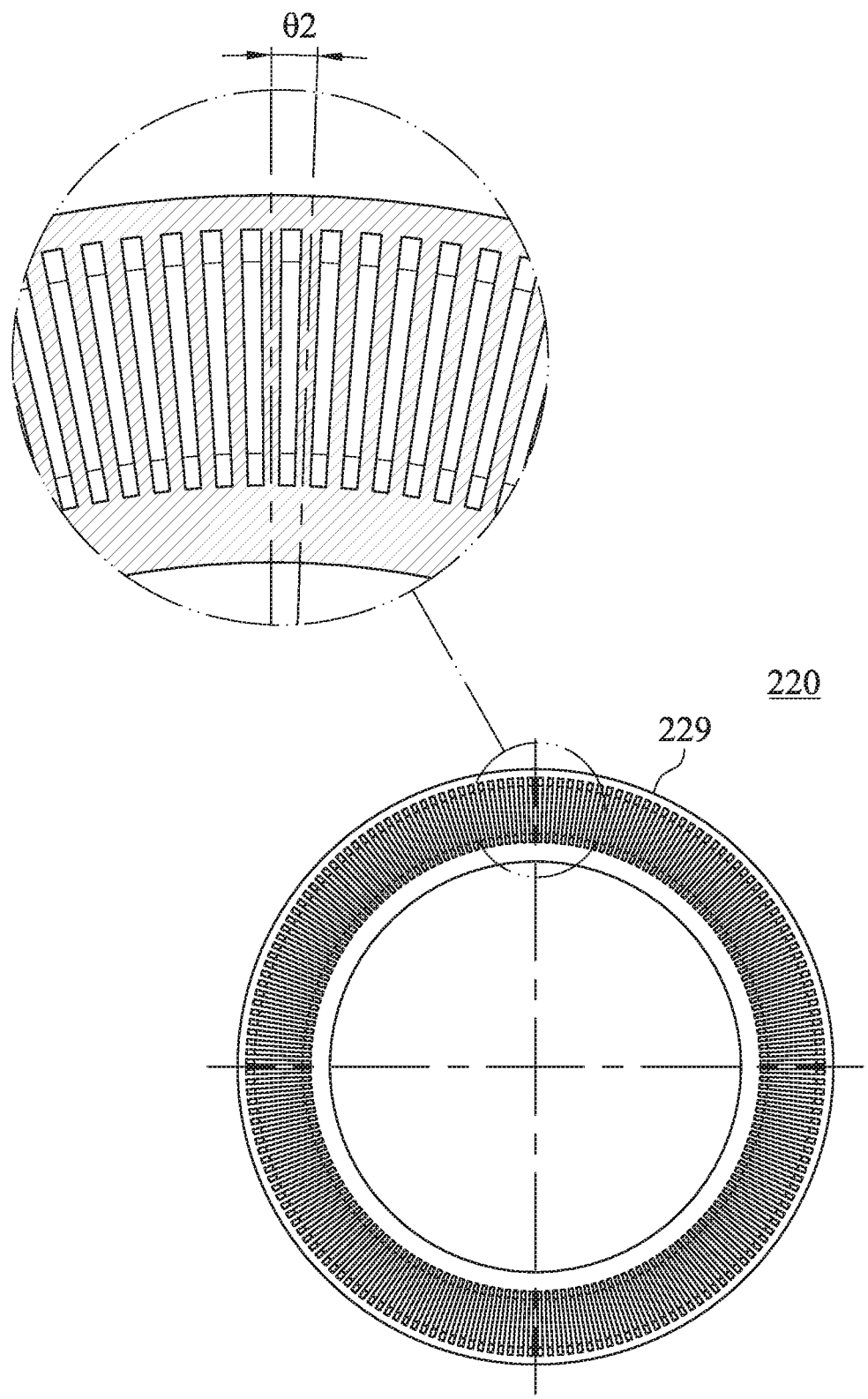
FIG. 2E is a plane view of a light absorbing portion according to the 2nd embodiment.

FIG. 2D is a plane view of the light transmitting portion 210 according to the 2nd embodiment, and FIG. 2E is a plane view of the light absorbing portion 220 according to the 2nd embodiment. In FIG. 2B to FIG. 2E, the peripheral section 214 includes a plurality of first inner strip-shaped structures 215, wherein the first inner strip-shaped structures 215 are regularly arranged along a circumferential direction of the central axis of the dual molded lens element 290. The light absorbing portion 220 includes a plurality of second inner strip-shaped structures 225, wherein the second inner strip-shaped structures 225 are regularly arranged along the circumferential direction of the central axis, and the second inner strip-shaped structures 225 are disposed correspondingly to and connected to the first inner strip-shaped structures 215.

In detail, the dual molded lens element 290 is made by a dual-shot injection molding method. The peripheral section 214 of the light transmitting portion 210 further includes an outer annular surface 219. Each of the first inner strip-shaped structures 215 is disposed in a direction from the central axis towards the outer annular surface 219 of the peripheral section 214. The light absorbing portion 220 further includes an outer annular surface 229. Each of the second inner strip-shaped structures 225 is disposed in a direction from the central axis towards the outer annular surface 229 of the light absorbing portion 220.

Each of the first inner strip-shaped structures 215 is a protrusion strip. More specifically, a cross-sectional plane along the circumferential direction of the central axis of each of the second inner strip-shaped structures 225 is rectangular in the 2nd embodiment. Therefore, it is favorable for adding surface treatments on the first inner strip-shaped structures 215.

In the 2nd embodiment, the dual molded lens element 290 is made by the dual-shot injection molding method, wherein the first inner strip-shaped structures 215 as a whole are corresponding to the second inner strip-shaped structures 225 as a whole. The first inner strip-shaped structures 215 are protrusion strips, and a plurality of strip grooves (its reference numeral is omitted) located on the light absorbing portion 220 are corresponding to the first inner strip-shaped structures 215, wherein each of the strip grooves is located between each two of the second inner strip-shaped structures 225 which are adjacent to each other, and the second inner strip-shaped structures 225 are correspondingly protrusion strips. The first inner strip-shaped structures 215 have the same geometric structures and are regularly arranged along the circumferential direction of the central axis of the dual molded lens element 290, and the second inner strip-shaped structures 225 correspondingly have the same geometric structures and are regularly arranged along the circumferential direction of the central axis, wherein the geometric structure of each of the first inner strip-shaped structures 215 is different from the geometric structure of each of the second inner strip-shaped structures 225. A center-to-center spacing angle in the circumferential direction of the central axis between any two of the first inner strip-shaped structures 215 which are adjacent to each other is θ1, and a center-to-center spacing angle in the circumferential direction of the central axis between any two of the second inner strip-shaped structures 225 which are adjacent to each other is correspondingly θ2, wherein θ1=θ2.

In FIG. 2A, the optical lens assembly 200 includes lens elements 201, 202, 203, the dual molded lens element 290, a lens element 204 and the image surface 208 in order from an object side to an image side. The optical lens assembly 200 has a total of five lens elements (201, 202, 203, 290, 204), wherein the lens elements 201, 202, 203, the dual molded lens element 290 and the lens element 204 are disposed along an optical axis (i.e. the central axis of the dual molded lens element 290) in a plastic barrel 209.

In FIG. 2A and FIG. 2B, a flat surface 230 is located between the outer annular surface 219 of the peripheral section 214 and the outer annular surface 229 of the light absorbing portion 220, wherein the flat surface 230 surrounds and is orthogonal to the central axis, and the flat surface 230 is located on the peripheral section 214. The effective optical section 213 includes two aspheric surfaces, which are respectively a region of the effective optical section 213 located on the object-side surface 270 and a region of the effective optical section 213 located on the image-side surface 280 of the dual molded lens element 290.

The data of the parameters θ1, θ2 and w of the optical lens assembly 200 according to the 2nd embodiment of the present disclosure are listed in the following Table 2, wherein the parameters are also shown as FIG. 2B, FIG. 2D and FIG. 2E. The definitions of these parameters shown in Table 2 are the same as those stated in the optical lens assembly 100 of the 1st embodiment with corresponding values for the optical lens assembly 200.

TABLE 2

| 2nd Embodiment | | | |
|---|---|---|---|
| θ1 (degrees) | 2 | w (mm) | 0.16 |
| θ2 (degrees) | 2 | | |

3rd Embodiment

Figure 3A:
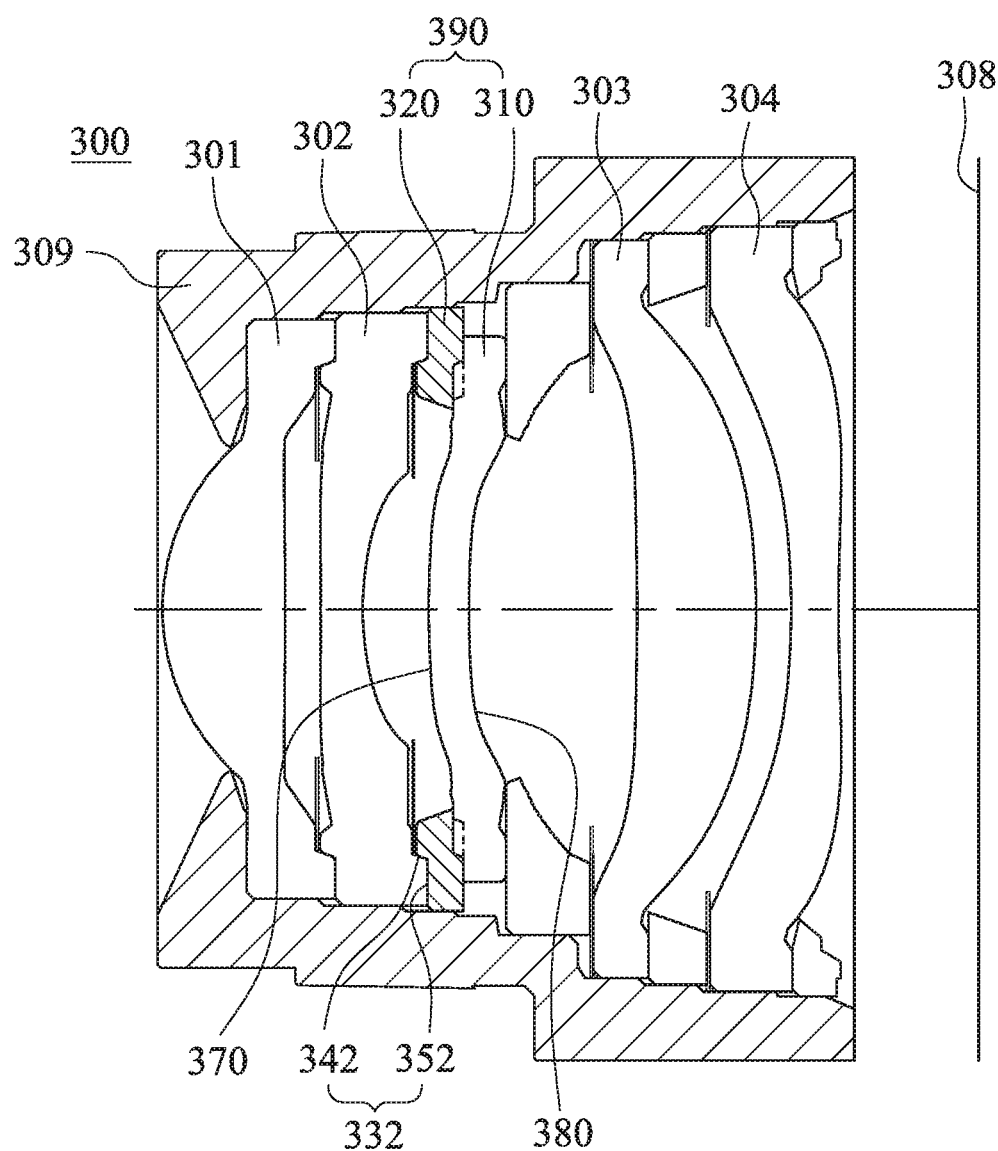
FIG. 3A is a schematic view of an optical lens assembly according to the 3rd embodiment of the present disclosure.

FIG. 3A is a schematic view of an optical lens assembly 300 according to the 3rd embodiment of the present disclosure. In FIG. 3A, the optical lens assembly 300 includes a dual molded lens element 390, wherein the dual molded lens element 390 includes a light transmitting portion 310 and a light absorbing portion 320.

Figure 3B:
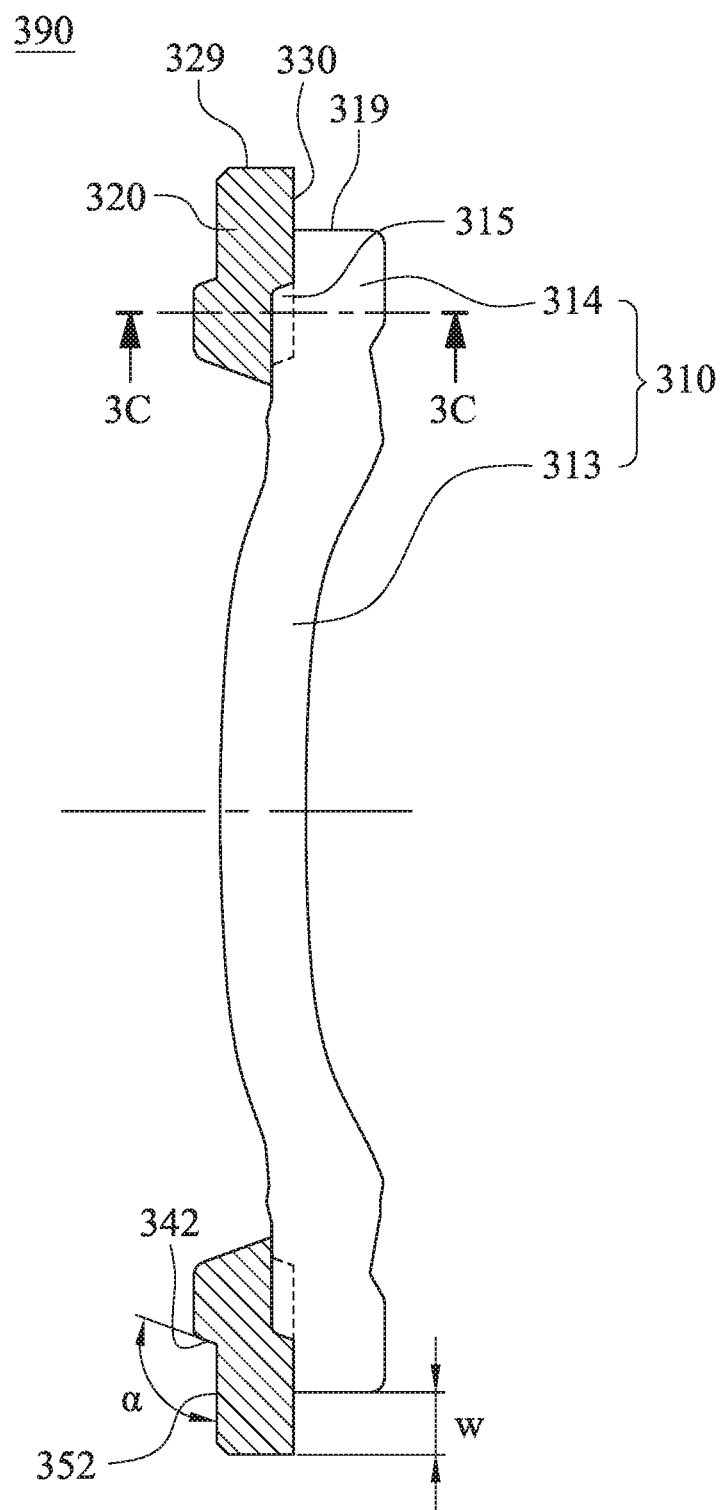
FIG. 3B is a schematic view of a dual molded lens element according to the 3rd embodiment.
Figure 3C:
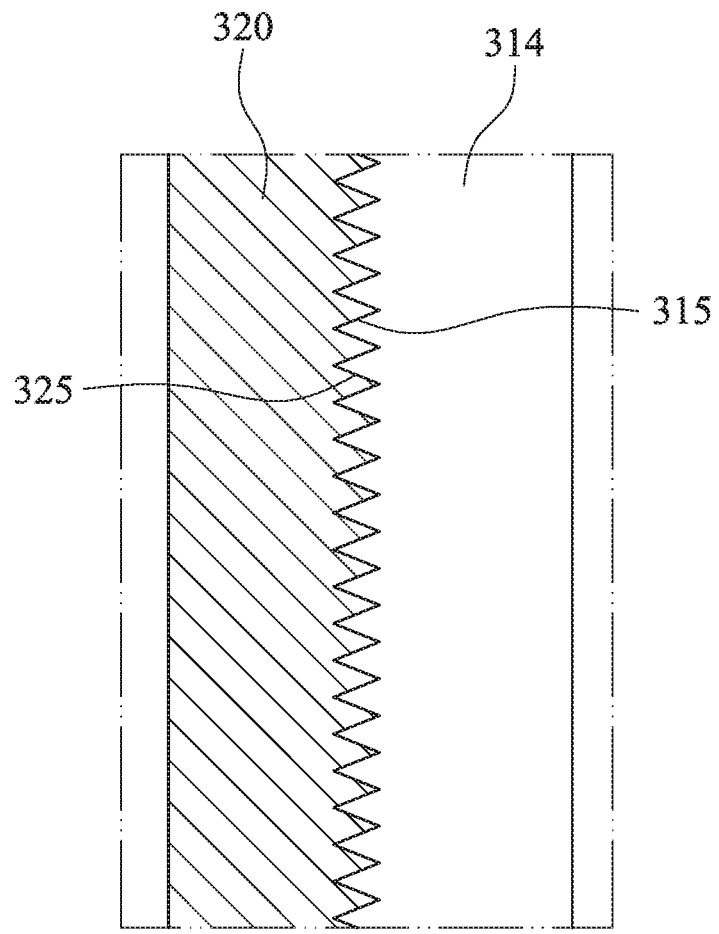
FIG. 3C is a cross-sectional view along line 3C-3C of FIG. 3B.

FIG. 3B is a schematic view of the dual molded lens element 390 according to the 3rd embodiment, and FIG. 3C is a cross-sectional view along line 3C-3C of FIG. 3B. In FIG. 3A to FIG. 3C, the light transmitting portion 310 includes an effective optical section 313 and a peripheral section 314. The peripheral section 314 surrounds the effective optical section 313, wherein an incident light passes through the effective optical section 313 and forms an image on an image surface 308. The effective optical section 313 can include a planar surface or an aspheric surface with any curvature, wherein it would affect imaging properties by blocking the effective optical section 313.

The light absorbing portion 320 is located on an object-side surface 370 of the dual molded lens element 390, wherein the object-side surface 370 is a surface of the dual molded lens element 390 facing an imaged object (not shown herein), and an image-side surface 380 is a surface of the dual molded lens element 390 facing the image surface 308. The light absorbing portion 320 is annular and surrounds a central axis of the dual molded lens element 390. A plastic material of the light absorbing portion 320 has the feature of absorbing visible light, and a color of the light absorbing portion 320 is black. A plastic material of the light transmitting portion 310 has the feature of being transmitted by visible light, and a color of the light transmitting portion 310 is transparent and colorless. Hence, the plastic material and the color of the light absorbing portion 320 are different from the plastic material and the color of the light transmitting portion 310. The dual molded lens element 390 is made by an injection molding method and formed integrally.

Figure 3D:
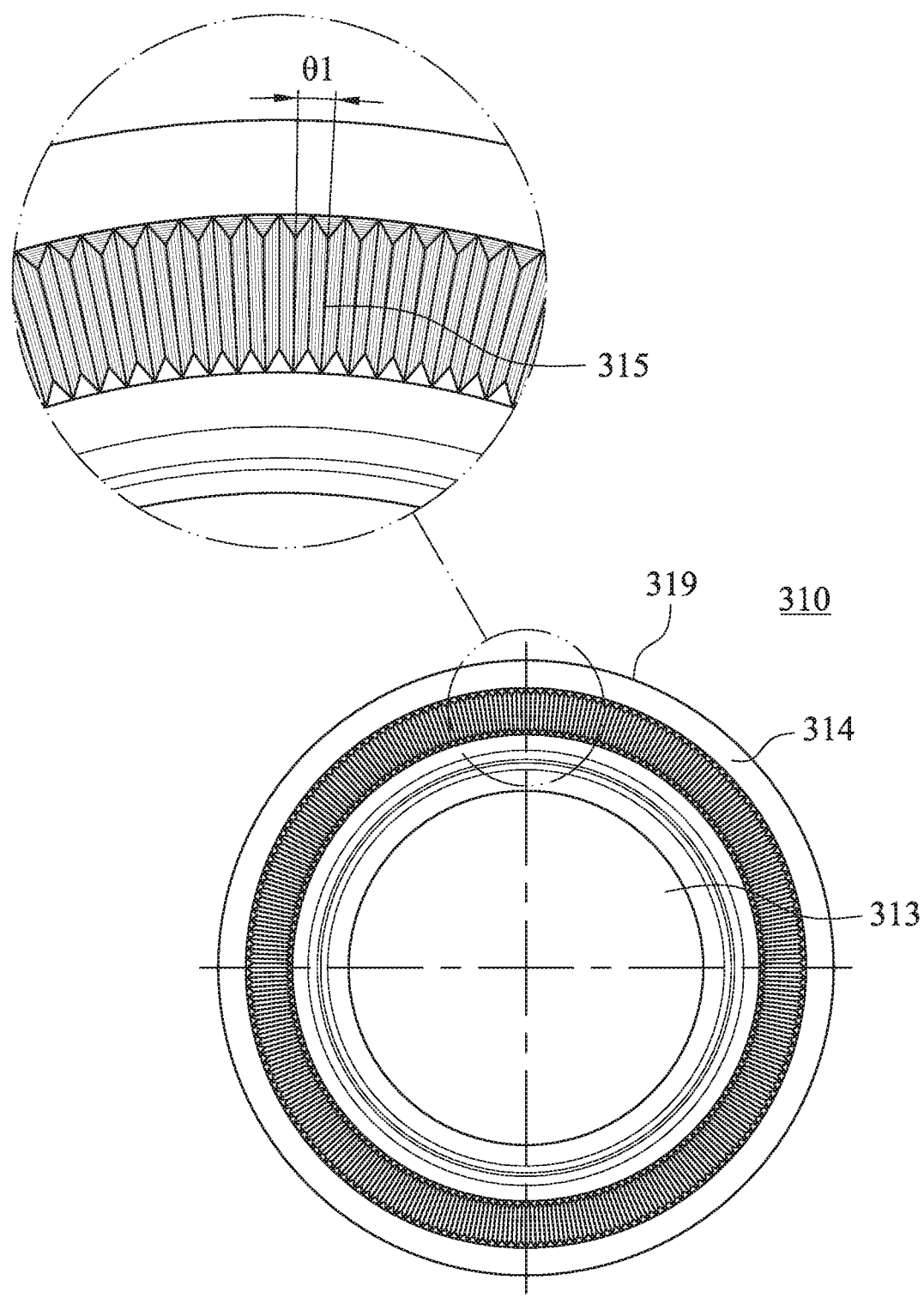
FIG. 3D is a plane view of a light transmitting portion according to the 3rd embodiment.
Figure 3E:
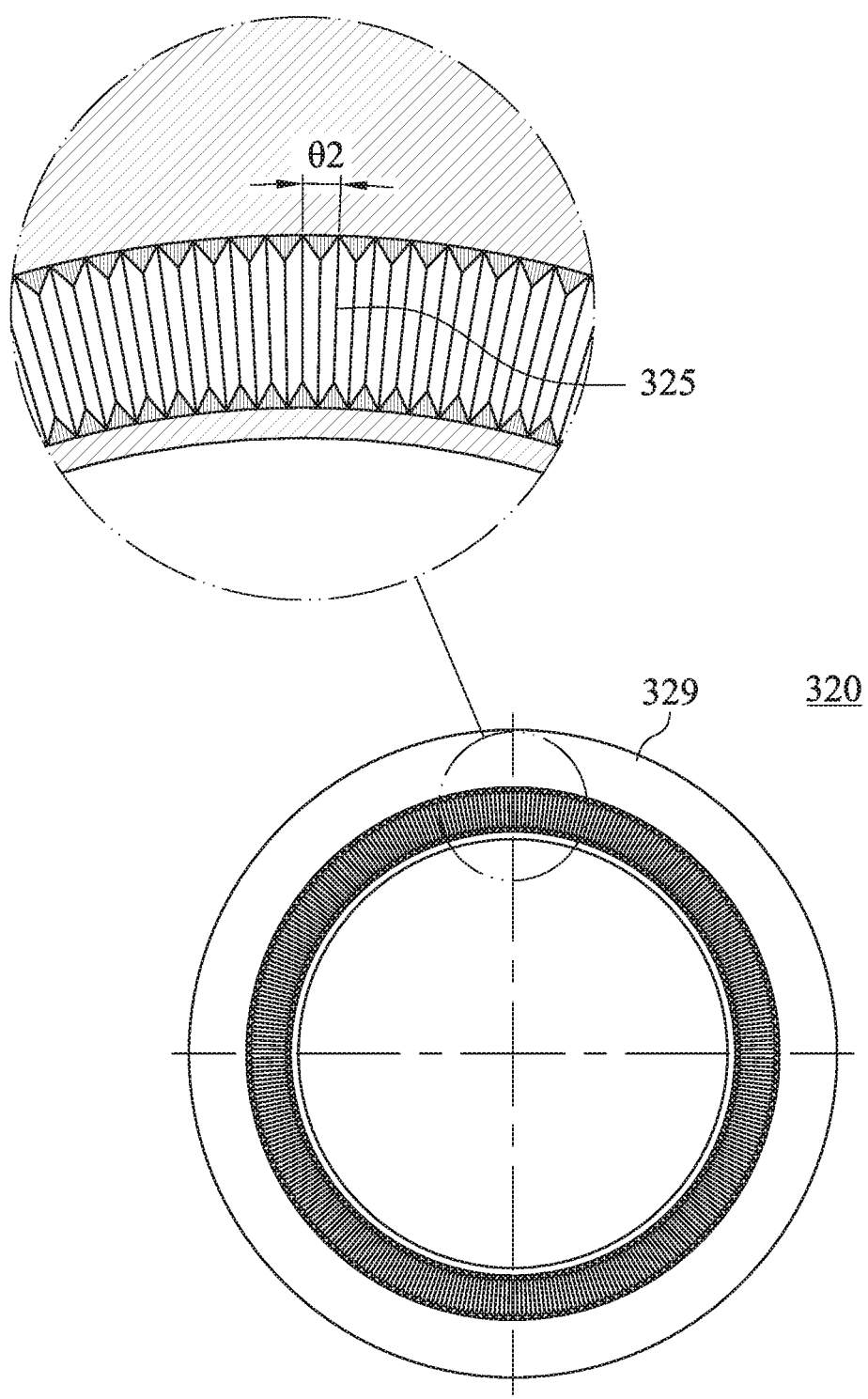
FIG. 3E is a plane view of a light absorbing portion according to the 3rd embodiment.

FIG. 3D is a plane view of the light transmitting portion 310 according to the 3rd embodiment, and FIG. 3E is a plane view of the light absorbing portion 320 according to the 3rd embodiment. In FIG. 3B to FIG. 3E, the peripheral section 314 includes a plurality of first inner strip-shaped structures 315, wherein the first inner strip-shaped structures 315 are regularly arranged along a circumferential direction of the central axis of the dual molded lens element 390. The light absorbing portion 320 includes a plurality of second inner strip-shaped structures 325, wherein the second inner strip-shaped structures 325 are regularly arranged along the circumferential direction of the central axis, and the second inner strip-shaped structures 325 are disposed correspondingly to and connected to the first inner strip-shaped structures 315.

In detail, the dual molded lens element 390 is made by a dual-shot injection molding method. The peripheral section 314 of the light transmitting portion 310 further includes an outer annular surface 319. Each of the first inner strip-shaped structures 315 is disposed in a direction from the central axis towards the outer annular surface 319 of the peripheral section 314. The light absorbing portion 320 further includes an outer annular surface 329. Each of the second inner strip-shaped structures 325 is disposed in a direction from the central axis towards the outer annular surface 329 of the light absorbing portion 320. Each of the second inner strip-shaped structures 325 is a wedge strip. More specifically, a cross-sectional plane along the circumferential direction of the central axis of each of the second inner strip-shaped structures 325 is isosceles triangular.

In the 3rd embodiment, the dual molded lens element 390 is made by the dual-shot injection molding method, wherein the second inner strip-shaped structures 325 as a whole are corresponding to the first inner strip-shaped structures 315 as a whole. Each of the second inner strip-shaped structures 325 is a wedge strip, and each of the first inner strip-shaped structures 315 is correspondingly a wedge strip. The second inner strip-shaped structures 325 have the same geometric structures and are regularly arranged along the circumferential direction of the central axis of the dual molded lens element 390, and the first inner strip-shaped structures 315 correspondingly have the same geometric structures and are regularly arranged along the circumferential direction of the central axis, wherein the geometric structure of each of the first inner strip-shaped structures 315 can be different from the geometric structure of each of the second inner strip-shaped structures 325. A center-to-center spacing angle in the circumferential direction of the central axis between any two of the second inner strip-shaped structures 325 which are adjacent to each other is θ2, and a center-to-center spacing angle in the circumferential direction of the central axis between any two of the first inner strip-shaped structures 315 which are adjacent to each other is correspondingly θ1, wherein θ1=θ2.

In FIG. 3A, a number of lens elements of the optical lens assembly 300 is at least two, wherein one of the lens elements is the dual molded lens element 390. The optical lens assembly 300 includes lens elements 301, 302, the dual molded lens element 390, lens elements 303, 304 and the image surface 308 in order from an object side to an image side. The optical lens assembly 300 has a total of five lens elements (301, 302, 390, 303, 304), wherein the lens elements 301, 302, the dual molded lens element 390, the lens elements 303 and 304 are disposed along an optical axis (i.e. the central axis of the dual molded lens element 390) in a plastic barrel 309.

In FIG. 3A and FIG. 3B, a flat surface 330 is located between the outer annular surface 319 of the peripheral section 314 and the outer annular surface 329 of the light absorbing portion 320, wherein the flat surface 330 surrounds and is orthogonal to the central axis, and the flat surface 330 is located on the light absorbing portion 320. The effective optical section 313 includes two aspheric surfaces, which are respectively a region of the effective optical section 313 located on the object-side surface 370 and a region of the effective optical section 313 located on the image-side surface 380 of the dual molded lens element 390.

A connecting structure 332 is located on at least one of the peripheral section 314 and the light absorbing portion 320 of the dual molded lens element 390. The connecting structure 332 includes a connecting surface 342 and a receiving surface 352, wherein the connecting surface 342 is an annular conical surface with respect to the central axis, and the receiving surface 352 is orthogonal to the central axis and farther from the central axis than the connecting surface 342 is from the central axis. The connecting structure 332 is connected to the lens element 302, which is adjacent to the dual molded lens element 390, and the connecting structure 332 is for the dual molded lens element 390 and the lens element 302 both aligned with the central axis. Therefore, better alignment accuracies of both the dual molded lens element 390 and the lens element 302 can be achieved by the dimensional accuracy of the connecting structure 332. Furthermore, it is favorable for the dual molded lens element 390 to be applicable to the high-end optical lens assembly 300, wherein the high-end specifications of the optical lens assembly 300 may include larger stop, high MTF (Modulation Transfer Function), more uniform refractive index of the lens element and etc.

When an angle between the connecting surface 342 and the receiving surface 352 is α, the following condition is satisfied: 95 degrees<α<135 degrees. Therefore, it is favorable for reducing assembling failure of the optical lens assembly 300 and maintaining better molding efficiency of the dual molded lens element 390.

The connecting structure 332 is located on the light absorbing portion 320. Therefore, it is favorable for effectively attenuating the stray light passed through the lens elements.

The data of the parameters θ1, θ2, w and a of the optical lens assembly 300 according to the 3rd embodiment of the present disclosure are listed in the following Table 3, wherein the parameters are also shown as FIG. 3B, FIG. 3D and FIG. 3E. The definitions of these parameters shown in Table 3 are the same as those stated in the optical lens assembly 100 of the 1st embodiment with corresponding values for the optical lens assembly 300.

TABLE 3

| 3rd Embodiment | | | |
|---|---|---|---|
| θ1 (degrees) | 2 | w (mm) | 0.21 |
| θ2 (degrees) | 2 | α (degrees) | 110 |

4th Embodiment

Figure 4A:
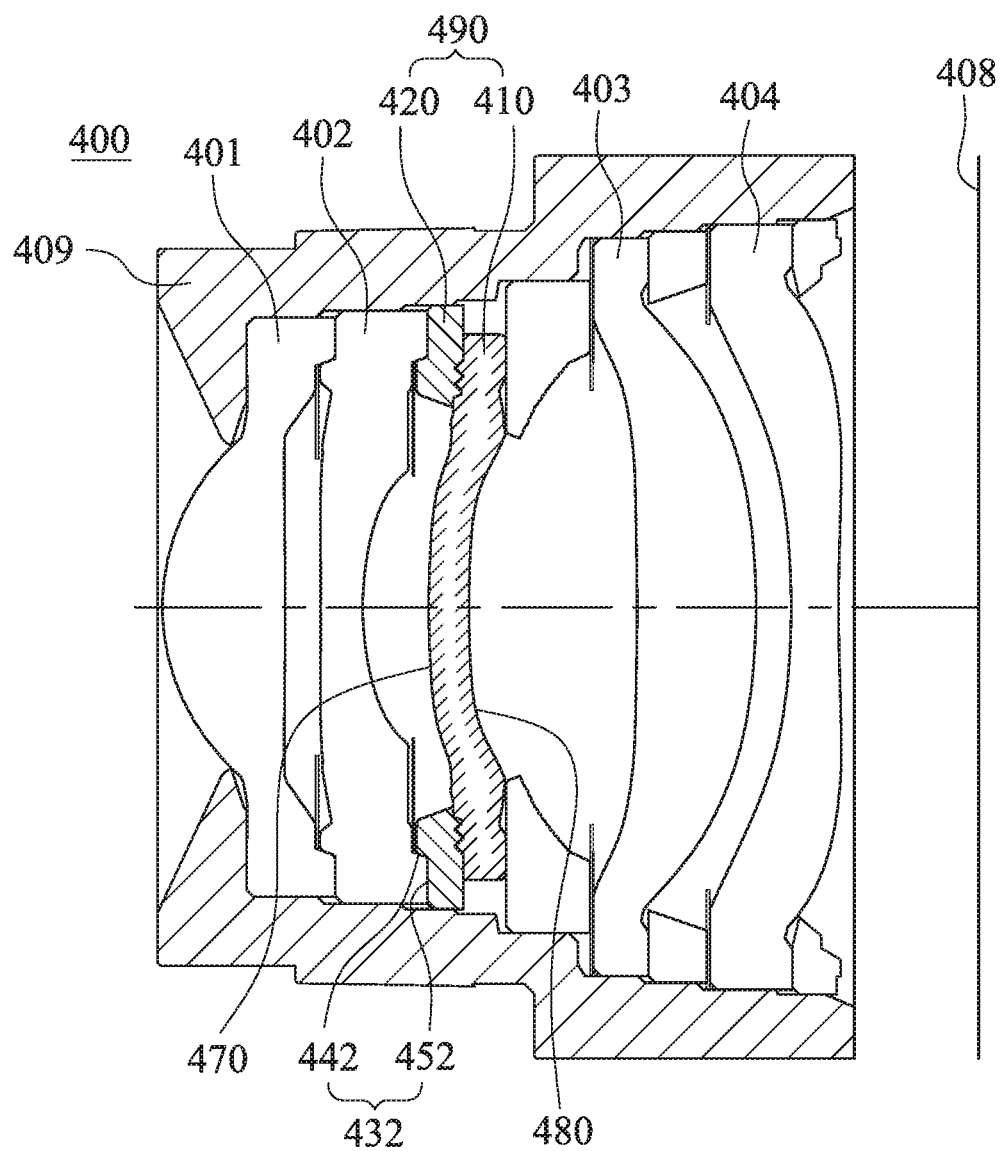
FIG. 4A is a schematic view of an optical lens assembly according to the 4th embodiment of the present disclosure.

FIG. 4A is a schematic view of an optical lens assembly 400 according to the 4th embodiment of the present disclosure. In FIG. 4A, the optical lens assembly 400 includes a dual molded lens element 490, wherein the dual molded lens element 490 includes a light transmitting portion 410 and a light absorbing portion 420.

Figure 4B:
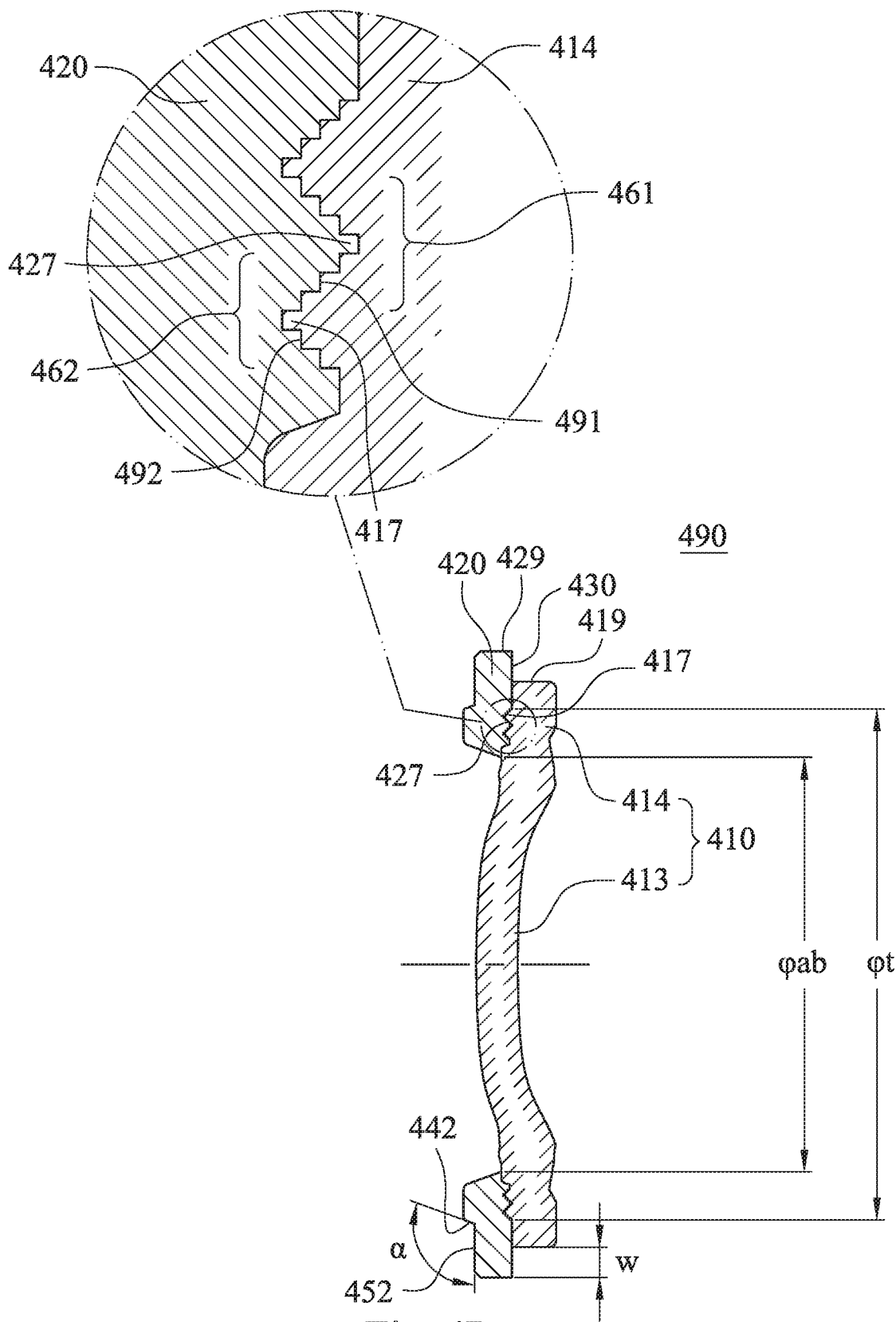
FIG. 4B is a schematic view of a dual molded lens element according to the 4th embodiment.

FIG. 4B is a schematic view of the dual molded lens element 490 according to the 4th embodiment. In FIG. 4A and FIG. 4B, the light transmitting portion 410 includes an effective optical section 413 and a peripheral section 414. The peripheral section 414 surrounds the effective optical section 413, wherein an incident light passes through the effective optical section 413 and forms an image on an image surface 408. The effective optical section 413 can include a planar surface or an aspheric surface with any curvature, wherein it would affect imaging properties by blocking the effective optical section 413.

The light absorbing portion 420 is located on at least one of an object-side surface 470 and an image-side surface 480 of the dual molded lens element 490 (the light absorbing portion 420 is located on the object-side surface 470 in the 4th embodiment), wherein the object-side surface 470 is a surface of the dual molded lens element 490 facing an imaged object (not shown herein), and the image-side surface 480 is a surface of the dual molded lens element 490 facing the image surface 408. The light absorbing portion 420 is annular and surrounds a central axis of the dual molded lens element 490. A plastic material and a color of the light absorbing portion 420 are different from a plastic material and a color of the light transmitting portion 410. The dual molded lens element 490 is made by an injection molding method and formed integrally, wherein the dual molded lens element 490 including the light transmitting portion 410 and light absorbing portion 420 can be made by a dual-shot injection molding method or a dual-shot molding method. Regarding the dual molded lens element 490 in the 4th embodiment, the plastic material of the light absorbing portion 420 has the feature of absorbing visible light, and the color of the light absorbing portion 420 is black. The plastic material of the light transmitting portion 410 has the feature of being transmitted by visible light, and the color of the light transmitting portion 410 is transparent and colorless. Hence, the plastic material and the color of the light absorbing portion 420 are different from the plastic material and the color of the light transmitting portion 410. In other embodiments (not shown herein), a light absorbing portion can be located on an image-side surface of a dual molded lens element, or both of an object-side surface and the image-side surface of the dual molded lens element.

Figure 4C:
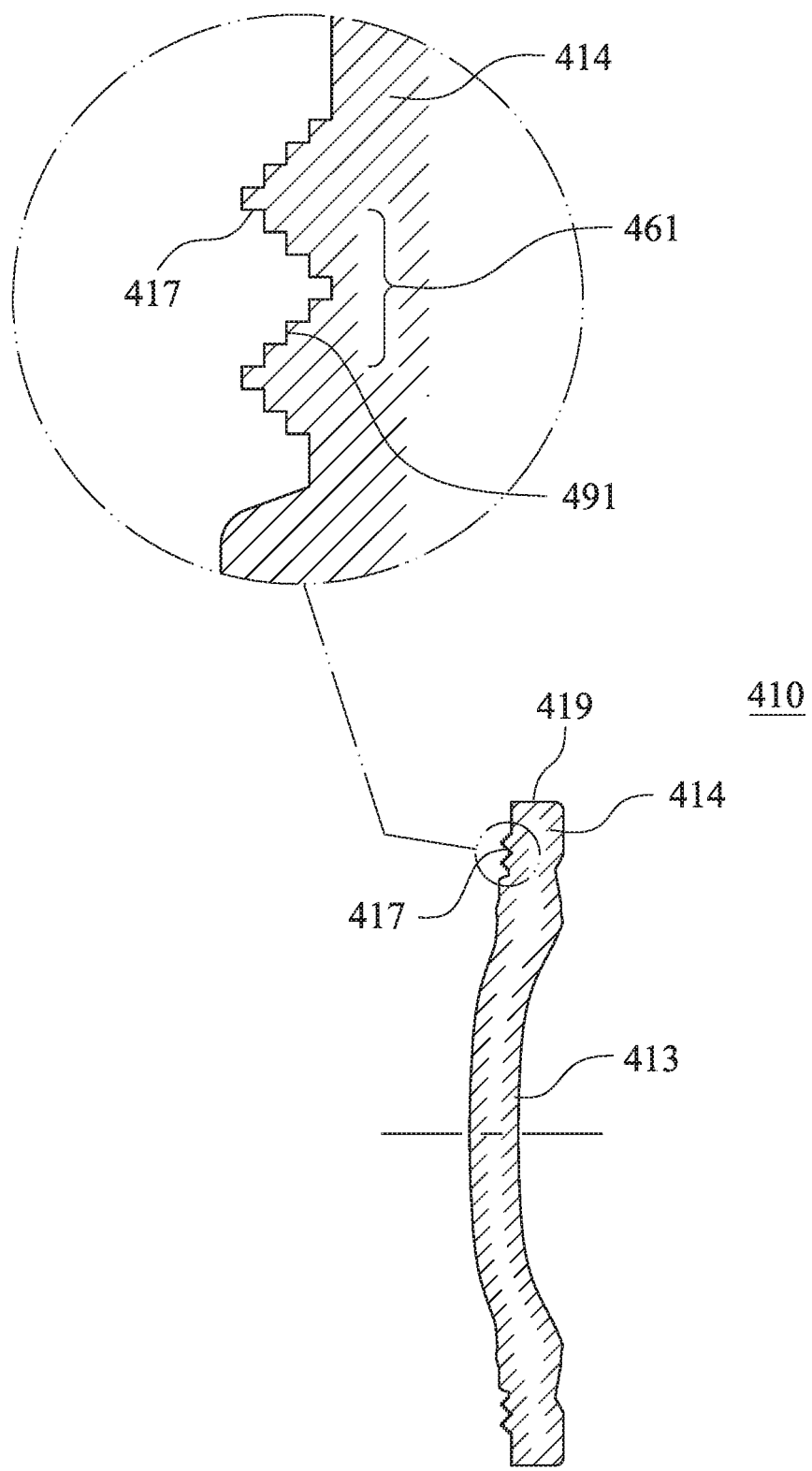
FIG. 4C is a schematic view of a light transmitting portion according to the 4th embodiment.
Figure 4D:
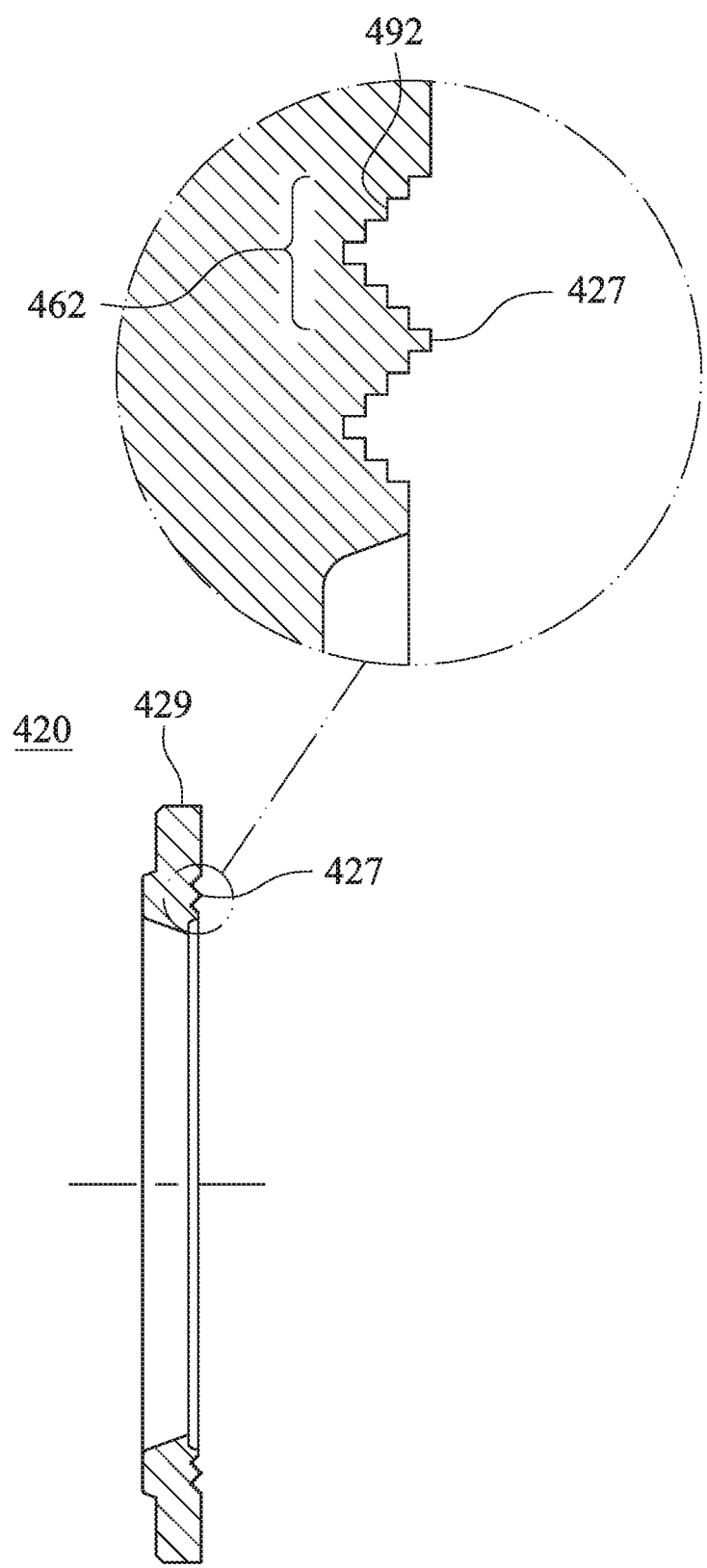
FIG. 4D is a schematic view of a light absorbing portion according to the 4th embodiment.

FIG. 4C is a schematic view of the light transmitting portion 410 according to the 4th embodiment, and FIG. 4D is a schematic view of the light absorbing portion 420 according to the 4th embodiment. In FIG. 4B to FIG. 4D, the peripheral section 414 includes a plurality of first inner ring-shaped structures 417, wherein the first inner ring-shaped structures 417 are coaxially, or concentrically arranged with respect to the central axis of the dual molded lens element 490. The light absorbing portion 420 includes a plurality of second inner ring-shaped structures 427, wherein the second inner ring-shaped structures 427 are coaxially, or concentrically arranged with respect to the central axis, and the second inner ring-shaped structures 427 are disposed correspondingly to and connected to the first inner ring-shaped structures 417. Furthermore, one structure of the first inner ring-shaped structures 417 and the second inner ring-shaped structures 427 can be a ring-shaped structure of a continuous protrusion, which is a pre-arranged ring, or can be a ring-shaped structure including a plurality of protrusion structures and a plurality of spacing structures, which are arranged as a ring shape.

In FIG. 4B, when an outer diameter of one of the first inner ring-shaped structures 417 having a greatest outer diameter is φt, and a greatest inner diameter of the light absorbing portion 420 is Tab, the following condition is satisfied: 1.0<φt/φab<2.5. Therefore, it is favorable for reducing the reflected stray light in the optical lens assembly 400, and maintaining the structural strength of the dual molded lens element 490 with the compact size so as to achieve the better optical quality after an injection molding process. Preferably, the following condition can be satisfied: 1.05<φt/φab<2.0.

In detail, in FIG. 4B to FIG. 4D, the dual molded lens element 490 can be made by a dual-shot injection molding method. Therefore, it is favorable for ensuring the dimensional accuracy of the optical element, such as the dual molded lens element 490, and reducing the assembling tolerance of the optical lens assembly 400.

At least one annular groove 461 can be formed on the first inner ring-shaped structures 417, wherein the annular groove 461 includes a plurality of stepped surfaces 491. At least one annular groove 462 can be formed on the second inner ring-shaped structures 427, wherein the annular groove 462 includes a plurality of stepped surfaces 492. Therefore, the first inner ring-shaped structures 417 and the second inner ring-shaped structures 427 can be achieved by an easier machining process. The appearance stability of the micro structures thereof can be maintained, so that the molding can meet the expected result of the design drawing.

A number of the stepped surfaces 491 of the annular groove 461 can be greater than or equal to 4, and smaller than or equal to 14, wherein the stepped surfaces 491 are the surfaces orthogonal to the central axis on the annular groove 461 specifically. A number of the stepped surfaces 492 of the annular groove 462 can be greater than or equal to 4, and smaller than or equal to 14, wherein the stepped surfaces 492 are the surfaces orthogonal to the central axis on the annular groove 462 specifically. Therefore, the annular grooves 461 and 462 can have more obvious stepped surfaces so as to ensure the effectiveness of attenuating the stray light.

In the 4th embodiment, a number of the first inner ring-shaped structures 417 is two, and a number of the annular groove 461 is two. The two annular grooves 461 are respectively formed on two sides of one of the first inner ring-shaped structures 417, which is farther from an outer annular surface 419, wherein a number of the stepped surfaces 491 of the annular groove 461 closer to the outer annular surface 419 is 7, and a number of the stepped surfaces 491 of the annular groove 461 farther from the outer annular surface 419 is 3. A number of the second inner ring-shaped structures 427 is two, and a number of the annular groove 462 is two. The two annular grooves 462 are respectively formed on two sides of one of the second inner ring-shaped structures 427, which is closer to an outer annular surface 429, wherein a number of the stepped surfaces 492 of the annular groove 462 closer to the outer annular surface 429 is 7, and a number of the stepped surfaces 492 of the annular groove 462 farther from the outer annular surface 429 is 6.

In the 4th embodiment, the dual molded lens element 490 is made by the dual-shot injection molding method, wherein each structure of the first inner ring-shaped structures 417 and the second inner ring-shaped structures 427 is a ring-shaped structure of a continuous protrusion, which is a pre-arranged ring, and the first inner ring-shaped structures 417 as a whole are corresponding to the second inner ring-shaped structures 427 as a whole. The first inner ring-shaped structures 417 are respectively corresponding to the annular grooves 462, and the second inner ring-shaped structures 427 are respectively corresponding to the annular grooves 461.

In FIG. 4A, a number of lens elements of the optical lens assembly 400 is at least two, wherein one of the lens elements is the dual molded lens element 490. The optical lens assembly 400 includes lens elements 401, 402, the dual molded lens element 490, lens elements 403, 404 and the image surface 408 in order from an object side to an image side. The optical lens assembly 400 has a total of five lens elements (401, 402, 490, 403, 404), wherein the lens elements 401, 402, the dual molded lens element 490, the lens elements 403 and 404 are disposed along an optical axis (i.e. the central axis of the dual molded lens element 490) in a plastic barrel 409. In other embodiments (not shown herein), the optical lens assembly can have a total of four, six, seven or more lens elements.

In FIG. 4A and FIG. 4B, a flat surface 430 is located between the outer annular surface 419 of the peripheral section 414 and the outer annular surface 429 of the light absorbing portion 420, wherein the flat surface 430 surrounds and is orthogonal to the central axis, and the flat surface 430 is located on the light absorbing portion 420. A width of the flat surface 430 is w, and the parameter w can also be said as a length in a radial direction of the central axis of the flat surface 430. The effective optical section 413 includes two aspheric surfaces, which are respectively a region of the effective optical section 413 located on the object-side surface 470 and a region of the effective optical section 413 located on the image-side surface 480 of the dual molded lens element 490.

A connecting structure 432 can be located on at least one of the peripheral section 414 and the light absorbing portion 420 of the dual molded lens element 490. The connecting structure 432 includes a connecting surface 442 and a receiving surface 452, wherein the connecting surface 442 is an annular conical surface with respect to the central axis, and the receiving surface 452 is orthogonal to the central axis and farther from the central axis than the connecting surface 442 is from the central axis. The connecting structure 432 is connected to the lens element 402, which is adjacent to the dual molded lens element 490, and the connecting structure 432 is for the dual molded lens element 490 and the lens element 402 both aligned with the central axis. Therefore, better alignment accuracies of both the dual molded lens element 490 and the lens element 402 can be achieved by the dimensional accuracy of the connecting structure 432. Furthermore, it is favorable for the dual molded lens element 490 to be applicable to the high-end optical lens assembly 400, wherein the high-end specifications of the optical lens assembly 400 may include larger stop, high MTF (Modulation Transfer Function), more uniform refractive index of the lens element and etc.

When an angle between the connecting surface 442 and the receiving surface 452 is a, the following condition can be satisfied: 95 degrees<α<135 degrees. Therefore, it is favorable for reducing assembling failure of the optical lens assembly 400 and maintaining better molding efficiency of the dual molded lens element 490.

The connecting structure 432 can be located on the light absorbing to portion 420. Therefore, it is favorable for effectively attenuating the stray light passed through the lens elements.

The data of the aforementioned parameters of the optical lens assembly 400 according to the 4th embodiment of the present disclosure are listed in the following Table 4, wherein the parameters are also shown as FIG. 4B.

TABLE 4

| 4th Embodiment | | | |
|---|---|---|---|
| w (mm) | 0.21 | φab (mm) | 2.9 |
| α (degrees) | 110 | φt/φab | 1.23 |
| φt (mm) | 3.57 | | |

5th Embodiment

Figure 5A:
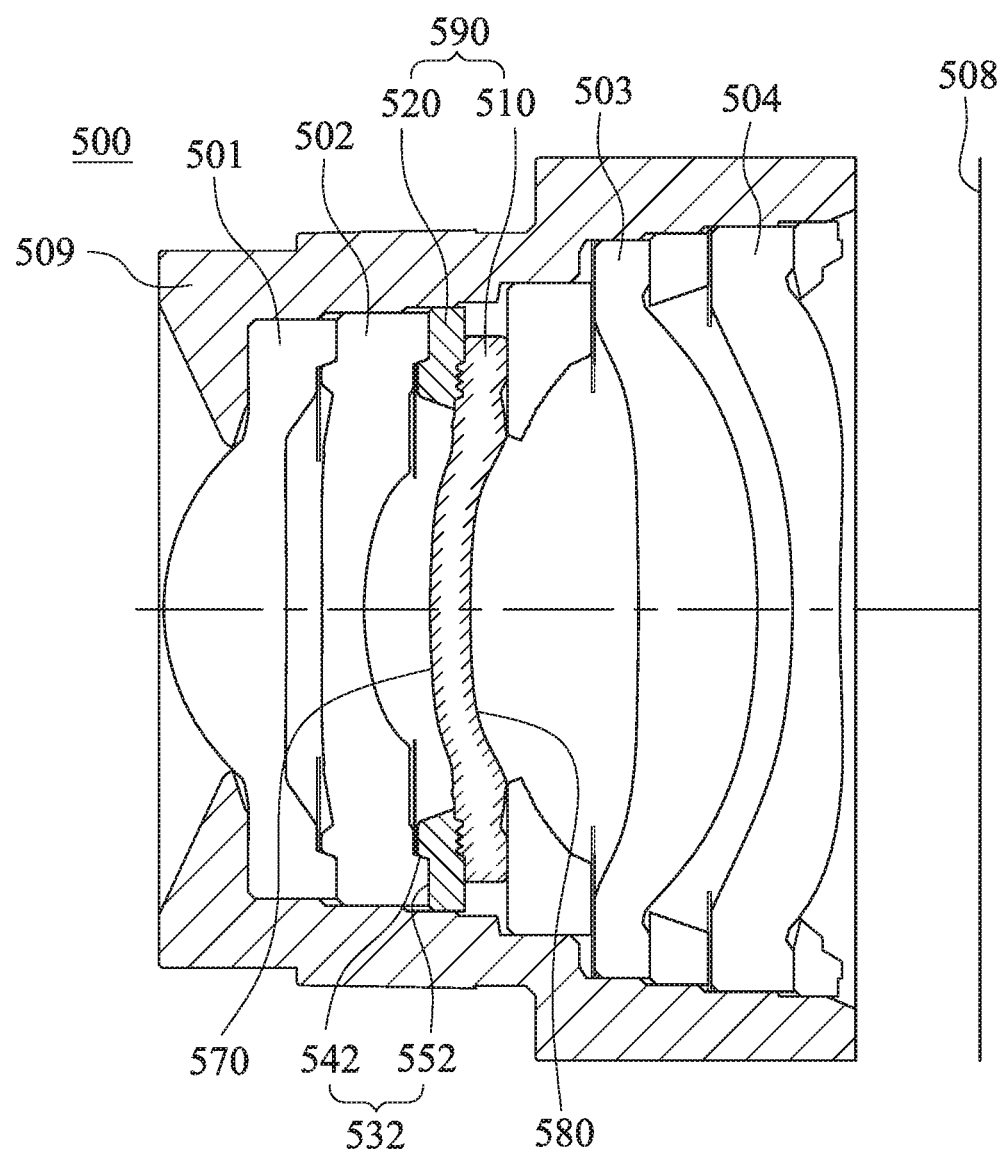
FIG. 5A is a schematic view of an optical lens assembly according to the 5th embodiment of the present disclosure.

FIG. 5A is a schematic view of an optical lens assembly 500 according to the 5th embodiment of the present disclosure. In FIG. 5A, the optical lens assembly 500 includes a dual molded lens element 590, wherein the dual molded lens element 590 includes a light transmitting portion 510 and a light absorbing portion 520.

Figure 5B:
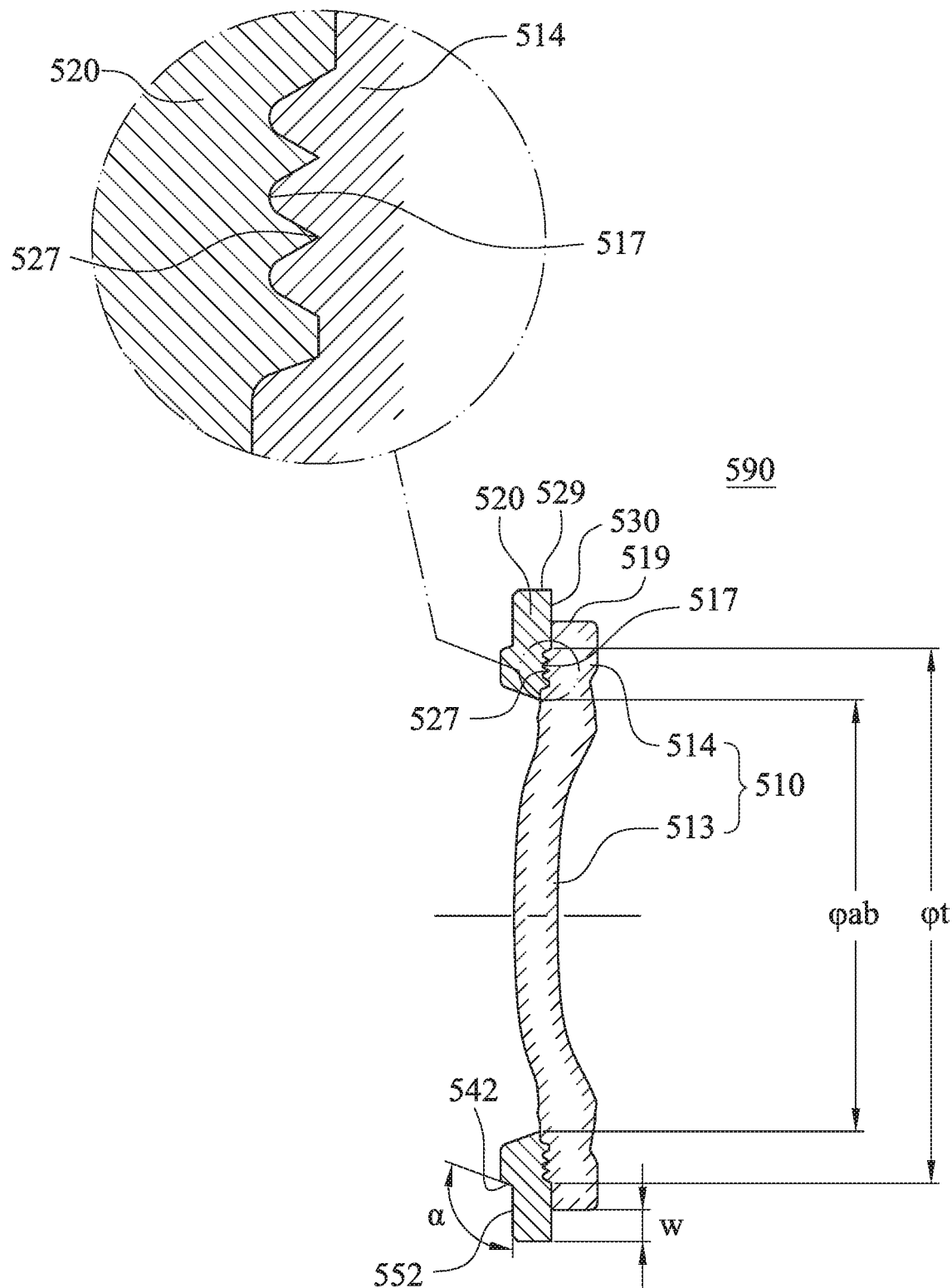
FIG. 5B is a schematic view of a dual molded lens element according to the 5th embodiment.

FIG. 5B is a schematic view of the dual molded lens element 590 according to the 5th embodiment. In FIG. 5A and FIG. 5B, the light transmitting portion 510 includes an effective optical section 513 and a peripheral section 514. The peripheral section 514 surrounds the effective optical section 513, wherein an incident light passes through the effective optical section 513 and forms an image on an image surface 508. The effective optical section 513 can include a planar surface or an aspheric surface with any curvature, wherein it would affect imaging properties by blocking the effective optical section 513.

The light absorbing portion 520 is located on an object-side surface 570 of the dual molded lens element 590, wherein the object-side surface 570 is a surface of the dual molded lens element 590 facing an imaged object (not shown herein), and an image-side surface 580 is a surface of the dual molded lens element 590 facing the image surface 508. The light absorbing portion 520 is annular and surrounds a central axis of the dual molded lens element 590. A plastic material of the light absorbing portion 520 has the feature of absorbing visible light, and a color of the light absorbing portion 520 is black. A plastic material of the light transmitting portion 510 has the feature of being transmitted by visible light, and a color of the light transmitting portion 510 is transparent and colorless. Hence, the plastic material and the color of the light absorbing portion 520 are different from the plastic material and the color of the light transmitting portion 510. The dual molded lens element 590 is made by an injection molding method and formed integrally.

Figure 5C:
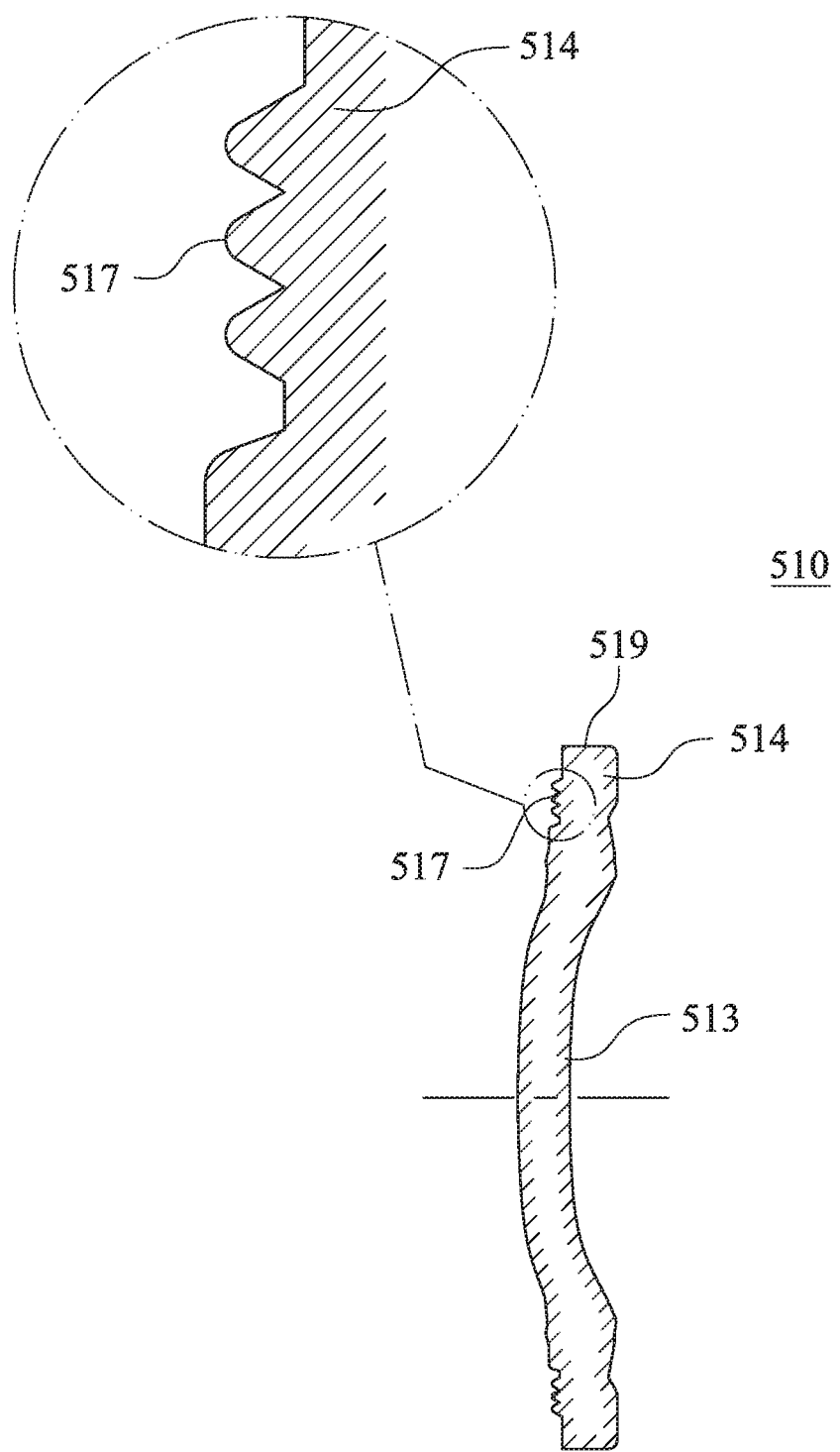
FIG. 5C is a schematic view of a light transmitting portion according to the 5th embodiment.
Figure 5D:
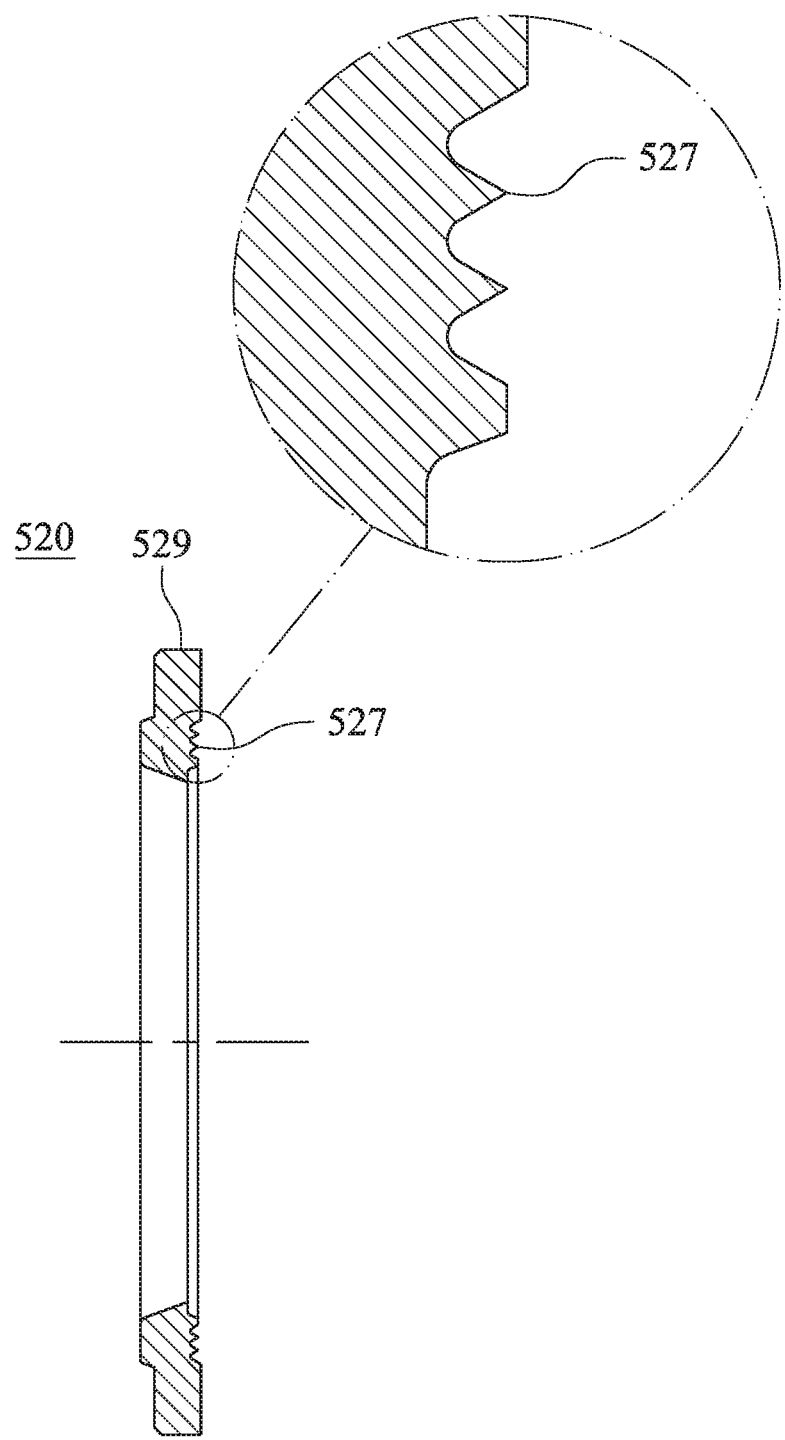
FIG. 5D is a schematic view of a light absorbing portion according to the 5th embodiment.

FIG. 5C is a schematic view of the light transmitting portion 510 according to the 5th embodiment, and FIG. 5D is a schematic view of the light absorbing portion 520 according to the 5th embodiment. In FIG. 5B to FIG. 5D, the peripheral section 514 includes a plurality of first inner ring-shaped structures 517, wherein the first inner ring-shaped structures 517 are coaxially arranged with respect to the central axis of the dual molded lens element 590. The light absorbing portion 520 includes a plurality of second inner ring-shaped structures 527, wherein the second inner ring-shaped structures 527 are coaxially arranged with respect to the central axis, and the second inner ring-shaped structures 527 are disposed correspondingly to and connected to the first inner ring-shaped structures 517.

In detail, the dual molded lens element 590 is made by a dual-shot injection molding method, wherein each structure of the first inner ring-shaped structures 517 and the second inner ring-shaped structures 527 is a ring-shaped structure of a continuous protrusion, which is a pre-arranged ring, and the first inner ring-shaped structures 517 as a whole are corresponding to the second inner ring-shaped structures 527 as a whole. The first inner ring-shaped structures 517 are respectively corresponding to a plurality of annular grooves (its reference numeral is omitted) on the light absorbing portion 520, wherein each of the annular grooves can be located between two of the second inner ring-shaped structures 527 which are adjacent to each other. The second inner ring-shaped structures 527 are respectively corresponding to a plurality of annular grooves (its reference numeral is omitted) on the light transmitting portion 510, wherein each of the annular grooves can be located between two of the first inner ring-shaped structures 517 which are adjacent to each other.

In FIG. 5A, the optical lens assembly 500 includes lens elements 501, 502, the dual molded lens element 590, lens elements 503, 504 and the image surface 508 in order from an object side to an image side. The optical lens assembly 500 has a total of five lens elements (501, 502, 590, 503, 504), wherein the lens elements 501, 502, the dual molded lens element 590, the lens elements 503 and 504 are disposed along an optical axis (i.e. the central axis of the dual molded lens element 590) in a plastic barrel 509.

In FIG. 5A and FIG. 5B, a flat surface 530 is located between an outer annular surface 519 of the peripheral section 514 and an outer annular surface 529 of the light absorbing portion 520, wherein the flat surface 530 surrounds and is orthogonal to the central axis, and the flat surface 530 is located on the light absorbing portion 520. The effective optical section 513 includes two aspheric surfaces, which are respectively a region of the effective optical section 513 located on the object-side surface 570 and a region of the effective optical section 513 located on the image-side surface 580 of the dual molded lens element 590.

A connecting structure 532 is located on the light absorbing portion 520 of the dual molded lens element 590. The connecting structure 532 includes a connecting surface 542 and a receiving surface 552, wherein the connecting surface 542 is an annular conical surface with respect to the central axis, and the receiving surface 552 is orthogonal to the central axis and farther from the central axis than the connecting surface 542 is from the central axis. The connecting structure 532 is connected to the lens element 502, which is adjacent to the dual molded lens element 590, and the connecting structure 532 is for the dual molded lens element 590 and the lens element 502 both aligned with the central axis.

The data of the parameters w, α, φt, φab and φt/φab of the optical lens assembly 500 according to the 5th embodiment of the present disclosure are listed in the following Table 5, wherein the parameters are also shown as FIG. 5B. The definitions of these parameters shown in Table 5 are the same as those stated in the optical lens assembly 400 of the 4th embodiment with corresponding values for the optical lens assembly 500.

TABLE 5

| 5th Embodiment | | | |
|---|---|---|---|
| w (mm) | 0.21 | φab (mm) | 2.9 |
| α (degrees) | 110 | φt/φab | 1.24 |
| φt (mm) | 3.59 | | |

6th Embodiment

Figure 6A:
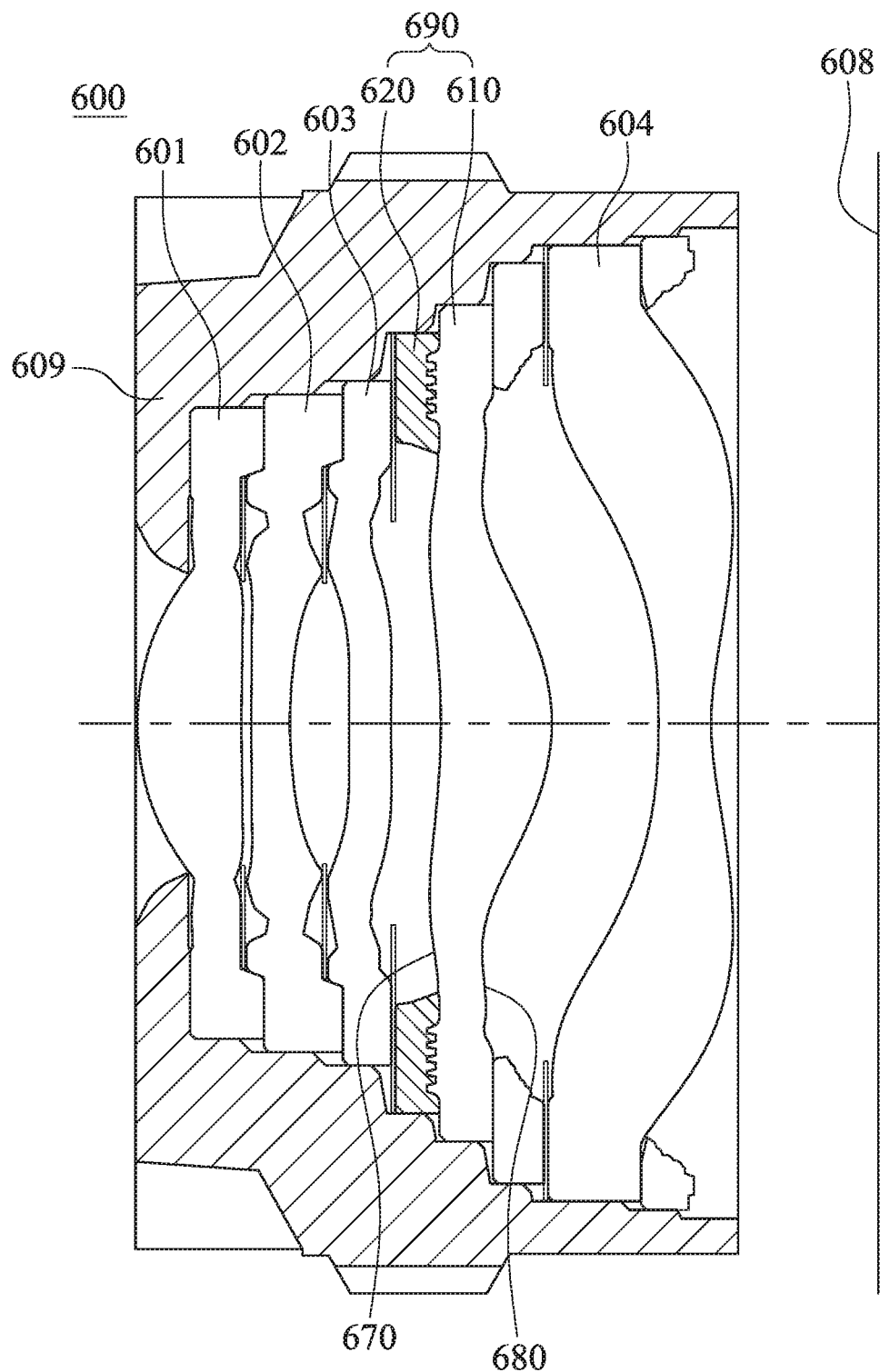
FIG. 6A is a schematic view of an optical lens assembly according to the 6th embodiment of the present disclosure.

FIG. 6A is a schematic view of an optical lens assembly 600 according to the 6th embodiment of the present disclosure. In FIG. 6A, the optical lens assembly 600 includes a dual molded lens element 690, wherein the dual molded lens element 690 includes a light transmitting portion 610 and a light absorbing portion 620.

Figure 6B:
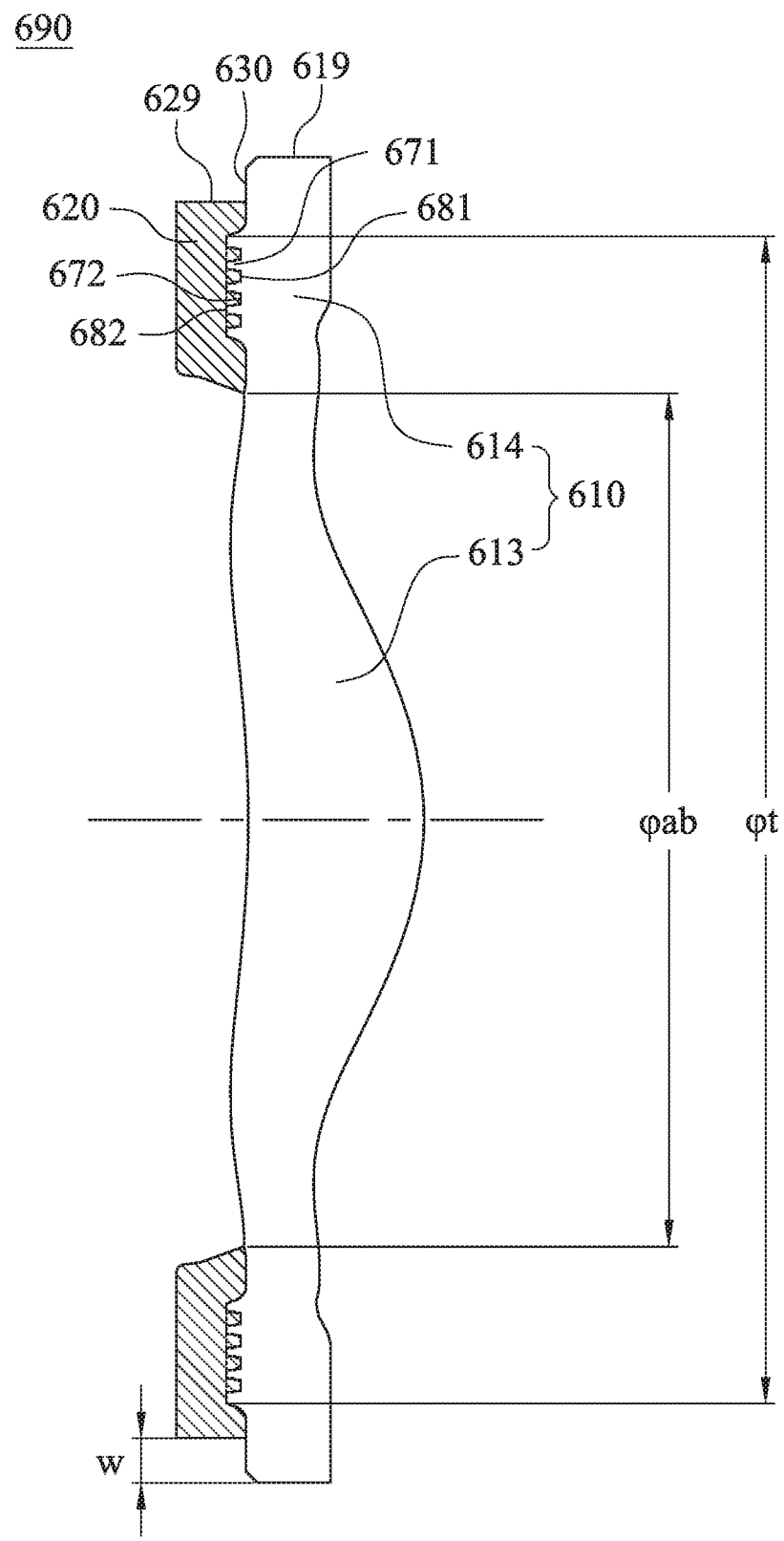
FIG. 6B is a schematic view of a dual molded lens element according to the 6th embodiment.

FIG. 6B is a schematic view of the dual molded lens element 690 according to the 6th embodiment. In FIG. 6A and FIG. 6B, the light transmitting portion 610 includes an effective optical section 613 and a peripheral section 614. The peripheral section 614 surrounds the effective optical section 613, wherein an incident light passes through the effective optical section 613 and forms an image on an image surface 608. The effective optical section 613 can include a planar surface or an aspheric surface with any curvature, wherein it would affect imaging properties by blocking the effective optical section 613.

The light absorbing portion 620 is located on an object-side surface 670 of the dual molded lens element 690, wherein the object-side surface 670 is a surface of the dual molded lens element 690 facing an imaged object (not shown herein), and an image-side surface 680 is a surface of the dual molded lens element 690 facing the image surface 608. The light absorbing portion 620 is annular and surrounds a central axis of the dual molded lens element 690. A plastic material of the light absorbing portion 620 has the feature of absorbing visible light, and a color of the light absorbing portion 620 is black. A plastic material of the light transmitting portion 610 has the feature of being transmitted by visible light, and a color of the light transmitting portion 610 is transparent and colorless. Hence, the plastic material and the color of the light absorbing portion 620 are different from the plastic material and the color of the light transmitting portion 610. The dual molded lens element 690 is made by an injection molding method and formed integrally.

Figure 6C:
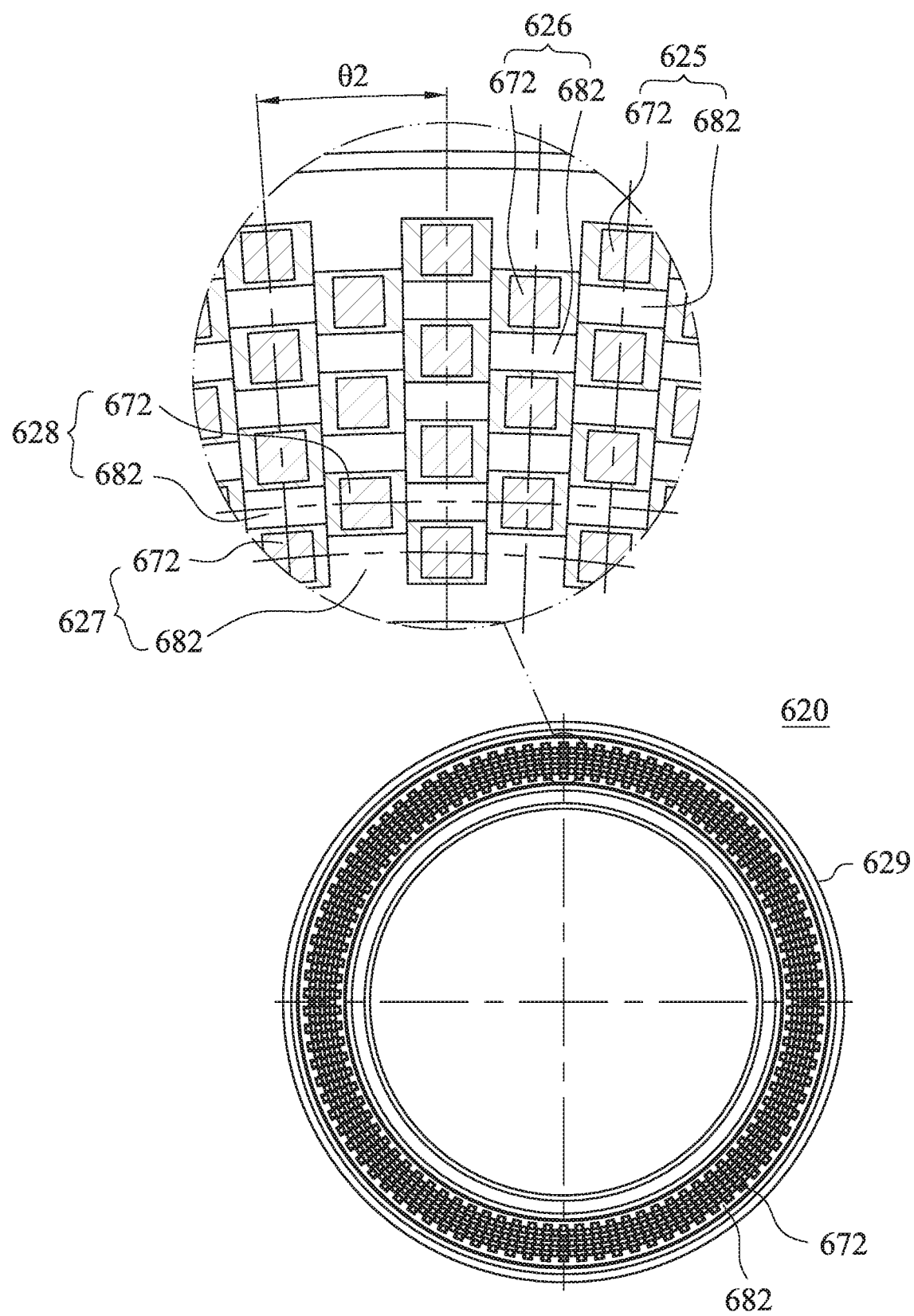
FIG. 6C is a plane view of a light absorbing portion according to the 6th embodiment.
Figure 6D:
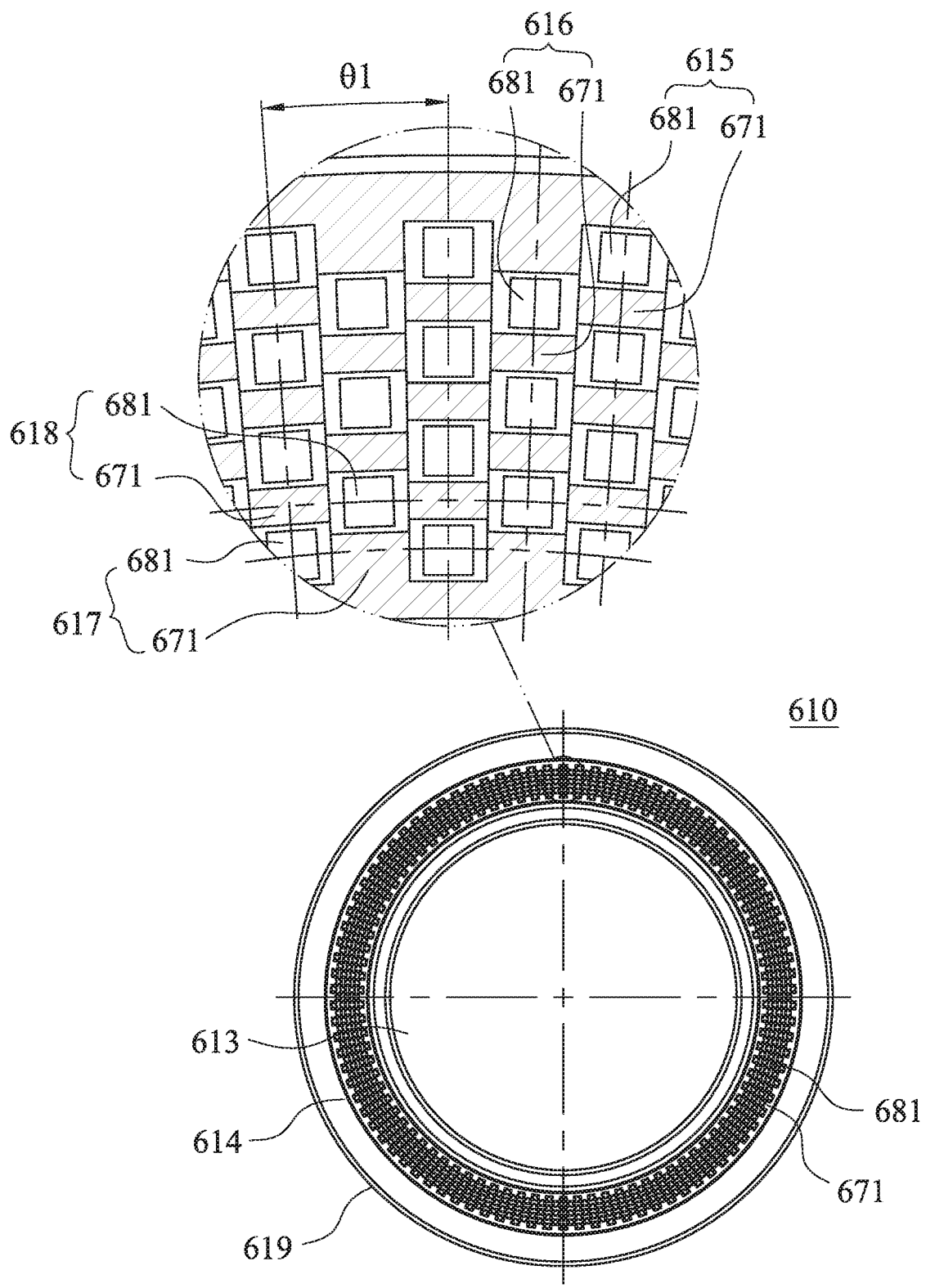
FIG. 6D is a plane view of a light transmitting portion according to the 6th embodiment.

FIG. 6C is a plane view of the light absorbing portion 620 according to the 6th embodiment, and FIG. 6D is a plane view of the light transmitting portion 610 according to the 6th embodiment. In FIG. 6B to FIG. 6D, the peripheral section 614 includes a plurality of first inner strip-shaped structures 615 and a plurality of first inner strip-shaped structures 616, wherein the first inner strip-shaped structures 615 and 616 are regularly arranged along a circumferential direction of the central axis of the dual molded lens element 690. The light absorbing portion 620 includes a plurality of second inner strip-shaped structures 625 and a plurality of second inner strip-shaped structures 626, wherein the second inner strip-shaped structures 625 and 626 are regularly arranged along the circumferential direction of the central axis, and the second inner strip-shaped structures 625 and 626 are disposed correspondingly to and connected to the first inner strip-shaped structures 615 and 616.

In detail, the dual molded lens element 690 is made by a dual-shot injection molding method. The peripheral section 614 of the light transmitting portion 610 further includes an outer annular surface 619. Each structure of the first inner strip-shaped structures 615 and 616 is disposed in a direction from the central axis towards the outer annular surface 619 of the peripheral section 614. The light absorbing portion 620 further includes an outer annular surface 629. Each structure of the second inner strip-shaped structures 625 and 626 is disposed in a direction from the central axis towards the outer annular surface 629 of the light absorbing portion 620.

In FIG. 6B and FIG. 6C, each structure of the second inner strip-shaped structures 625 and 626 includes a plurality of protrusion structures 672 and a plurality of spacing structures 682. Specifically, the protrusion structures 672 and the spacing structures 682 of each of the second inner strip-shaped structures 625 are arranged as a strip shape, and the protrusion structures 672 and the spacing structures 682 of each of the second inner strip-shaped structures 626 are arranged as a strip shape. Therefore, it is favorable for increasing the structural denseness of the second inner strip-shaped structures 625 and 626 being further arranged as two dimension so as to attenuate the stray light. In addition, the arrangements of the spacing structures 682 are beneficial to the injection molding method.

The protrusion structures 672 and the spacing structures 682 of each of the second inner strip-shaped structures 625 are alternately arranged as a strip shape. That is, each of the second inner strip-shaped structures 625 is as a strip shape, which is formed by the protrusion structures 672 and the spacing structures 682 thereof alternately arranged. The protrusion structures 672 and the spacing structures 682 of each of the second inner strip-shaped structures 626 are alternately arranged as a strip shape. That is, each of the second inner strip-shaped structures 626 is as a strip shape, which is formed by the protrusion structures 672 and the spacing structures 682 thereof alternately arranged. Therefore, the molding structures of the second inner strip-shaped structures 625 and 626 could agree with the design drawing, and the design for the machining equipment could be easier.

A number of the second inner strip-shaped structures 625 is greater than or equal to 80, and smaller than or equal to 320. A number of the second inner strip-shaped structures 626 is greater than or equal to 80, and smaller than or equal to 320. Therefore, it is favorable for balancing the stray light attenuation and the manufacturability of the dual molded lens element 690. In the 6th embodiment, the number of the second inner strip-shaped structures 625 is 90, and the number of the second inner strip-shaped structures 626 is 90.

In FIG. 6C and FIG. 6D, the dual molded lens element 690 is made by the dual-shot injection molding method, wherein the first inner strip-shaped structures 615 and 616 as a whole are corresponding to the second inner strip-shaped structures 625 and 626 as a whole. The protrusion structures 672 of the light absorbing portion 620 are corresponding to a plurality of spacing structures 681 of the light transmitting portion 610, and the spacing structures 682 of the light absorbing portion 620 are corresponding to a plurality of protrusion structures 671 of the light transmitting portion 610, wherein each structure of the protrusion structures 672 and the spacing structures 681 has stepped surfaces both in the circumferential direction and in a radial direction of the central axis. The second inner strip-shaped structures 625 and 626 are respectively corresponding to the first inner strip-shaped structures 615 and 616, wherein the protrusion structures 671 and the spacing structures 681 of each of the first inner strip-shaped structures 615 are arranged as a strip shape, and the protrusion structures 671 and the spacing structures 681 of each of the first inner strip-shaped structures 616 are arranged as a strip shape. The second inner strip-shaped structures 625 have the same geometric structures and are regularly arranged along the circumferential direction of the central axis of the dual molded lens element 690, and the first inner strip-shaped structures 615 correspondingly have the same geometric structures and are regularly arranged along the circumferential direction of the central axis, wherein the geometric structure of each of the first inner strip-shaped structures 615 is different from the geometric structure of each of the second inner strip-shaped structures 625. The second inner strip-shaped structures 626 have the same geometric structures and are regularly arranged along the circumferential direction of the central axis of the dual molded lens element 690, and the first inner strip-shaped structures 616 correspondingly have the same geometric structures and are regularly arranged along the circumferential direction of the central axis, wherein the geometric structure of each of the first inner strip-shaped structures 616 is different from the geometric structure of each of the second inner strip-shaped structures 626. A center-to-center spacing angle in the circumferential direction of the central axis between any two of the second inner strip-shaped structures 625 which are adjacent to each other is θ2, and a center-to-center spacing angle in the circumferential direction of the central axis between any two of the first inner strip-shaped structures 615 which are adjacent to each other is correspondingly θ1, wherein θ1=θ2. A center-to-center spacing angle in the circumferential direction of the central axis between any two of the second inner strip-shaped structures 626 which are adjacent to each other is θ2, and a center-to-center spacing angle in the circumferential direction of the central axis between any two of the first inner strip-shaped structures 616 which are adjacent to each other is correspondingly θ1, wherein θ1=θ2.

In FIG. 6A, the optical lens assembly 600 includes lens elements 601, 602, 603, the dual molded lens element 690, a lens element 604 and the image surface 608 in order from an object side to an image side. The optical lens assembly 600 has a total of five lens elements (601, 602, 603, 690, 604), wherein the lens elements 601, 602, 603, the dual molded lens element 690 and the lens element 604 are disposed along an optical axis (i.e. the central axis of the dual molded lens element 690) in a plastic barrel 609.

In FIG. 6A and FIG. 6B, a flat surface 630 is located between the outer annular surface 619 of the peripheral section 614 and the outer annular surface 629 of the light absorbing portion 620, wherein the flat surface 630 surrounds and is orthogonal to the central axis, and the flat surface 630 is located on the peripheral section 614. The effective optical section 613 includes two aspheric surfaces, which are respectively a region of the effective optical section 613 located on the object-side surface 670 and a region of the effective optical section 613 located on the image-side surface 680 of the dual molded lens element 690.

From another point of view, in FIG. 6B to FIG. 6D, the peripheral section 614 includes a plurality of first inner ring-shaped structures 617 and a plurality of first inner ring-shaped structures 618, wherein the first inner ring-shaped structures 617 and 618 are coaxially arranged with respect to the central axis of the dual molded lens element 690. The light absorbing portion 620 includes a plurality of second inner ring-shaped structures 627 and a plurality of second inner ring-shaped structures 628, wherein the second inner ring-shaped structures 627 and 628 are coaxially arranged with respect to the central axis, and the second inner ring-shaped structures 627 and 628 are disposed correspondingly to and connected to the first inner ring-shaped structures 817 and 618.

In detail, each of the first inner ring-shaped structures 617 includes the protrusion structures 671 and the spacing structures 681. Each of the first inner ring-shaped structures 618 includes the protrusion structures 671 and the spacing structures 681. Each of the second inner ring-shaped structures 627 includes the protrusion structures 672 and the spacing structures 682. Each of the second inner ring-shaped structures 628 includes the protrusion structures 672 and the spacing structures 682.

Each of the protrusion structures 671 of the first inner ring-shaped structures 617 is aligned with one of the spacing structures 681 of the first inner ring-shaped structures 618 which is adjacent to thereof along the radial direction of the central axis. Each of the spacing structures 681 of the first inner ring-shaped structures 617 is aligned with one of the protrusion structures 671 of the first inner ring-shaped structures 618 which is adjacent to thereof along the radial direction of the central axis. Each of the protrusion structures 672 of the second inner ring-shaped structures 627 is aligned with one of the spacing structures 682 of the second inner ring-shaped structures 628 which is adjacent to thereof along the radial direction of the central axis. Each of the spacing structures 682 of the second inner ring-shaped structures 627 is aligned with one of the protrusion structures 672 of the second inner ring-shaped structures 628 which is adjacent to thereof along the radial direction of the central axis.

The protrusion structures 671 and the spacing structures 681 of the first inner ring-shaped structures 617 are alternately arranged as a ring shape. The protrusion structures 671 and the spacing structures 681 of the first inner ring-shaped structures 618 are alternately arranged as a ring shape. The protrusion structures 672 and the spacing structures 682 of the second inner ring-shaped structures 627 are alternately arranged as a ring shape. The protrusion structures 672 and the spacing structures 682 of the second inner ring-shaped structures 628 are alternately arranged as a ring shape.

In the 6th embodiment, in FIG. 6C and FIG. 6D, the dual molded lens element 690 is made by the dual-shot injection molding method, wherein the first inner ring-shaped structures 617 and 618 as a whole are corresponding to the second inner ring-shaped structures 627 and 628 as a whole. The protrusion structures 672 of the light absorbing portion 620 are corresponding to the spacing structures 681 of the light transmitting portion 610, and the spacing structures 682 of the light absorbing portion 620 are corresponding to the protrusion structures 671 of the light transmitting portion 610, wherein each structure of the protrusion structures 672 and the spacing structures 681 has stepped surfaces both in the circumferential direction and in the radial direction of the central axis. The second inner ring-shaped structures 627 and 628 are respectively corresponding to the first inner ring-shaped structures 617 and 618.

The data of the parameters θ1, θ2, w, φt, φab and φt/φab of the optical lens assembly 600 according to the 6th embodiment of the present disclosure are listed in the following Table 6, wherein the parameters are also shown as FIG. 6B to FIG. 6D. The definitions of these parameters shown in Table 6 are the same as those stated in the optical lens assembly 100 of the 1st embodiment and the optical lens assembly 400 of the 4th embodiment with corresponding values for the optical lens assembly 600.

TABLE 6

| 6th Embodiment | | | |
|---|---|---|---|
| θ1 (degrees) | 4 | φt (mm) | 4.2 |
| θ2 (degrees) | 4 | φab (mm) | 3.07 |
| w (mm) | 0.16 | φt/φab | 1.37 |

7th Embodiment

Figure 7A:
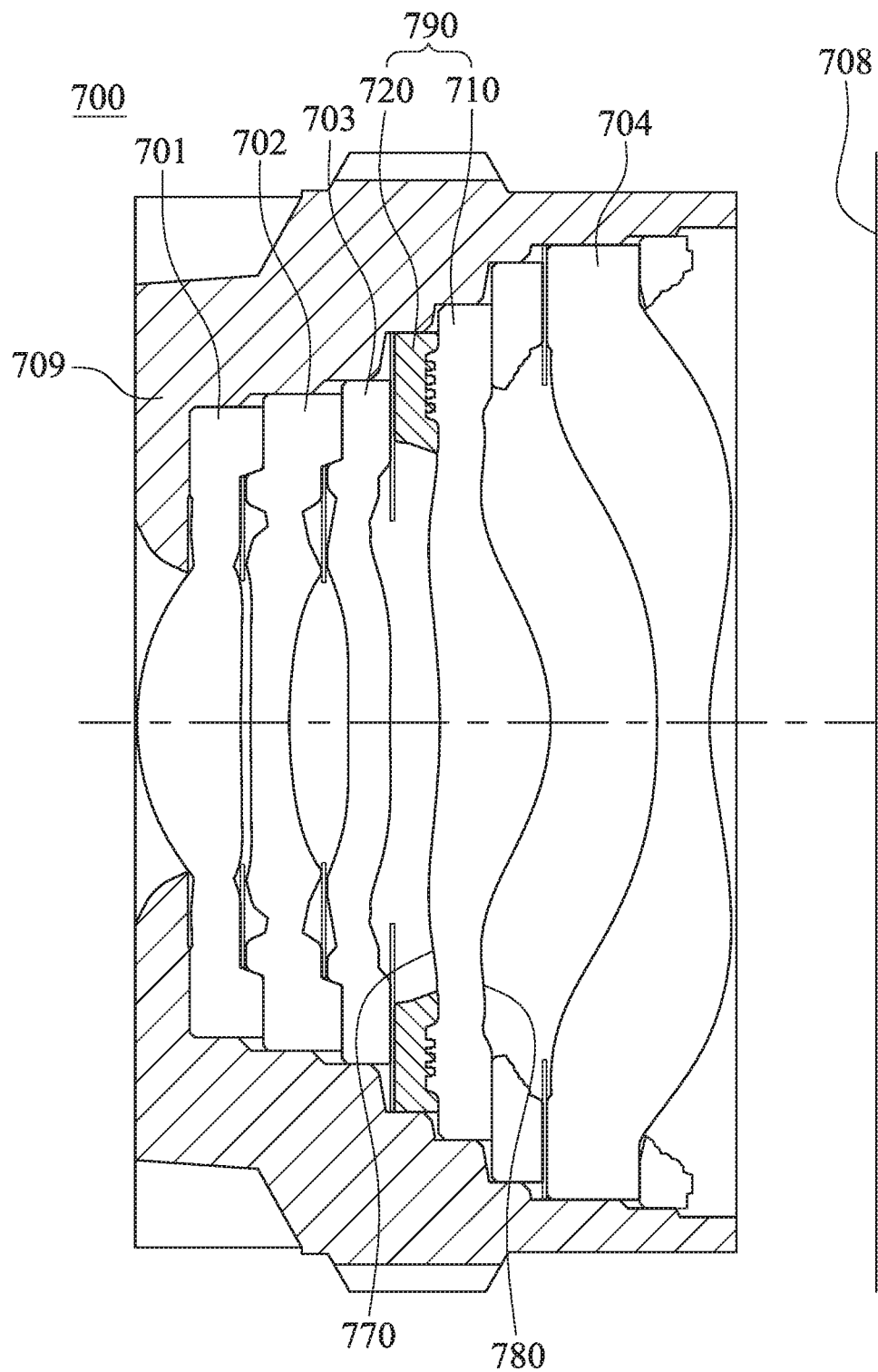
FIG. 7A is a schematic view of an optical lens assembly according to the 7th embodiment of the present disclosure.

FIG. 7A is a schematic view of an optical lens assembly 700 according to the 7th embodiment of the present disclosure. In FIG. 7A, the optical lens assembly 700 includes a dual molded lens element 790, wherein the dual molded lens element 790 includes a light transmitting portion 710 and a light absorbing portion 720.

Figure 7B:
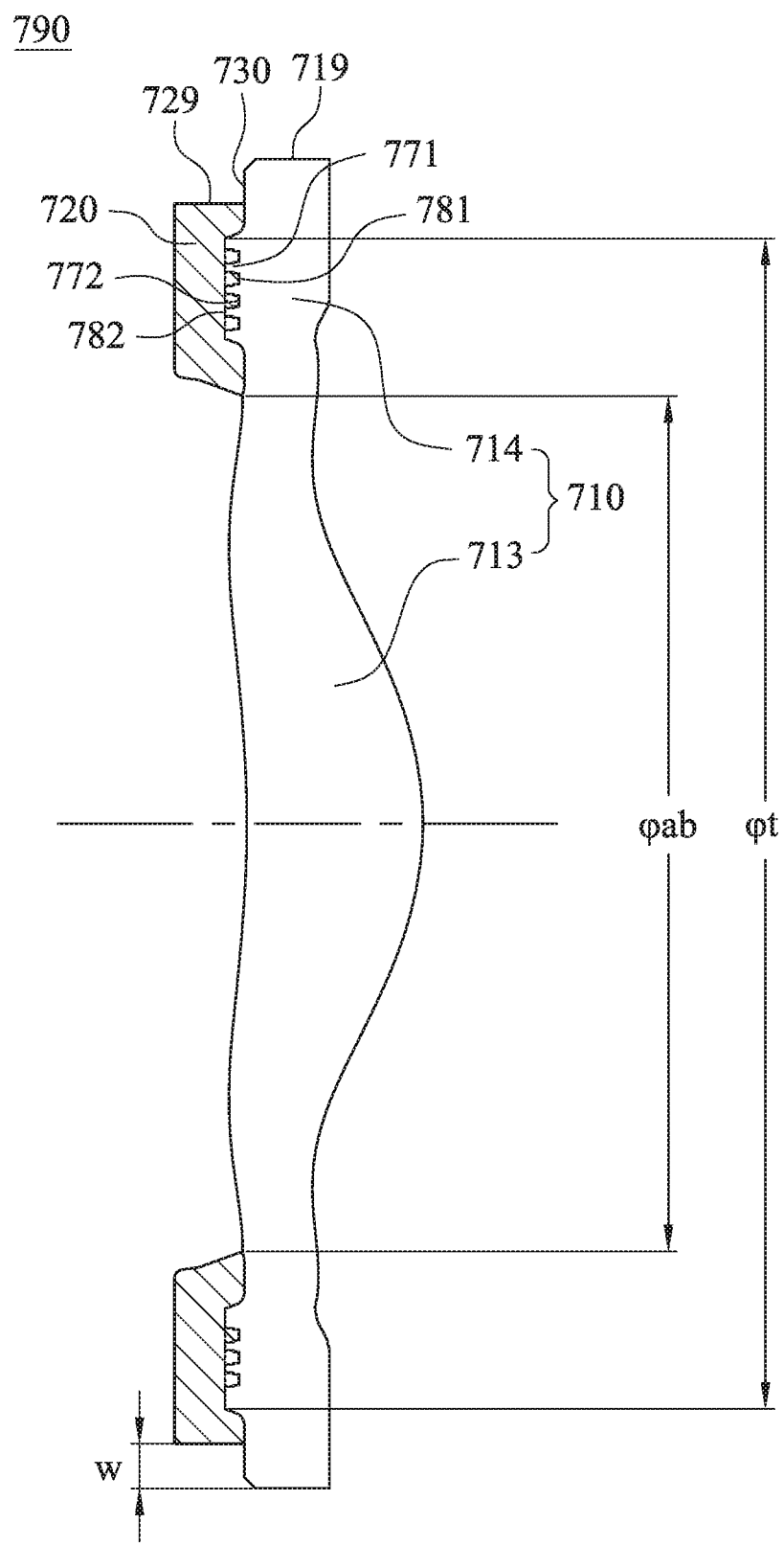
FIG. 7B is a schematic view of a dual molded lens element according to the 7th embodiment.

FIG. 7B is a schematic view of the dual molded lens element 790 according to the 7th embodiment. In FIG. 7A and FIG. 7B, the light transmitting portion 710 includes an effective optical section 713 and a peripheral section 714. The peripheral section 714 surrounds the effective optical section 713, wherein an incident light passes through the effective optical section 713 and forms an image on an image surface 708. The effective optical section 713 can include a planar surface or an aspheric surface with any curvature, wherein it would affect imaging properties by blocking the effective optical section 713.

The light absorbing portion 720 is located on an object-side surface 770 of the dual molded lens element 790, wherein the object-side surface 770 is a surface of the dual molded lens element 790 facing an imaged object (not shown herein), and an image-side surface 780 is a surface of the dual molded lens element 790 facing the image surface 708. The light absorbing portion 720 is annular and surrounds a central axis of the dual molded lens element 790. A plastic material of the light absorbing portion 720 has the feature of absorbing visible light, and a color of the light absorbing portion 720 is black. A plastic material of the light transmitting portion 710 has the feature of being transmitted by visible light, and a color of the light transmitting portion 710 is transparent and colorless. Hence, the plastic material and the color of the light absorbing portion 720 are different from the plastic material and the color of the light transmitting portion 710. The dual molded lens element 790 is made by an injection molding method and formed integrally.

Figure 7C:
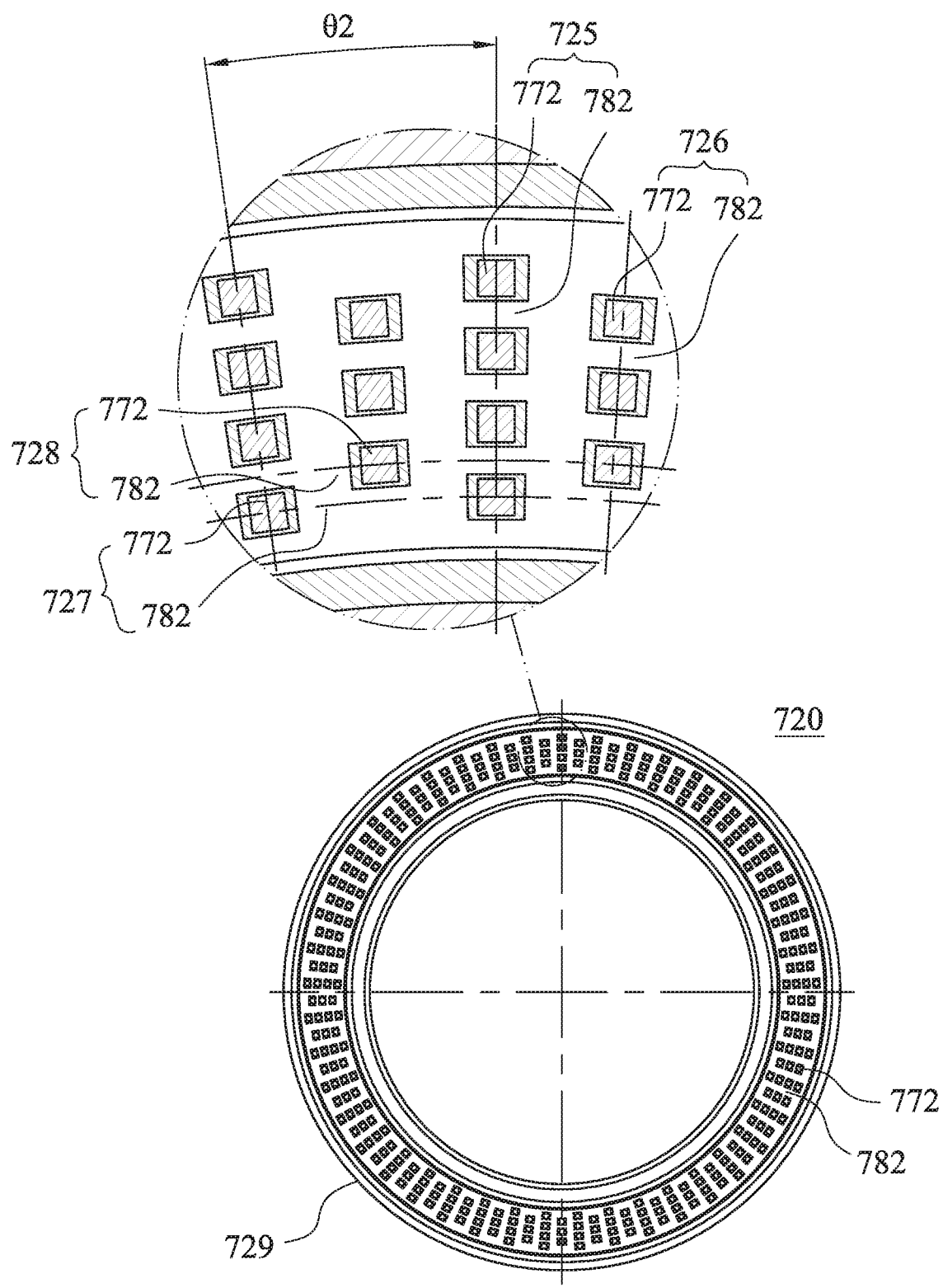
FIG. 7C is a plane view of a light absorbing portion according to the 7th embodiment.
Figure 7D:
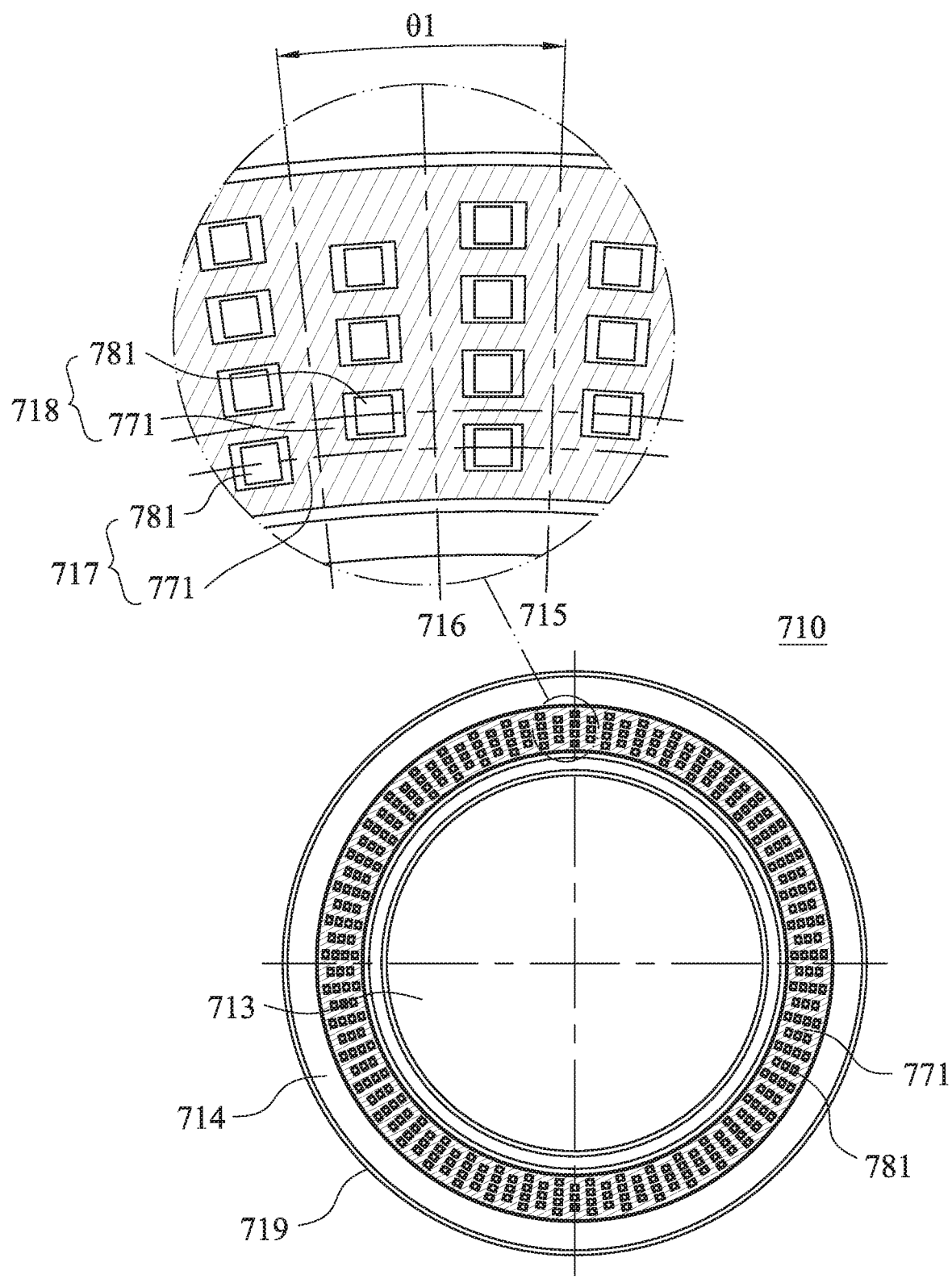
FIG. 7D is a plane view of a light transmitting portion according to the 7th embodiment.

FIG. 7C is a plane view of the light absorbing portion 720 according to the 7th embodiment, and FIG. 7D is a plane view of the light transmitting portion 710 according to the 7th embodiment. In FIG. 7B to FIG. 7D, the peripheral section 714 includes a plurality of first inner ring-shaped structures 717 and a plurality of first inner ring-shaped structures 718, wherein the first inner ring-shaped structures 717 and 718 are coaxially arranged with respect to the central axis of the dual molded lens element 790. The light absorbing portion 720 includes a plurality of second inner ring-shaped structures 727 and a plurality of second inner ring-shaped structures 728, wherein the second inner ring-shaped structures 727 and 728 are coaxially arranged with respect to the central axis, and the second inner ring-shaped structures 727 and 728 are disposed correspondingly to and connected to the first inner ring-shaped structures 717 and 718.

In detail, the dual molded lens element 790 is made by a dual-shot injection molding method.

At least one of each of the first inner ring-shaped structures 717, each of the first inner ring-shaped structures 718, each of the second inner ring-shaped structures 727 and each of the second inner ring-shaped structures 728 can include a plurality of protrusion structures and a plurality of spacing structures. Therefore, it is favorable for increasing the structural denseness of the first inner ring-shaped structures 717, 718, the second inner ring-shaped structures 727 and 728 being further arranged as two dimension so as to attenuate the stray light. In addition, the arrangements of the spacing structures are beneficial to the injection molding method. In the 7th embodiment, each of the first inner ring-shaped structures 717 includes a plurality of protrusion structures 771 and a plurality of spacing structures 781. Each of the first inner ring-shaped structures 718 includes the protrusion structures 771 and the spacing structures 781. Each of the second inner ring-shaped structures 727 includes a plurality of protrusion structures 772 and a plurality of spacing structures 782. Each of the second inner ring-shaped structures 728 includes the protrusion structures 772 and the spacing structures 782.

On the peripheral section 714, each of the protrusion structures 771 can be aligned with one of the spacing structures 781 which is adjacent to thereof along a radial direction of the central axis. On the light absorbing portion 720, each of the protrusion structures 772 can be aligned with one of the spacing structures 782 which is adjacent to thereof along the radial direction of the central axis. Therefore, it is favorable for increasing the contact area between the light absorbing portion 720 and the peripheral section 714 of the light transmitting portion 710. In the 7th embodiment, each of the protrusion structures 771 of the first inner ring-shaped structures 717 is aligned with one of the spacing structures 781 of the first inner ring-shaped structures 718 which is adjacent to thereof along the radial direction of the central axis. Each of the spacing structures 781 of the first inner ring-shaped structures 717 is aligned with one of the protrusion structures 771 of the first inner ring-shaped structures 718 which is adjacent to thereof along the radial direction of the central axis. Each of the protrusion structures 772 of the second inner ring-shaped structures 727 is aligned with one of the spacing structures 782 of the second inner ring-shaped structures 728 which is adjacent to thereof along the radial direction of the central axis. Each of the spacing structures 782 of the second inner ring-shaped structures 727 is aligned with one of the protrusion structures 772 of the second inner ring-shaped structures 728 which is adjacent to thereof along the radial direction of the central axis.

The protrusion structures 771 and the spacing structures 781 can be alternately arranged as a plurality of ring shapes, and the protrusion structures 772 and the spacing structures 782 can be alternately arranged as a plurality of ring shapes. Therefore, it is favorable for further increasing the contact area between the light absorbing portion 720 and the peripheral section 714 of the light transmitting portion 710. In the 7th embodiment, the protrusion structures 771 and the spacing structures 781 of the first inner ring-shaped structures 717 are alternately arranged as a ring shape. The protrusion structures 771 and the spacing structures 781 of the first inner ring-shaped structures 718 are alternately arranged as a ring shape. The protrusion structures 772 and the spacing structures 782 of the second inner ring-shaped structures 727 are alternately arranged as a ring shape. The protrusion structures 772 and the spacing structures 782 of the second inner ring-shaped structures 728 are alternately arranged as a ring shape.

In the 7th embodiment, in FIG. 7C and FIG. 7D, the dual molded lens element 790 is made by the dual-shot injection molding method, wherein the first inner ring-shaped structures 717 and 718 as a whole are corresponding to the second inner ring-shaped structures 727 and 728 as a whole. The protrusion structures 772 of the light absorbing portion 720 are corresponding to the spacing structures 781 of the light transmitting portion 710, and the spacing structures 782 of the light absorbing portion 720 are corresponding to the protrusion structures 771 of the light transmitting portion 710, wherein each structure of the protrusion structures 772 and the spacing structures 781 has stepped surfaces both in a circumferential direction and in the radial direction of the central axis. The second inner ring-shaped structures 727 and 728 are respectively corresponding to the first inner ring-shaped structures 717 and 718.

In FIG. 7A, the optical lens assembly 700 includes lens elements 701, 702, 703, the dual molded lens element 790, a lens element 704 and the image surface 708 in order from an object side to an image side. The optical lens assembly 700 has a total of five lens elements (701, 702, 703, 790, 704), wherein the lens elements 701, 702, 703, the dual molded lens element 790 and the lens element 704 are disposed along an optical axis (i.e. the central axis of the dual molded lens element 790) in a plastic barrel 709.

In FIG. 7A and FIG. 7B, a flat surface 730 is located between an outer annular surface 719 of the peripheral section 714 and an outer annular surface 729 of the light absorbing portion 720, wherein the flat surface 730 surrounds and is orthogonal to the central axis, and the flat surface 730 is located on the peripheral section 714. The effective optical section 713 includes two aspheric surfaces, which are respectively a region of the effective optical section 713 located on the object-side surface 770 and a region of the effective optical section 713 located on the image-side surface 780 of the dual molded lens element 790.

From another point of view, in FIG. 7B to FIG. 7D, the peripheral section 714 includes a plurality of first inner strip-shaped structures 715 and a plurality of first inner strip-shaped structures 716, wherein the first inner strip-shaped structures 715 and 716 are regularly arranged along the circumferential direction of the central axis of the dual molded lens element 790. The light absorbing portion 720 includes a plurality of second inner strip-shaped structures 725 and a plurality of second inner strip-shaped structures 726, wherein the second inner strip-shaped structures 725 and 726 are regularly arranged along the circumferential direction of the central axis, and the second inner strip-shaped structures 725 and 726 are disposed correspondingly to and connected to the first inner strip-shaped structures 715 and 716.

In detail, each structure of the first inner strip-shaped structures 715 and 716 is disposed in a direction from the central axis towards the outer annular surface 719 of the peripheral section 714. Each structure of the second inner strip-shaped structures 725 and 726 is disposed in a direction from the central axis towards the outer annular surface 729 of the light absorbing portion 720.

In FIG. 7B and FIG. 7C, each structure of the second inner strip-shaped structures 725 and 726 includes the protrusion structures 772 and the spacing structures 782. Specifically, the protrusion structures 772 and the spacing structures 782 of each of the second inner strip-shaped structures 725 are arranged as a strip shape, and the protrusion structures 772 and the spacing structures 782 of each of the second inner strip-shaped structures 726 are arranged as a strip shape. The protrusion structures 772 and the spacing structures 782 of each of the second inner strip-shaped structures 725 are alternately arranged as a strip shape. That is, each of the second inner strip-shaped structures 725 is as a strip shape, which is formed by the protrusion structures 772 and the spacing structures 782 thereof alternately arranged. The protrusion structures 772 and the spacing structures 782 of each of the second inner strip-shaped structures 726 are alternately arranged as a strip shape. That is, each of the second inner strip-shaped structures 726 is as a strip shape, which is formed by the protrusion structures 772 and the spacing structures 782 thereof alternately arranged. A number of the second inner strip-shaped structures 725 is 45, and a number of the second inner strip-shaped structures 726 is 45.

In FIG. 7C and FIG. 7D, the dual molded lens element 790 is made by the dual-shot injection molding method, wherein the first inner strip-shaped structures 715 and 716 as a whole are corresponding to the second inner strip-shaped structures 725 and 726 as a whole. Each structure of the first inner strip-shaped structures 715 and 716 is a strip-shaped structure of a continuous protrusion, which is a pre-arranged strip, and a protrusion strip specifically. The protrusion structures 772 and the spacing structures 782 of each structure of the second inner strip-shaped structures 725 and 726 are alternately arranged as a strip shape. Two sides (its reference numeral is omitted) of each of the second inner strip-shaped structures 725 are respectively corresponding to one of the first inner strip-shaped structures 715 and one of the first inner strip-shaped structures 716. Two sides (its reference numeral is omitted) of each of the second inner strip-shaped structures 726 are respectively corresponding to one of the first inner strip-shaped structures 716 and one of the first inner strip-shaped structures 715. The second inner strip-shaped structures 725 have the same geometric structures and are regularly arranged along the circumferential direction of the central axis of the dual molded lens element 790, the second inner strip-shaped structures 726 have the same geometric structures and are regularly arranged along the circumferential direction of the central axis, the first inner strip-shaped structures 715 correspondingly have the same geometric structures and are regularly arranged along the circumferential direction of the central axis, and the first inner strip-shaped structures 716 correspondingly have the same geometric structures and are regularly arranged along the circumferential direction of the central axis, wherein the geometric structure of each structure of the first inner strip-shaped structures 715 and 716 is different from the geometric structure of each structure of the second inner strip-shaped structures 725 and 726. A center-to-center spacing angle in the circumferential direction of the central axis between any two of the second inner strip-shaped structures 725 which are adjacent to each other is θ2, a center-to-center spacing angle in the circumferential direction of the central axis between any two of the second inner strip-shaped structures 726 which are adjacent to each other is θ2, a center-to-center spacing angle in the circumferential direction of the central axis between any two of the first inner strip-shaped structures 715 which are adjacent to each other is correspondingly θ1, and a center-to-center spacing angle in the circumferential direction of the central axis between any two of the first inner strip-shaped structures 716 which are adjacent to each other is correspondingly θ1, wherein θ1=θ2.

The data of the parameters θ1, θ2, w, φt, φab and φt/φab of the optical lens assembly 700 according to the 7th embodiment of the present disclosure are listed in the following Table 7, wherein the parameters are also shown as FIG. 7B to FIG. 7D. The definitions of these parameters shown in Table 7 are the same as those stated in the optical lens assembly 100 of the 1st embodiment and the optical lens assembly 400 of the 4th embodiment with corresponding values for the optical lens assembly 700.

TABLE 7

| 7th Embodiment | | | |
|---|---|---|---|
| θ1 (degrees) | 8 | φt (mm) | 4.2 |
| θ2 (degrees) | 8 | φab (mm) | 3.07 |
| w (mm) | 0.16 | φt/φab | 1.37 |

8th Embodiment

Figure 8A:
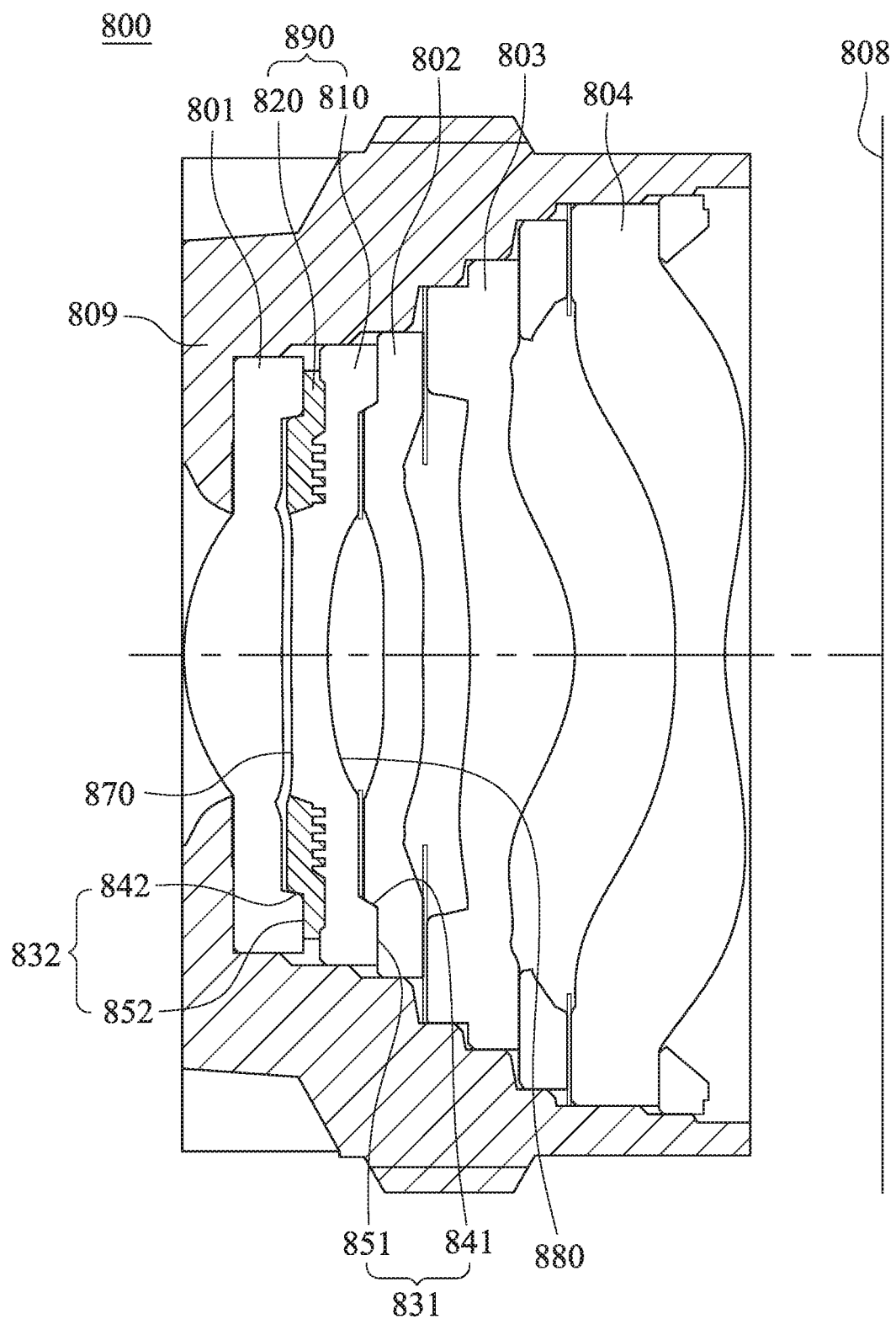
FIG. 8A is a schematic view of an optical lens assembly according to the 8th embodiment of the present disclosure.

FIG. 8A is a schematic view of an optical lens assembly 800 according to the 8th embodiment of the present disclosure. In FIG. 8A, the optical lens assembly 800 includes a dual molded lens element 890, wherein the dual molded lens element 890 includes a light transmitting portion 810 and a light absorbing portion 820.

Figure 8B:
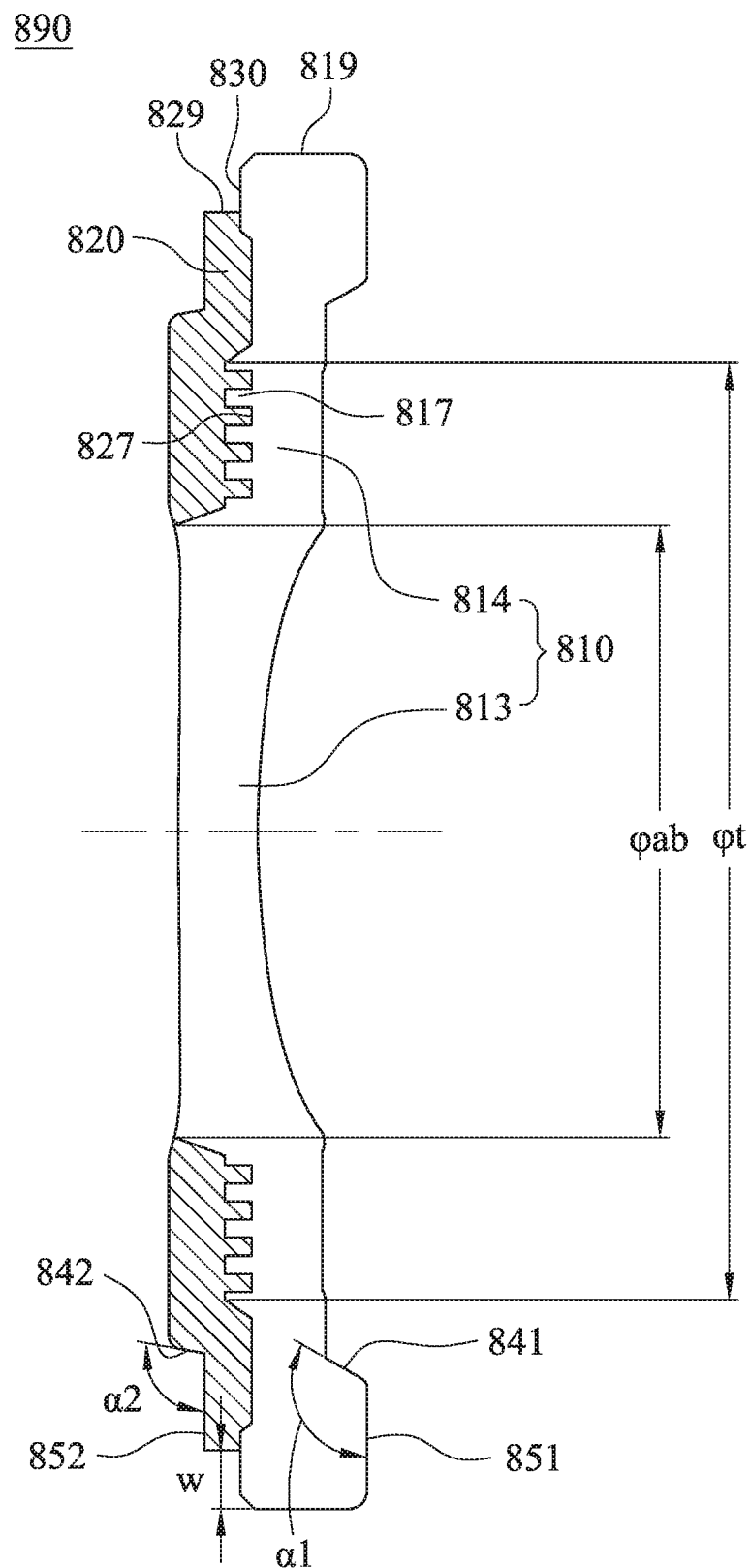
FIG. 8B is a schematic view of a dual molded lens element according to the 8th embodiment.

FIG. 8B is a schematic view of the dual molded lens element 890 according to the 8th embodiment. In FIG. 8A and FIG. 8B, the light transmitting portion 810 includes an effective optical section 813 and a peripheral section 814. The peripheral section 814 surrounds the effective optical section 813, wherein an incident light passes through the effective optical section 813 and forms an image on an image surface 808. The effective optical section 813 can include a planar surface or an aspheric surface with any curvature, wherein it would affect imaging properties by blocking the effective optical section 813.

The light absorbing portion 820 is located on an object-side surface 870 of the dual molded lens element 890, wherein the object-side surface 870 is a surface of the dual molded lens element 890 facing an imaged object (not shown herein), and an image-side surface 880 is a surface of the dual molded lens element 890 facing the image surface 808. The light absorbing portion 820 is annular and surrounds a central axis of the dual molded lens element 890. A plastic material of the light absorbing portion 820 has the feature of absorbing visible light, and a color of the light absorbing portion 820 is black. A plastic material of the light transmitting portion 810 has the feature of being transmitted by visible light, and a color of the light transmitting portion 810 is transparent and colorless. Hence, the plastic material and the color of the light absorbing portion 820 are different from the plastic material and the color of the light transmitting portion 810. The dual molded lens element 890 is made by an injection molding method and formed integrally.

Figure 8C:
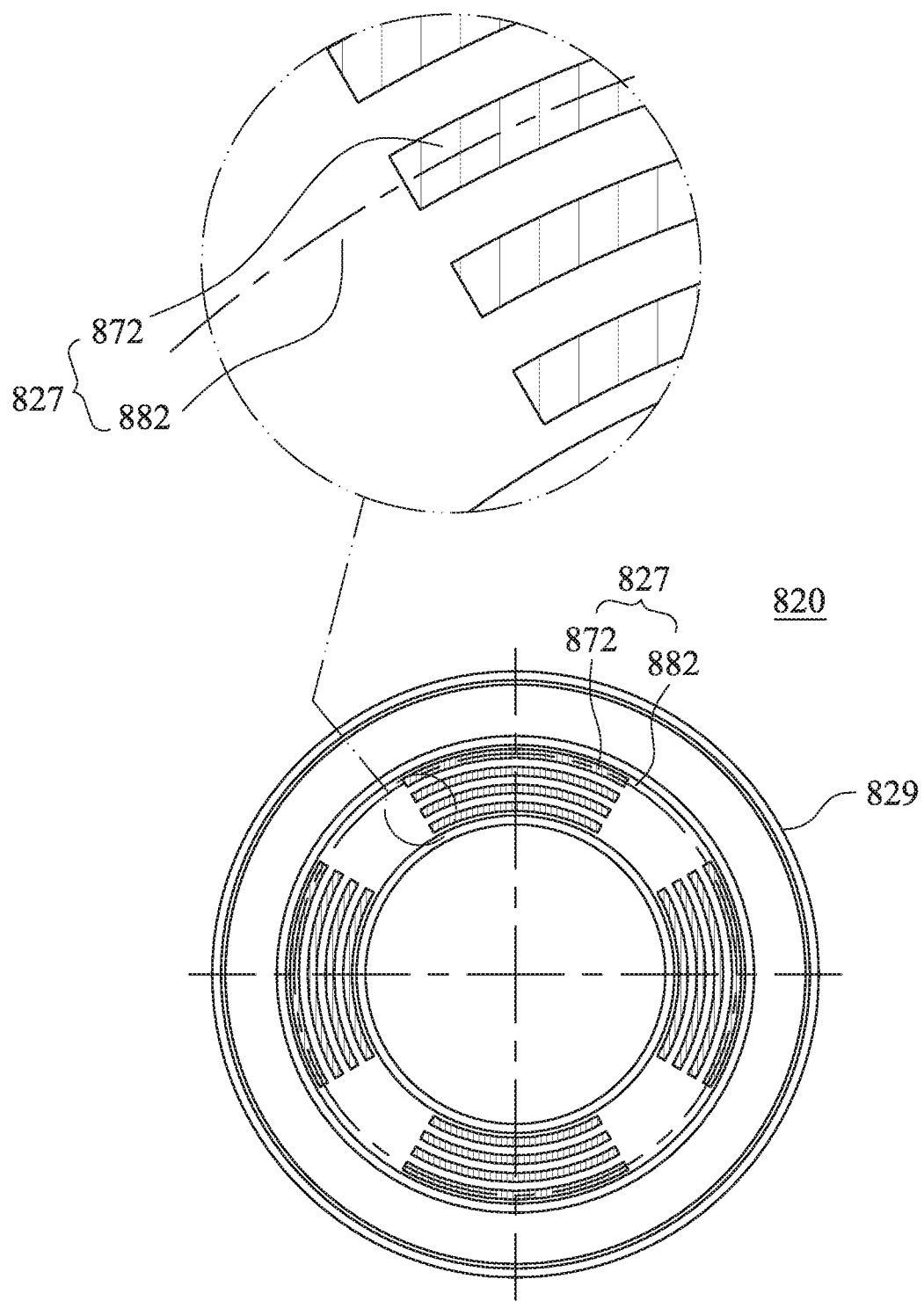
FIG. 8C is a plane view of a light absorbing portion according to the 8th embodiment.
Figure 8D:
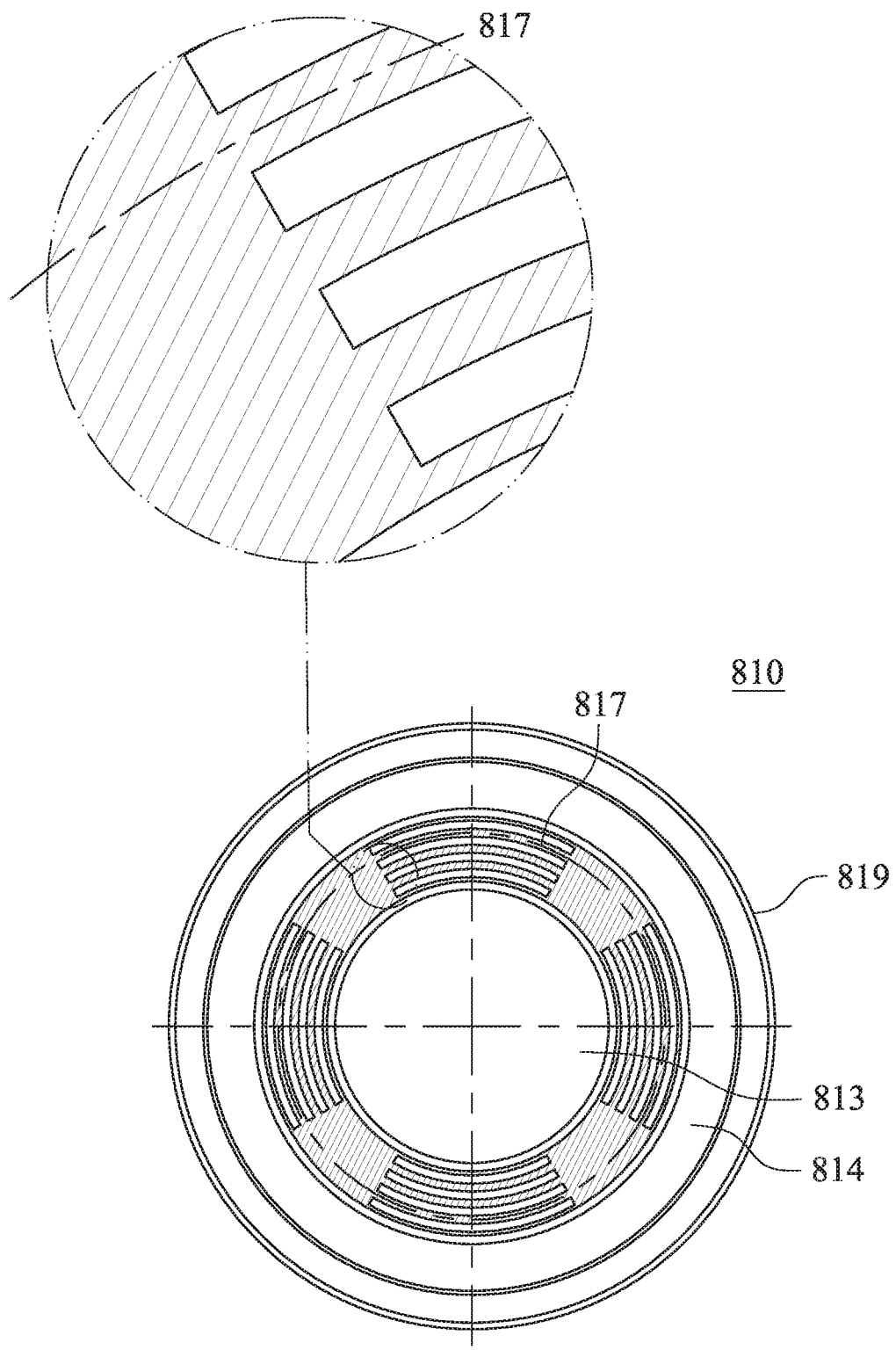
FIG. 8D is a plane view of a light transmitting portion according to the 8th embodiment.

FIG. 8C is a plane view of the light absorbing portion 820 according to the 8th embodiment, and FIG. 8D is a plane view of the light transmitting portion 810 according to the 8th embodiment. In FIG. 8B to FIG. 8D, the peripheral section 814 includes a plurality of first inner ring-shaped structures 817, wherein the first inner ring-shaped structures 817 are coaxially arranged with respect to the central axis of the dual molded lens element 890. The light absorbing portion 820 includes a plurality of second inner ring-shaped structures 827, wherein the second inner ring-shaped structures 827 are coaxially arranged with respect to the central axis, and the second inner ring-shaped structures 827 are disposed correspondingly to and connected to the first inner ring-shaped structures 817.

In detail, the dual molded lens element 890 is made by a dual-shot injection molding method. Each of the first inner ring-shaped structures 817 is a ring-shaped structure of a continuous protrusion, which is a pre-arranged ring. Each of the second inner ring-shaped structures 827 includes a plurality of protrusion structures 872 and a plurality of spacing structures 882. That is, the protrusion structures 872 and the spacing structures 882 of each of the second inner ring-shaped structures 827 are alternately arranged as a ring shape. The first inner ring-shaped structures 817 as a whole are corresponding to the second inner ring-shaped structures 827 as a whole. The protrusion structures 872 are respectively corresponding to a plurality of arc grooves (its reference numeral is omitted) on the light transmitting portion 810, wherein each of the arc grooves is located between two of the first inner ring-shaped structures 817 which are adjacent to each other. A structure (its reference numeral is omitted) between two of the second inner ring-shaped structures 827 which are adjacent to each other is corresponding to one of the first inner ring-shaped structures 817.

In FIG. 8A, the optical lens assembly 800 includes lens element 801, the dual molded lens element 890, lens elements 802, 803, 804 and the image surface 808 in order from an object side to an image side. The optical lens assembly 800 has a total of five lens elements (801, 890, 802, 803, 804), wherein the lens element 801, the dual molded lens element 890, the lens elements 802, 803 and 804 are disposed along an optical axis (i.e. the central axis of the dual molded lens element 890) in a plastic barrel 809.

In FIG. 8A and FIG. 8B, a flat surface 830 is located between an outer annular surface 819 of the peripheral section 814 and an outer annular surface 829 of the light absorbing portion 820, wherein the flat surface 830 surrounds and is orthogonal to the central axis, and the flat surface 830 is located on the peripheral section 814. The effective optical section 813 includes two aspheric surfaces, which are respectively a region of the effective optical section 813 located on the object-side surface 870 and a region of the effective optical section 813 located on the image-side surface 880 of the dual molded lens element 890.

A connecting structure 831 is located on the peripheral section 814 of the dual molded lens element 890. The connecting structure 831 includes a connecting surface 841 and a receiving surface 851, wherein the connecting surface 841 is an annular conical surface with respect to the central axis, and the receiving surface 851 is orthogonal to the central axis and farther from the central axis than the connecting surface 841 is from the central axis. The connecting structure 831 is connected to the lens element 802, which is adjacent to the dual molded lens element 890, and the connecting structure 831 is for the dual molded lens element 890 and the lens element 802 both aligned with the central axis. Therefore, it is favorable for the dual molded lens element 890 assembled in the optical lens assembly 800. In addition, the dual molded lens element 890 is the lens element neither closest to the imaged object, nor closest to the image surface 808, so that it is favorable for effectively attenuating the stray light of higher strength within the field of view.

Furthermore, a connecting structure 832 is located on the light absorbing portion 820 of the dual molded lens element 890. The connecting structure 832 includes a connecting surface 842 and a receiving surface 852, wherein the connecting surface 842 is an annular conical surface with respect to the central axis, and the receiving surface 852 is orthogonal to the central axis and farther from the central axis than the connecting surface 842 is from the central axis. The connecting structure 832 is connected to the lens element 801, which is adjacent to the dual molded lens element 890, and the connecting structure 832 is for the dual molded lens element 890 and the lens element 801 both aligned with the central axis.

An angle between the connecting surface 841 and the receiving surface 851 of the peripheral section 814 is α1, and an angle between the connecting surface 842 and the receiving surface 852 of the light absorbing portion 820 is α2, wherein both the parameters α1 and α2 conform to the definition of the parameter α in the claims and the 4th embodiment.

The data of the parameters w, α1, α2, φt, φab and φt/φab of the optical lens assembly 800 according to the 8th embodiment of the present disclosure are listed in the following Table 8, wherein the parameters are also shown as FIG. 8B. The definitions of these parameters shown in Table 8 are the same as those stated in the optical lens assembly 400 of the 4th embodiment with corresponding values for the optical lens assembly 800.

TABLE 8

| 8th Embodiment | | | |
| --- | --- | --- | --- |
| w (mm) | 0.16 | φt (mm) | 2.59 |
| α1 (degrees) | 120 | φab (mm) | 1.69 |
| α2 (degrees) | 100 | φt/φab | 1.53 |

9th Embodiment

Figure 9A:
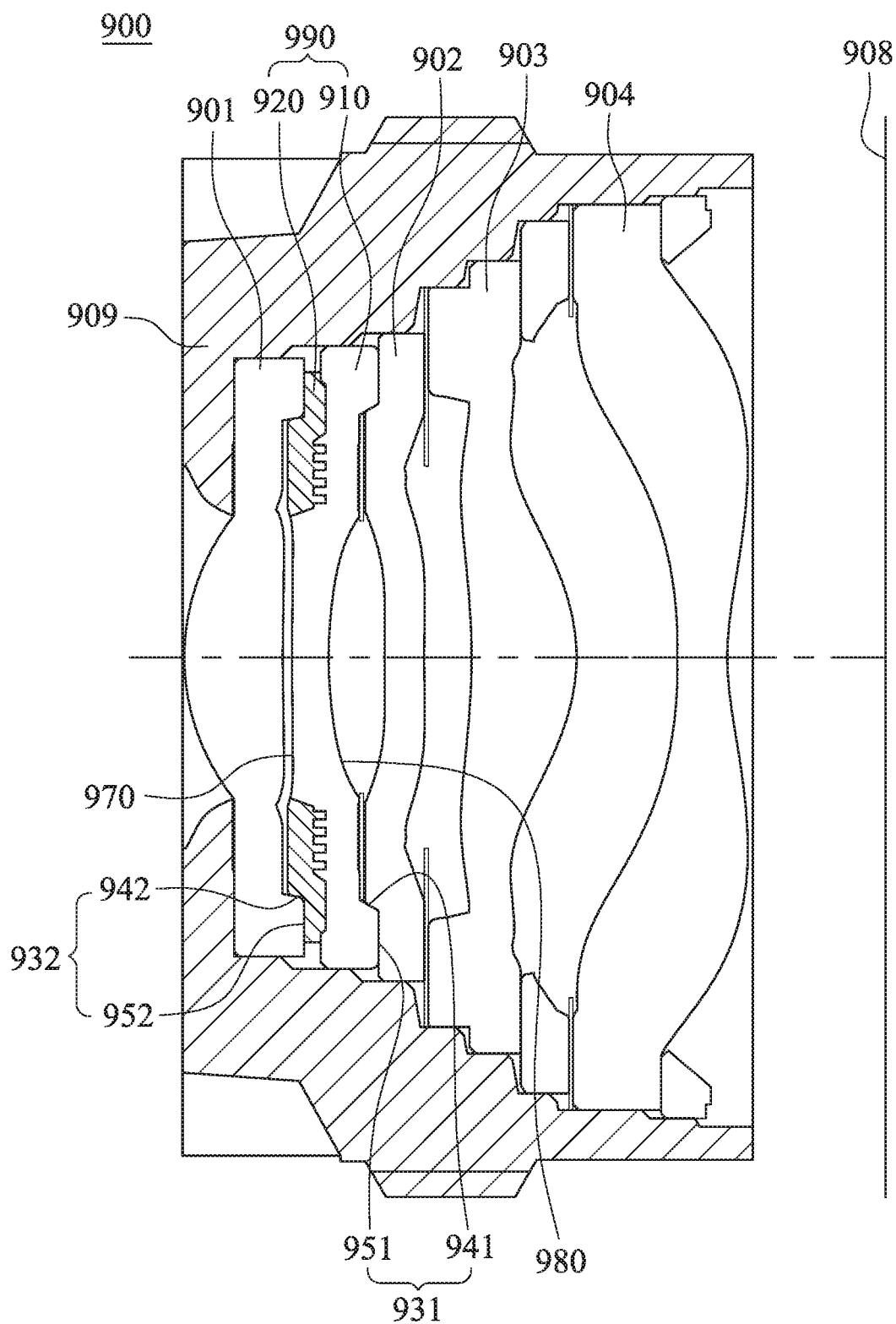
FIG. 9A is a schematic view of an optical lens assembly according to the 9th embodiment of the present disclosure.

FIG. 9A is a schematic view of an optical lens assembly 900 according to the 9th embodiment of the present disclosure. In FIG. 9A, the optical lens assembly 900 includes a dual molded lens element 990, wherein the dual molded lens element 990 includes a light transmitting portion 910 and a light absorbing portion 920.

Figure 9B:
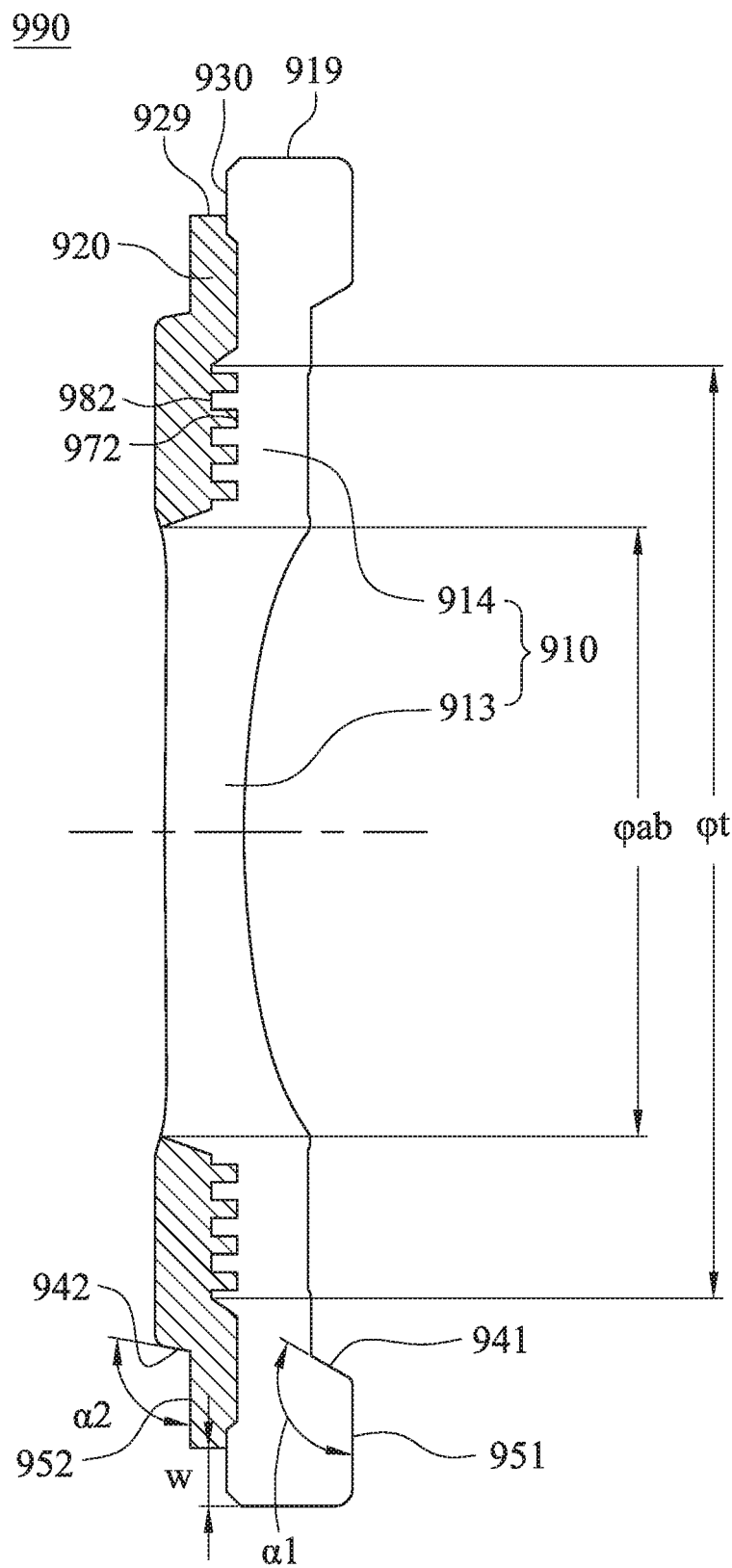
FIG. 9B is a schematic view of a dual molded lens element according to the 9th embodiment.

FIG. 9B is a schematic view of the dual molded lens element 990 according to the 9th embodiment. In FIG. 9A and FIG. 9B, the light transmitting portion 910 includes an effective optical section 913 and a peripheral section 914. The peripheral section 914 surrounds the effective optical section 913, wherein an incident light passes through the effective optical section 913 and forms an image on an image surface 908. The effective optical section 913 can include a planar surface or an aspheric surface with any curvature, wherein it would affect imaging properties by blocking the effective optical section 913.

The light absorbing portion 920 is located on an object-side surface 970 of the dual molded lens element 990, wherein the object-side surface 970 is a surface of the dual molded lens element 990 facing an imaged object (not shown herein), and an image-side surface 980 is a surface of the dual molded lens element 990 facing the image surface 908. The light absorbing portion 920 is annular and surrounds a central axis of the dual molded lens element 990. A plastic material of the light absorbing portion 920 has the feature of absorbing visible light, and a color of the light absorbing portion 920 is black. A plastic material of the light transmitting portion 910 has the feature of being transmitted by visible light, and a color of the light transmitting portion 910 is transparent and colorless. Hence, the plastic material and the color of the light absorbing portion 920 are different from the plastic material and the color of the light transmitting portion 910. The dual molded lens element 990 is made by an injection molding method and formed integrally.

Figure 9C:
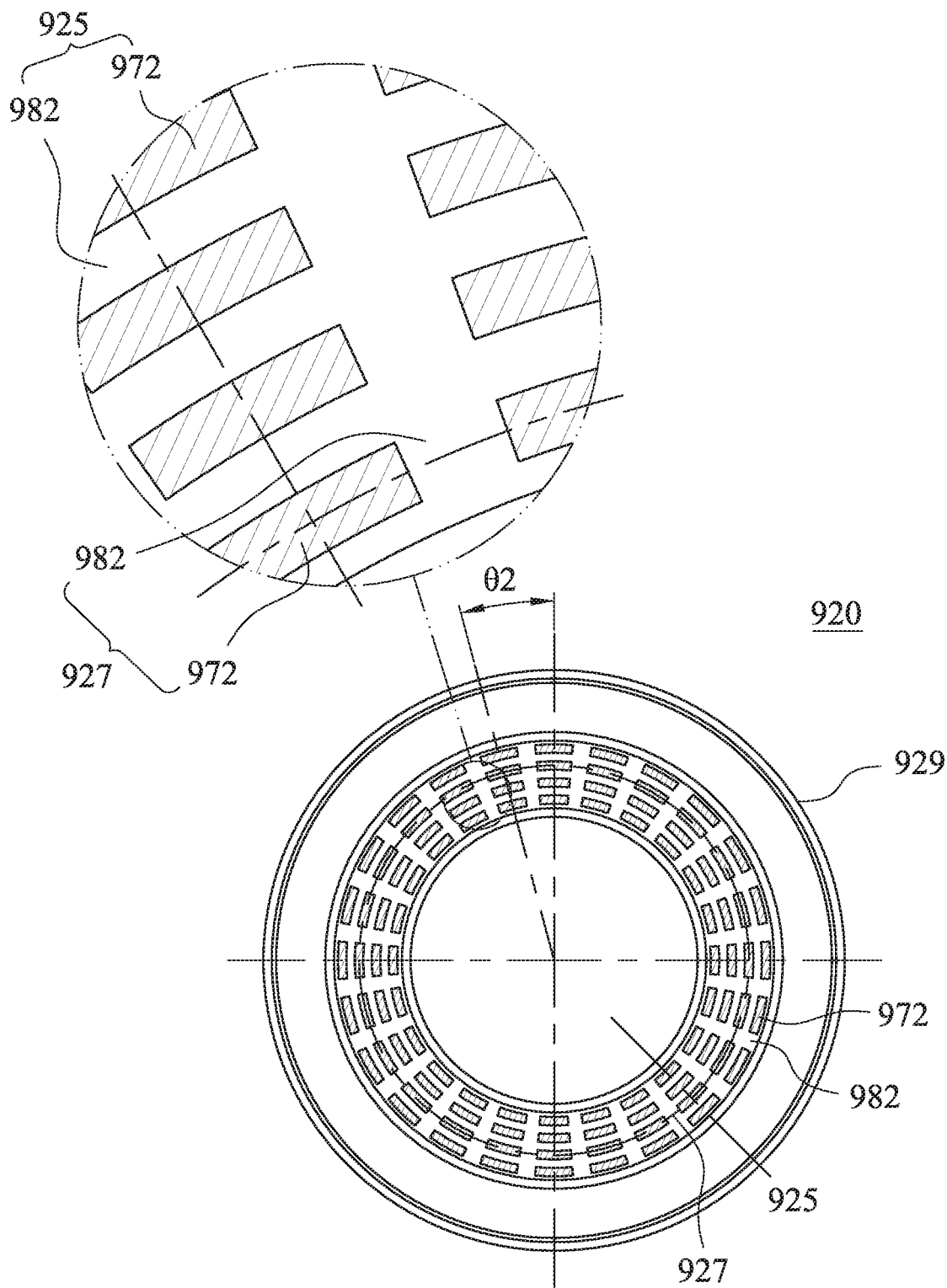
FIG. 9C is a plane view of a light absorbing portion according to the 9th embodiment.
Figure 9D:
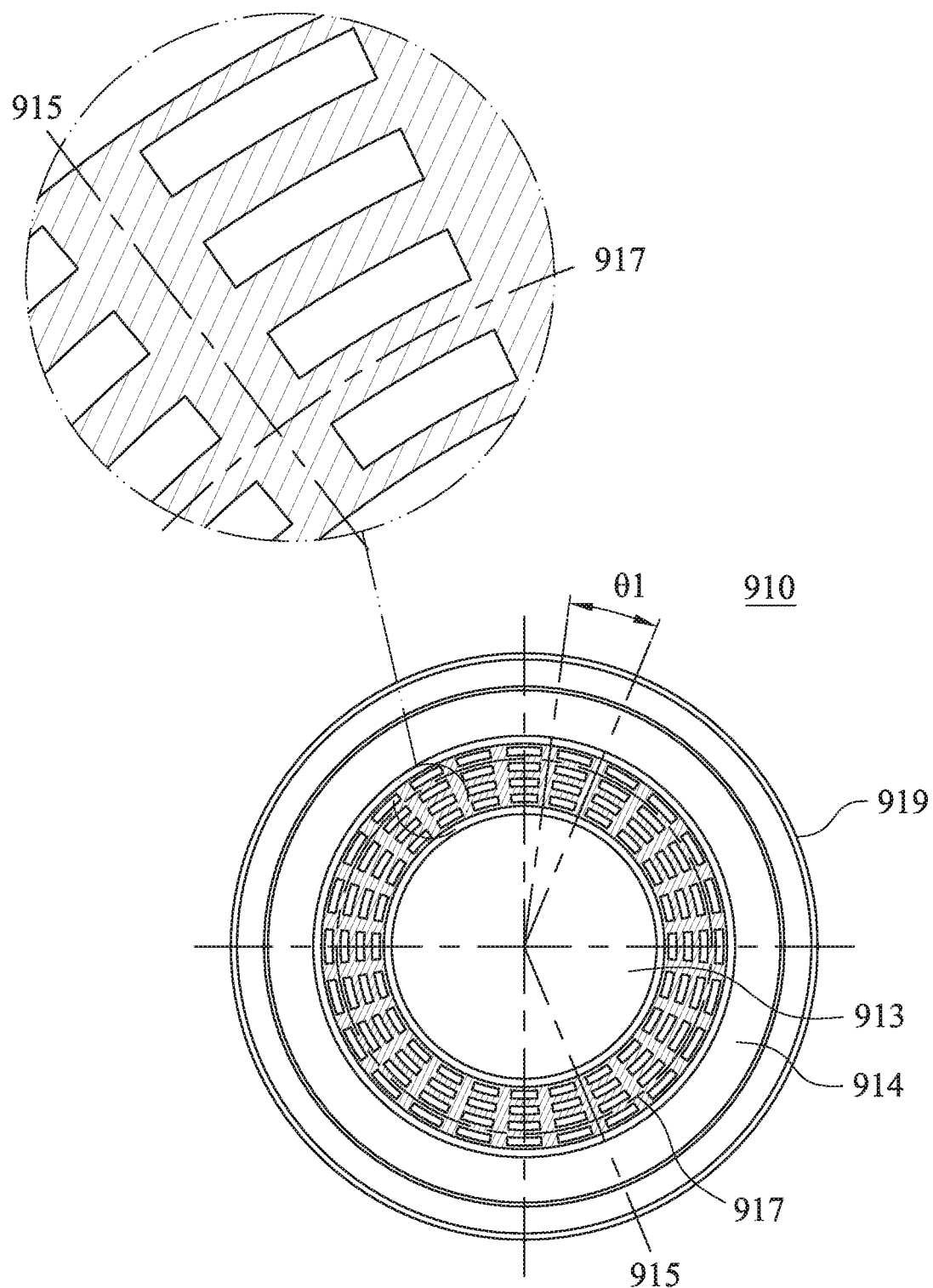
FIG. 9D is a plane view of a light transmitting portion according to the 9th embodiment.

FIG. 9C is a plane view of the light absorbing portion 920 according to the 9th embodiment, and FIG. 9D is a plane view of the light transmitting portion 910 according to the 9th embodiment. In FIG. 9B to FIG. 9D, the peripheral section 914 includes a plurality of first inner strip-shaped structures 915, wherein the first inner strip-shaped structures 915 are regularly arranged along a circumferential direction of the central axis of the dual molded lens element 990. The light absorbing portion 920 includes a plurality of second inner strip-shaped structures 925, wherein the second inner strip-shaped structures 925 are regularly arranged along the circumferential direction of the central axis, and the second inner strip-shaped structures 925 are disposed correspondingly to and connected to the first inner strip-shaped structures 915.

In detail, the dual molded lens element 990 is made by a dual-shot injection molding method. The peripheral section 914 of the light transmitting portion 910 further includes an outer annular surface 919. Each of the first inner strip-shaped structures 915 is disposed in a direction from the central axis towards the outer annular surface 919 of the peripheral section 914. The light absorbing portion 920 further includes an outer annular surface 929. Each of the second inner strip-shaped structures 925 is disposed in a direction from the central axis towards the outer annular surface 929 of the light absorbing portion 920.

In FIG. 9B and FIG. 9C, each of the first inner strip-shaped structures 915 is a strip-shaped structure of a continuous protrusion, which is a pre-arranged strip, and a protrusion strip specifically. Each of the second inner strip-shaped structures 925 includes a plurality of protrusion structures 972 and a plurality of spacing structures 982. Specifically, the protrusion structures 972 and the spacing structures 982 of each of the second inner strip-shaped structures 925 are arranged as a strip shape. The protrusion structures 972 and the spacing structures 982 of each of the second inner strip-shaped structures 925 are alternately arranged as a strip shape. That is, each of the second inner strip-shaped structures 925 is as a strip shape, which is formed by the protrusion structures 972 and the spacing structures 982 thereof alternately arranged. Furthermore, a number of the second inner strip-shaped structures 925 is 24.

In FIG. 9C and FIG. 9D, the dual molded lens element 990 is made by the dual-shot injection molding method, wherein the first inner strip-shaped structures 915 as a whole are corresponding to the second inner strip-shaped structures 925 as a whole. Each of the second inner strip-shaped structures 925 is corresponding to one structure (its reference numeral is omitted) between two of the first inner strip-shaped structures 915 which are adjacent to each other, and one structure (its reference numeral is omitted) between two of the second inner strip-shaped structures 925 which are adjacent to each other is corresponding to one of the first inner strip-shaped structures 915. The first inner strip-shaped structures 915 have the same geometric structures and are regularly arranged along the circumferential direction of the central axis of the dual molded lens element 990, and the second inner strip-shaped structures 925 correspondingly have the same geometric structures and are regularly arranged along the circumferential direction of the central axis, wherein the geometric structure of each of the first inner strip-shaped structures 915 is different from the geometric structure of each of the second inner strip-shaped structures 925. A center-to-center spacing angle in the circumferential direction of the central axis between any two of the second inner strip-shaped structures 925 which are adjacent to each other is θ2, and a center-to-center spacing angle in the circumferential direction of the central axis between any two of the first inner strip-shaped structures 915 which are adjacent to each other is correspondingly θ1, wherein θ1=θ2.

In FIG. 9A, the optical lens assembly 900 includes a lens element 901, the dual molded lens element 990, lens elements 902, 903, 904 and the image surface 908 in order from an object side to an image side. The optical lens assembly 900 has a total of five lens elements (901, 990, 902, 903, 904), wherein the lens element 901, the dual molded lens element 990, the lens elements 902, 903 and 904 are disposed along an optical axis (i.e. the central axis of the dual molded lens element 990) in a plastic barrel 909.

In FIG. 9A and FIG. 9B, a flat surface 930 is located between the outer annular surface 919 of the peripheral section 914 and the outer annular surface 929 of the light absorbing portion 920, wherein the flat surface 930 surrounds and is orthogonal to the central axis, and the flat surface 930 is located on the peripheral section 914. The effective optical section 913 includes two aspheric surfaces, which are respectively a region of the effective optical section 913 located on the object-side surface 970 and a region of the effective optical section 913 located on the image-side surface 980 of the dual molded lens element 990.

A connecting structure 931 is located on the peripheral section 914 of the dual molded lens element 990. The connecting structure 931 includes a connecting surface 941 and a receiving surface 951, wherein the connecting surface 941 is an annular conical surface with respect to the central axis, and the receiving surface 951 is orthogonal to the central axis and farther from the central axis than the connecting surface 941 is from the central axis. The connecting structure 931 is connected to the lens element 902, which is adjacent to the dual molded lens element 990, and the connecting structure 931 is for the dual molded lens element 990 and the lens element 902 both aligned with the central axis. Therefore, it is favorable for the dual molded lens element 990 assembled in the optical lens assembly 900. In addition, the dual molded lens element 990 is the lens element neither closest to the imaged object, nor closest to the image surface 908, so that it is favorable for effectively attenuating the stray light of higher strength within the field of view.

Furthermore, a connecting structure 932 is located on the light absorbing portion 920 of the dual molded lens element 990. The connecting structure 932 includes a connecting surface 942 and a receiving surface 952, wherein the connecting surface 942 is an annular conical surface with respect to the central axis, and the receiving surface 952 is orthogonal to the central axis and farther from the central axis than the connecting surface 942 is from the central axis. The connecting structure 932 is connected to the lens element 901, which is adjacent to the dual molded lens element 990, and the connecting structure 932 is for the dual molded lens element 990 and the lens element 901 both aligned with the central axis.

An angle between the connecting surface 941 and the receiving surface 951 of the peripheral section 914 is σ1, and an angle between the connecting surface 942 and the receiving surface 952 of the light absorbing portion 920 is α2, wherein both the parameters α1 and α2 conform to the definition of the parameter α in the claims and the 3rd embodiment.

From another point of view, in FIG. 9B to FIG. 9D, the peripheral section 914 includes a plurality of first inner ring-shaped structures 917, wherein the first inner ring-shaped structures 917 are coaxially arranged with respect to the central axis of the dual molded lens element 990. The light absorbing portion 920 includes a plurality of second inner ring-shaped structures 927, wherein the second inner ring-shaped structures 927 are coaxially arranged with respect to the central axis, and the second inner ring-shaped structures 927 are disposed correspondingly to and connected to the first inner ring-shaped structures 917.

In detail, the dual molded lens element 990 is made by the dual-shot injection molding method. Each of the first inner ring-shaped structures 917 is a ring-shaped structure of a continuous protrusion, which is a pre-arranged ring. Each of the second inner ring-shaped structures 927 includes a plurality of protrusion structures 972 and a plurality of spacing structures 982. That is, the protrusion structures 972 and the spacing structures 982 of each of the second inner ring-shaped structures 927 are alternately arranged as a ring shape. The first inner ring-shaped structures 917 as a whole are corresponding to the second inner ring-shaped structures 927 as a whole. The protrusion structures 972 are respectively corresponding to a plurality of arc grooves (its reference numeral is omitted) on the light transmitting portion 910, wherein each of the arc grooves is located between two of the first inner ring-shaped structures 917 which are adjacent to each other. A structure (its reference numeral is omitted) between two of the second inner ring-shaped structures 927 which are adjacent to each other is corresponding to one of the first inner ring-shaped structures 917.

The data of the parameters θ1, θ2, w, α1, α2, φt, φab and φt/φab of the optical lens assembly 900 according to the 9th embodiment of the present disclosure are listed in the following Table 9, wherein the parameters are also shown as FIG. 9B to FIG. 9D. The definitions of these parameters shown in Table 9 are the same as those stated in the optical lens assembly 100 of the 1st embodiment and the optical lens assembly 400 of the 4th embodiment with corresponding values for the optical lens assembly 900.

TABLE 9

| 9th Embodiment | | | |
|---|---|---|---|
| θ1 (degrees) | 15 | α2 (degrees) | 100 |
| θ2 (degrees) | 15 | φt (mm) | 2.59 |
| w (mm) | 0.16 | φab (mm) | 1.69 |
| α1 (degrees) | 120 | φt/φab | 1.53 |

10th Embodiment

Figure 10A:
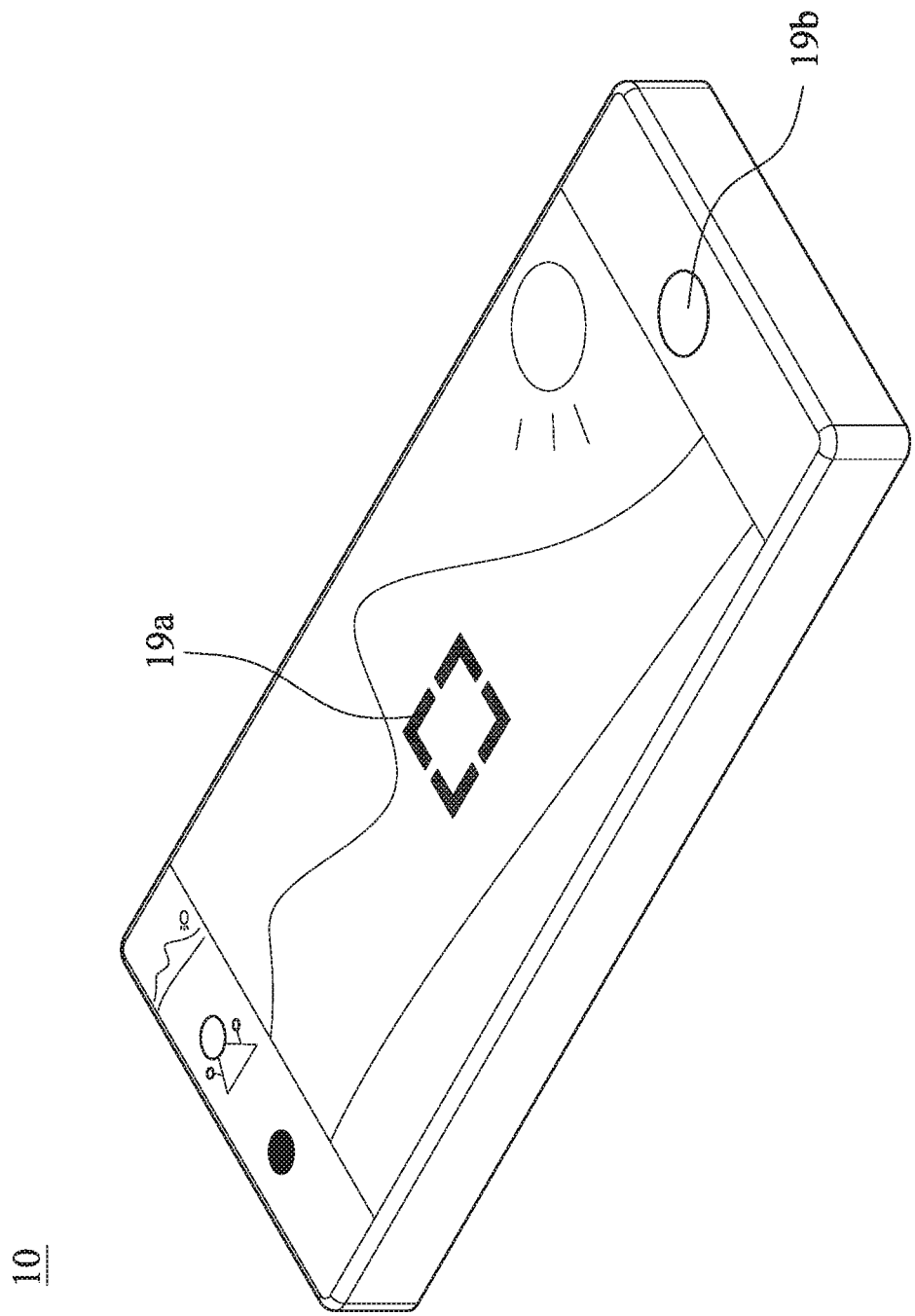
FIG. 10A shows a schematic view of an electronic device according to the 10th embodiment of the present disclosure.
Figure 10B:
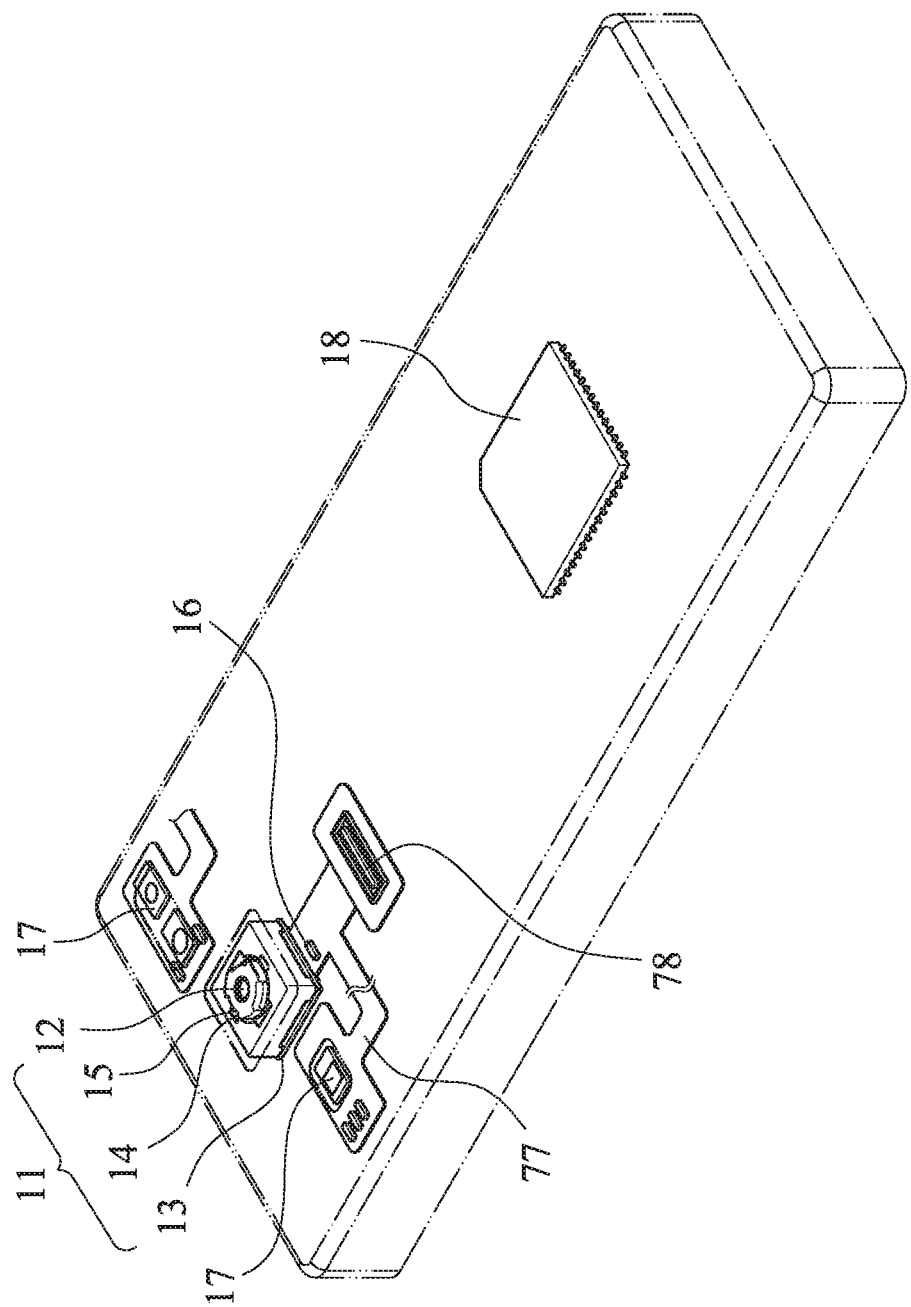
FIG. 10B shows another schematic view of the electronic device according to the 10th embodiment.

FIG. 10A shows a schematic view of an electronic device 10 according to the 10th embodiment of the present disclosure, FIG. 10B shows another schematic view of the electronic device 10 according to the 10th embodiment, and particularly, FIG. 10A and FIG. 10B are schematic views related to a camera of the electronic device 10. In FIG. 10A and FIG. 10B, the electronic device 10 of the 10th embodiment is a smart phone, wherein the electronic device 10 includes a camera module 11. The camera module 11 includes the optical lens assembly 12 according to the present disclosure and an image sensor 13, wherein the image sensor 13 is disposed on an image surface of the optical lens assembly 12. Therefore, a better image quality can be achieved, and hence the high-end imaging requirements of modern electronic devices can be satisfied.

Furthermore, the user activates the capturing mode via a user interface 19 of the electronic device 10, wherein the user interface 19 of the 10th embodiment can be a touch screen 19a, a button 19b and etc. At this moment, the imaging light is converged on the image sensor 13 of the optical lens assembly 12, and the electronic signal associated with image is output to an image signal processor (ISP) 18.

Figure 10C:
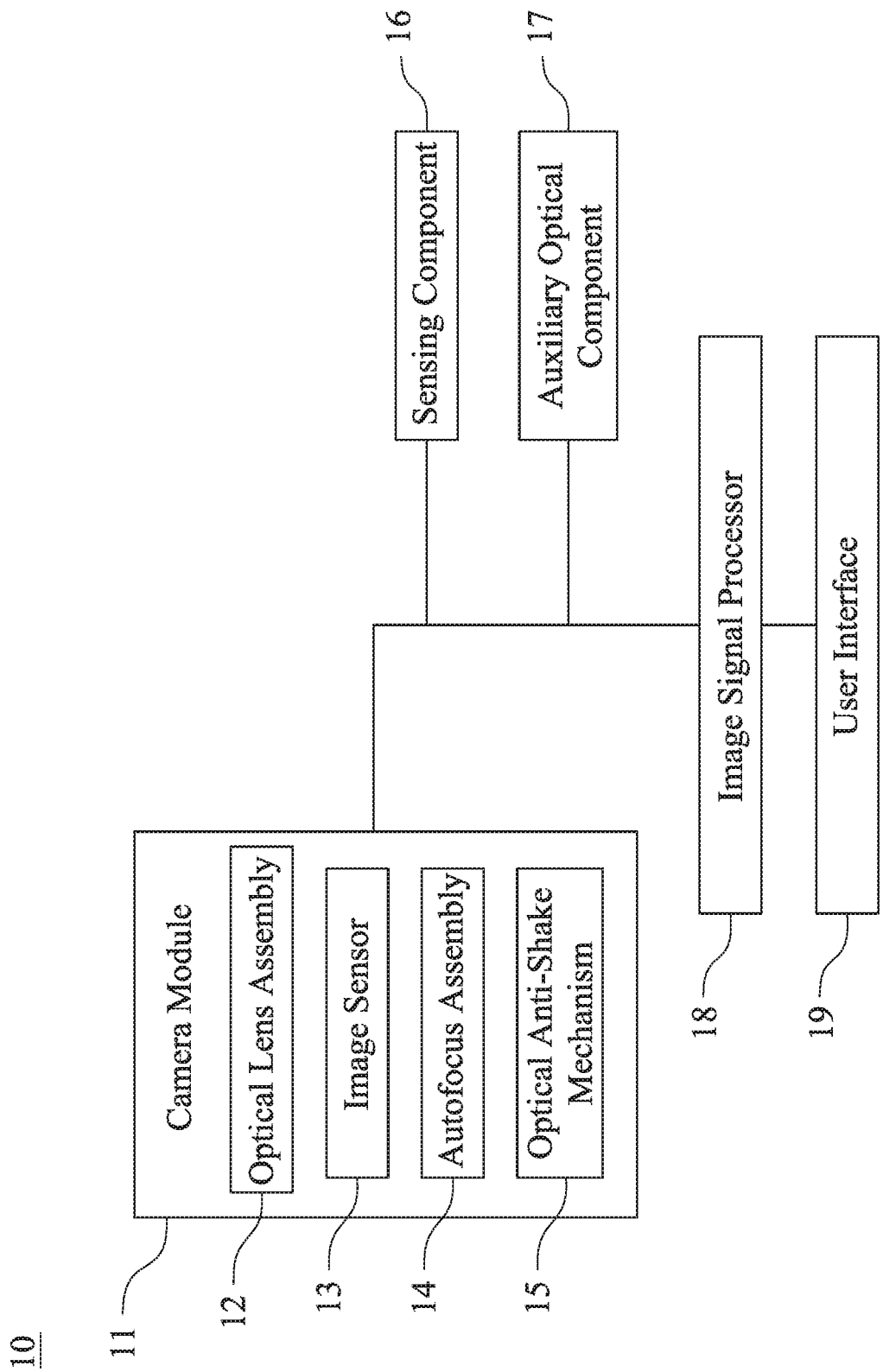
FIG. 10C shows a block diagram of the electronic device according to the 10th embodiment.

FIG. 10C shows a block diagram of the electronic device 10 according to the 10th embodiment, and in particular, the block diagram is related to the camera of the electronic device 10. In FIG. 10A to FIG. 10C, the camera module 11 can further include an autofocus assembly 14 and an optical anti-shake mechanism 15 based on the camera specification of the electronic device 10. Moreover, the electronic device 10 can further include at least one auxiliary optical component 17 and at least one sensing component 16. The auxiliary optical component 17 can be a flash module for compensating for the color temperature, an infrared distance measurement component, a laser focus module and etc. The sensing component 16 can have functions for sensing physical momentum and kinetic energy, and thereby can be an accelerator, a gyroscope, and a hall effect element, to sense shaking or jitters applied by hands of the user or external environments. Accordingly, the functions of the autofocus assembly 14 and the optical anti-shake mechanism 15 of the camera module 11 can be aided and enhanced to achieve the superior image quality. Furthermore, the electronic device 10 according to the present disclosure can have a capturing function with multiple modes, such as taking optimized selfies, high dynamic range (HDR) under a low light source, 4K resolution recording, etc. Additionally, the user can visually see the captured image of the camera through the touch screen 19a and manually operate the view finding range on the touch screen 19a to achieve the auto focus function of what you see is what you get.

Furthermore, in FIG. 10B, the camera module 11, the sensing component 16 and the auxiliary optical component 17 can be disposed on a flexible printed circuit board (FPC) 77 and electrically connected with the associated components, such as the imaging signal processor 18, via a connector 78 to perform a capturing process. Since the current electronic devices, such as smart phones, have a tendency of being compact, the way of firstly disposing the camera module and related components on the flexible printed circuit board and secondly integrating the circuit thereof into the main board of the electronic device via the connector can satisfy the requirements of the mechanical design and the circuit layout of the limited space inside the electronic device, and obtain more margins. The autofocus function of the camera module can also be controlled more flexibly via the touch screen of the electronic device. In the 10th embodiment, the electronic device 10 includes a plurality of sensing components 16 and a plurality of auxiliary optical components 17. The sensing components 16 and the auxiliary optical components 17 are disposed on the flexible printed circuit board 77 and at least one other flexible printed circuit board (its reference numeral is omitted) and electrically connected with the associated components, such as the image signal processor 18, via corresponding connectors to perform the capturing process. In other embodiments (not shown herein), the sensing components and the auxiliary optical components can also be disposed on the main board of the electronic device or carrier boards of other types according to requirements of the mechanical design and the circuit layout.

In addition, the electronic device 10 can further include but not be limited to a wireless communication unit, a control unit, a storage unit, a random access memory, a read-only memory, or a combination thereof.

11th Embodiment

FIG. 11 shows an electronic device 20 according to the 11th embodiment of the present disclosure. The electronic device 20 of the 11th embodiment is a tablet personal computer, wherein the electronic device 20 includes a camera module 21. The camera modules 21 includes the optical lens assembly (not shown herein) according to the present disclosure and an image sensor (not shown herein), wherein the image sensor is disposed on an image surface of the optical lens assembly.

12th Embodiment

Figure 12:
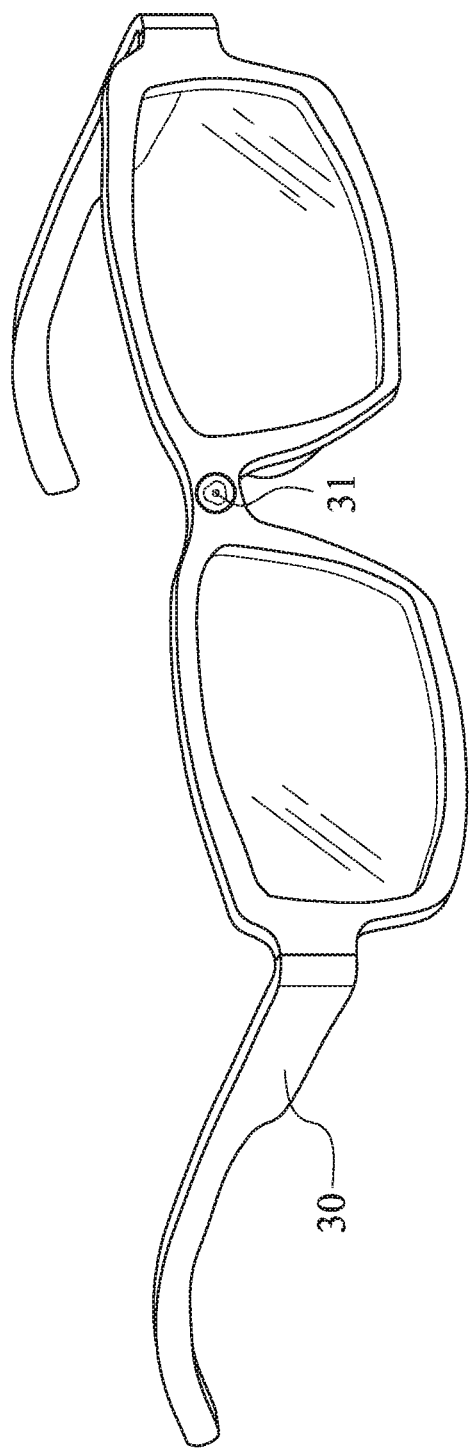
FIG. 12 shows an electronic device according to the 12th embodiment of the present disclosure.
Figure 13:
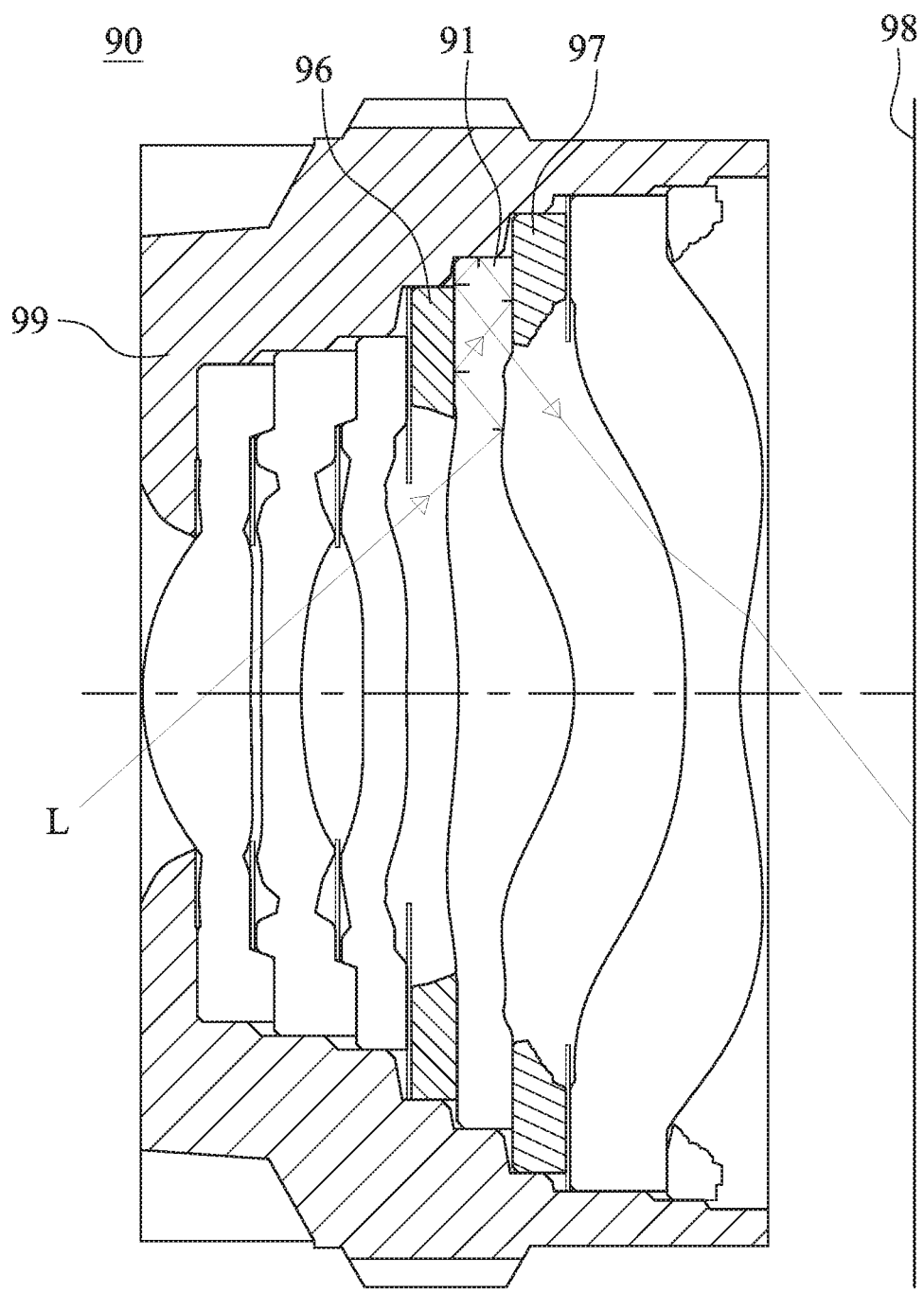
FIG. 13 is a schematic view of a conventional optical lens assembly.

FIG. 12 shows an electronic device 30 according to the 12th embodiment of the present disclosure. The electronic device 30 of the 12th embodiment is a wearable device, wherein the electronic device 30 includes a camera module 31. The camera modules 31 includes the optical lens assembly (not shown herein) according to the present disclosure and an image sensor (not shown herein), wherein the image sensor is disposed on an image surface of the optical lens assembly.

Although the present disclosure has been described in considerable detail with reference to the embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended to that the present disclosure cover modifications and variations of this disclosure provided they fall within the scope of the following claims.

What is claimed is:

1. An optical lens assembly comprising at least one lens element, which is a dual molded lens element, and the dual molded lens element comprising:
   a light transmitting portion comprising:
   an effective optical section; and
   a peripheral section surrounding the effective optical section and comprising a plurality of first inner strip-shaped structures, wherein the first inner strip-shaped structures are regularly arranged along a circumferential direction of a central axis of the dual molded lens element; and
   a light absorbing portion located on at least one of an object-side surface and an image-side surface of the dual molded lens element, wherein the light absorbing portion is annular and surrounds the central axis, a plastic material and a color of the light absorbing portion are different from a plastic material and a color of the light transmitting portion, the dual molded lens element is made by an injection molding method and formed integrally, the light absorbing portion comprises a plurality of second inner strip-shaped structures, the second inner strip-shaped structures are regularly arranged along the circumferential direction of the central axis, and the second inner strip-shaped structures are disposed correspondingly to and connected to the first inner strip-shaped structures;
   wherein each of the second inner strip-shaped structures is a wedge strip.

2. The optical lens assembly of claim 1, wherein the dual molded lens element is made by a dual-shot injection molding method.

3. The optical lens assembly of claim 2, wherein each of the peripheral section of the light transmitting portion and the light absorbing portion comprises an outer annular surface, each of the first inner strip-shaped structures is disposed in a direction from the central axis towards the outer annular surface of the peripheral section, and each of the second inner strip-shaped structures is disposed in a direction from the central axis towards the outer annular surface of the light absorbing portion.

4. The optical lens assembly of claim 3, wherein a flat surface is located between the outer annular surface of the peripheral section and the outer annular surface of the light absorbing portion, the flat surface surrounds and is orthogonal to the central axis, and the flat surface is located on the peripheral section or the light absorbing portion.

5. The optical lens assembly of claim 4, wherein a width of the flat surface is w, and the following condition is satisfied:

$$0.03 \text{ mm} < w < 0.52 \text{ mm}.$$

6. The optical lens assembly of claim 2, wherein the effective optical section comprises at least one aspheric surface.

7. The optical lens assembly of claim 2, wherein a number of the lens element of the optical lens assembly is at least two, at least one of the lens elements is the dual molded lens element, a connecting structure is located on at least one of the peripheral section and the light absorbing portion of the dual molded lens element, the connecting structure comprises a connecting surface and a receiving surface, the connecting surface is an annular conical surface, the receiving surface is orthogonal to the central axis, the connecting structure is connected to another lens element which is adjacent to the dual molded lens element, and the connecting structure is for the dual molded lens element and the another lens element both aligned with the central axis.

8. The optical lens assembly of claim 7, wherein an angle between the connecting surface and the receiving surface is α, and the following condition is satisfied:

$$95 \text{ degrees} < \alpha < 135 \text{ degrees}.$$

9. The optical lens assembly of claim 7, wherein the connecting structure is located on the light absorbing portion.

10. The optical lens assembly of claim 7, wherein the connecting structure is located on the peripheral section.

11. An electronic device comprising a camera module, and the camera module comprising:
    the optical lens assembly of claim 1; and
    an image sensor disposed on an image surface of the optical lens assembly.

12. An optical lens assembly comprising at least two lens elements, at least one of the lens elements being a dual molded lens element, and the dual molded lens element comprising:
    a light transmitting portion comprising:
    an effective optical section; and
    a peripheral section surrounding the effective optical section and comprising a plurality of first inner strip-shaped structures, wherein the first inner strip-shaped structures are regularly arranged along a circumferential direction of a central axis of the dual molded lens element; and
    a light absorbing portion located on at least one of an object-side surface and an image-side surface of the dual molded lens element, wherein the light absorbing portion is annular and surrounds the central axis, a plastic material and a color of the light absorbing portion are different from a plastic material and a color of the light transmitting portion, the dual molded lens element is made by an injection molding method and formed integrally, the light absorbing portion comprises a plurality of second inner strip-shaped structures, the second inner strip-shaped structures are regularly arranged along the circumferential direction of the central axis, and the second inner strip-shaped structures are disposed correspondingly to and connected to the first inner strip-shaped structures;

wherein a connecting structure is located on at least one of the peripheral section and the light absorbing portion of the dual molded lens element, the connecting structure comprises a connecting surface and a receiving surface, the connecting surface is an annular conical surface, the receiving surface is orthogonal to the central axis, the connecting structure is connected to another lens element which is adjacent to the dual molded lens element, and the connecting structure is for the dual molded lens element and the another lens element both aligned with the central axis.

13. The optical lens assembly of claim 12, wherein the dual molded lens element is made by a dual-shot injection molding method.

14. The optical lens assembly of claim 13, wherein an angle between the connecting surface and the receiving surface is $\alpha$, and the following condition is satisfied:

95 degrees<$\alpha$<135 degrees.

15. The optical lens assembly of claim 14, wherein the connecting structure is located on the light absorbing portion.

16. The optical lens assembly of claim 14, wherein the connecting structure is located on the peripheral section.

17. An electronic device comprising a camera module, and the camera module comprising:
the optical lens assembly of claim 12; and
an image sensor disposed on an image surface of the optical lens assembly.

* * * * *